(12) United States Patent
Lunt et al.

(10) Patent No.: US 12,478,677 B2
(45) Date of Patent: Nov. 25, 2025

(54) TUNABLE LUMINESCENT ORGANIC SALTS FOR ENHANCED IMAGING AND PHOTODYNAMIC THERAPY

(71) Applicant: BOARD OF TRUSTEES OF MICHIGAN STATE UNIVERSITY, East Lansing, MI (US)

(72) Inventors: Richard R. Lunt, Williamston, MI (US); Sophia Y. Lunt, Williamston, MI (US); Deanna Broadwater, Haslett, MI (US); Margaret Young, Hillsboro, OR (US); Matthew Bates, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 665 days.

(21) Appl. No.: 16/637,192

(22) PCT Filed: Aug. 8, 2018

(86) PCT No.: PCT/US2018/045779
§ 371 (c)(1),
(2) Date: Feb. 6, 2020

(87) PCT Pub. No.: WO2019/032683
PCT Pub. Date: Feb. 14, 2019

(65) Prior Publication Data
US 2020/0230238 A1    Jul. 23, 2020

Related U.S. Application Data

(60) Provisional application No. 62/542,350, filed on Aug. 8, 2017.

(51) Int. Cl.
*A61K 41/00*      (2020.01)
*A61K 49/00*      (2006.01)

(52) U.S. Cl.
CPC ...... *A61K 41/0057* (2013.01); *A61K 49/0032* (2013.01); *A61K 49/0065* (2013.01)

(58) Field of Classification Search
CPC .............................. A61K 41/00; A61K 49/00
See application file for complete search history.

(56) References Cited

U.S. PATENT DOCUMENTS

| | | | |
|---|---|---|---|
| 2005/0112131 A1* | 5/2005 | Pogue | A61K 41/0071 514/561 |
| 2006/0112983 A1 | 6/2006 | Parce et al. | |
| 2009/0304803 A1* | 12/2009 | Hasan | A61K 47/6935 424/497 |
| 2010/0240609 A1* | 9/2010 | Guo | A61K 31/695 540/139 |
| 2011/0064658 A1 | 3/2011 | Scherz et al. | |
| 2011/0086302 A1 | 4/2011 | Zhou et al. | |
| 2012/0014874 A1 | 1/2012 | Choi et al. | |
| 2013/0104983 A1 | 5/2013 | Abrams et al. | |
| 2014/0148425 A1 | 5/2014 | Bonnet | |
| 2015/0376209 A1 | 12/2015 | Krutek et al. | |
| 2016/0130284 A1 | 5/2016 | Wong et al. | |

FOREIGN PATENT DOCUMENTS

| | | | | |
|---|---|---|---|---|
| CN | 100491362 C | 5/2009 | | |
| CN | 105288646 A | 2/2016 | | |
| EP | 1284727 B1 | 6/2010 | | |
| KR | 101138437 B1 | 4/2012 | | |
| WO | WO-2004084272 A2 | 9/2004 | | |
| WO | WO-2005054217 A1 | * | 6/2005 | ........... C07D 279/18 |
| WO | WO-2010014728 A1 | 2/2010 | | |
| WO | WO-2013167224 A1 | 11/2013 | | |
| WO | WO-2016176008 A1 | 11/2016 | | |

OTHER PUBLICATIONS

Raisa I. Yakubovskaya et al. Photodynamic activity of a number of photosensitizers in vitro, Proceedings of SPIE. (Year: 1996).*
Arjen Boggards et al., Fluorescencen image-guided brain tumour resection with adjuvant metronomic photodynamic theapy: preclinical model and technology development, Technical Note PPS. (Year: 2005).*
Raisal. Yakubovskaya et al.Photodynamic activity of a number of photosensitizers invitro, Proceedings of SPIE. (Year: 1996).*
Heodo Abrahamse et al. New photosensitizers for photodynamic therapy, BiochemJ,473(4),347-364. (Year: 2016).*
Beata Miksa, Fluorescence dyes used in polymer carriers as imaging agents in anti cancer therapy,MedicinalChem,6,611-639. (Year: 2016).*
Atiya N.Jordan et al.Anion-controlled morphologies and spectral features of cyanine-based nanoGUMBOS—an improved photosensitzer, Nanoscale,4,5031-5038. (Year: 2012).*
Arjen Boggards et al,Fluorescencen image-guided brain tumour resection with adjuvant metronomic photodynamic therapy: preclinical model and technology development, Technical Note PPS. (Year: 2005).*
Anna Segalla et al. Photophysical, photochemical and antibacterial photosensitizing properties of a novel octacationic Zn(II)-phthalocyanine, Photochem, Photobiol Sci, 1, 641-648. (Year: 2002).*

(Continued)

*Primary Examiner* — Jake M Vu
*Assistant Examiner* — Jagadishwar R Samala
(74) *Attorney, Agent, or Firm* — Harness, Dickey & Pierce, PLC

(57) ABSTRACT

A method of exciting an organic salt in a cell is provided. The method includes contacting the cell with a composition including the organic salt, the organic salt having a photoactive ion and a counterion. The cell uptakes the organic salt, the organic salt is substantially free of a coating within the cell, and the organic salt is non-toxic to the cell in the dark. The method also includes exposing the cell to light having a first wavelength, wherein the organic salt absorbs the light having the first wavelength and the photoactive ion becomes excited.

28 Claims, 24 Drawing Sheets

(56) References Cited

OTHER PUBLICATIONS

Figure 1A:
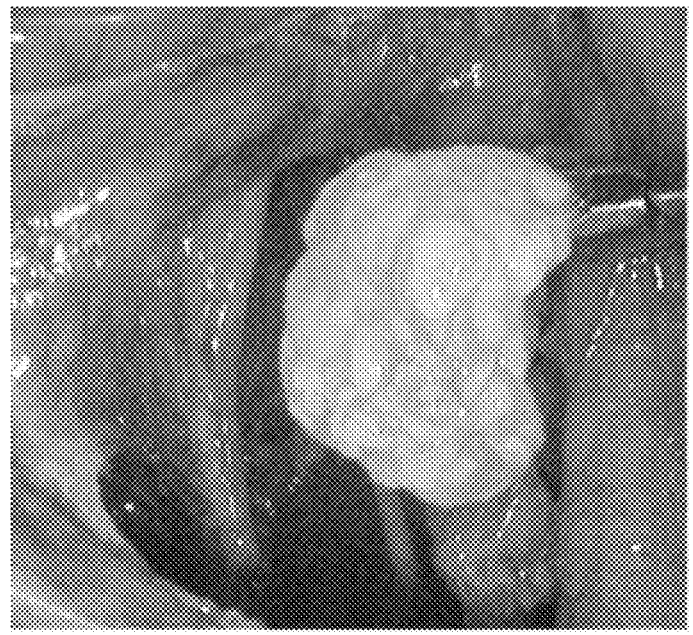

Chang-Keum Lim et al. Phthalocyanine-Aggregated Polymeric Nanoparticles as Tumor-Homing Near-Infrared Absorbers for Photothermal Therapy of Cancer, Theranostics, 2(9), 871-879. (Year: 2012).*
Sehoon Kim et al. Organically Modified Silica Nanoparticles Co-Encapsulating Photosensitizing Drug and Aggregation-Enhanced Two-Photon Absorbing Fluorescent Dye Aggregates for Two-Photon Photodynamic Therapy, JACS, 129(9), 2669-2675. (Year: 2007).*
Arjen Boggards et al, Fluorescence image-guided brain tumour resection with adjuvant metronomic photodynamic therapy: pre-clinica lmodel and technology development, Technical Note PPS. (Year: 2005).*
Patrizio Salic,Towards Cancer Treatment: Synthesis and characterization of photoactive theranostic nanoclinics, Thesis. (Year: 2009).*
Angelo Domenico Quartarolo et al.,Absorption spectra of the potential phtodynamic therapy photosensitizers texaphyrins complexes: A theoretical analysis, J. Chem. Theory Comput, 3, 860-869. (Year: 2007).*
Isiah M .Warner et al. Tunable Cytotoxicity of Rhodamine 6G via Anion Variations, (JACS, 135, 15873-15879). (Year: 2013).*
Susmita Das et al., Nontemplated Approach to Tuning the Spectral Properties of Cyanine-Based Fluorescent Nano GUMBOS, Langmuir, 26, 12867-12876. (Year: 2010).*
Noureen Siraj et al., Strategy for Tuning the Photophysical Properties of Photosensitizers for Use in Photodynamic Therapy, Chem. Eur. J. 21,14440-14446. (Year: 2015).*
Graca H. Vicente et al., Mitochondria Targeting by Guanidine- and Biguanidine Porphyrin Photosensitizers, Bioconjugate Chem, 19, 705-713. (Year: 2008).*
Arjen Boggards et al, Fluorescence image-guided brain tumour resection with adjuvant metronomic photodynamic therapy: preclinical model and technology development, Technical Note PPS. (Year: 2005).*
Yakubovskaya, et al., "Photodynamic activity of a number of photosensitizers in vitro", Proceedings of SPIE—The International Society for Optical Engineering 1996, vol. 2924, Dec. 4, 1996 [retrieved on Nov. 5, 2018]. Retrieved from the Internet: <URL: https://www.spiedigitallibrary.org/conference-proceedings-of-spie/2924/0000/Photodynamic-activity-of-a-number-of-photosensitizers-in-vitro/10.1117/12.260768.short> . pp. 78-85.
Abrahamse et al., "New photosensitizers for photodynamic therapy", Biochemical Journal, vol. 473, No. 4, Feb. 15, 2016 [retrieved on Sep. 20, 2018]. Retrieved from the Internet: URL:https://www.mcbi.nlm.nih.gov/pmc/articles/PMC4811612/. entire document.
Bouit et al., Continuous Symmetry Breaking Induced by Ion Pairing Effect in Heptamethine Cyanine Dyes: Beyond the Cyanine Limit, Journal of the American Chemical Society, vol. 132, 2010, pp. 4328-4335.
Abebayehu, A., Park, D., Hwang, S., Dutta, R., and Lee, C.-H. (2016) Synthesis and spectroscopic behaviour of metal complexes of meso-alkylidenyl carbaporphyrinoids and their expanded analogues. Dalton Transactions 45, 3093-3101.
Benov, L. (2015) Photodynamic Therapy: Current Status and Future Directions. Medical Principles and Practice 24(suppl 1), 14-28.
Bertolino, C. A., Caputo, G., Barolo, C., Viscardi, G., and Coluccia, S. (2006) Novel Heptamethine Cyanine Dyes with Large Stokes' Shift for Biological Applications in the Near Infrared. Journal of Fluorescence 16, 221-225.
Brown, P. R., Kim, D., Lunt, R. R., Zhao, N., Bawendi, M. G., Grossman, J. C., and Bulovi?, V. (2014) Energy Level Modification in Lead Sulfide Quantum Dot Thin Films through Ligand Exchange. ACS Nano 8, 5863-5872.
Burns, A.A., et al., Fluorescent Silica Nanoparticles with Efficient Urinary Excretion for Nanomedicine. Nano Letters, 2009. 9(1): p. 442-448.

Chance, B. (1998) Near-Infrared Images Using Continuous, Phase-Modulated, and Pulsed Light with Quantitation of Blood and Blood Oxygenationa. Annals of the New York Academy of Sciences 838, 29-45.
Che, C.-M., Sun, R. W.-Y., Yu, W.-Y., Ko, C.-B., Zhu, N., and Sun, H. (2003) Gold(iii) porphyrins as a new class of anticancer drugs: cytotoxicity, DNA binding and induction of apoptosis in human cervix epitheloid cancer cells. Chemical Communications, 1718-1719.
Chen, L. B. (1988) Mitochondrial membrane potential in living cells. Annu Rev Cell Biol 4, 155-181.
Chen, Q., et al., Protein modified upconversion nanoparticles for imaging-guided combined photothermal and photodynamic therapy. Biomaterials, 2014. 35(9): p. 2915-2923.
Chilakamarthi, U., and Giribabu, L. (2017) Photodynamic Therapy: Past, Present and Future. The Chemical Record, n/a-n/a.
Dabrowski, J. M., and Arnaut, L. G. (2015) Photodynamic therapy (PDT) of cancer: from local to systemic treatment. Photochemical & Photobiological Sciences 14, 1765-1780.
Dang, X., et al., Layer-by-layer assembled fluorescent probes in the second near-infrared window for systemic delivery and detection of ovarian cancer. Proceedings of the National Academy of Sciences, 2016. 113(19): p. 5179-5184.
Dougherty, T. J., Cooper, M. T., and Mang, T. S. (1990) Cutaneous phototoxic occurrences in patients receiving Photofrin®. Lasers in Surgery and Medicine 10, 485-488.
Dougherty, T. J., Gomer, C. J., Henderson, B. W., Jori, G., Kessel, D., Korbelik, M., Moan, J., and Peng, Q. (1998) Photodynamic Therapy. JNCI: Journal of the National Cancer Institute 90, 889-905.
Fleischer, E. B., and Laszlo, A. (1969) Synthesis of a gold porphyrin. Inorganic and Nuclear Chemistry Letters 5, 373-376.
Frangioni, J. V. (2003) In vivo near-infrared fluorescence imaging. Current Opinion in Chemical Biology 7, 626-634.
Garcia-Diaz, M., Huang, Y., and Hamblin, M. (2016) Use of fluorescent probes for ROS to tease apart Type I and Type II photochemical pathways in photodynamic therapy, Methods 109, 158-166.
Ge, J., et al., Carbon Dots with Intrinsic Theranostic Properties for Bioimaging, Red-Light-Triggered Photodynamic/Photothermal Simultaneous Therapy In Vitro and In Vivo. Advanced Healthcare Materials, 2016. 5(6): p. 665-675.
Glazer, A. N. (1988) Fluorescence-based assay for reactive oxygen species: a protective role for creatinine. The FASEB Journal 2, 2487-2491.
Henderson, T. A., and Morries, L. D. (2015) Near-infrared photonic energy penetration: can infrared phototherapy effectively reach the human brain? Neuropsychiatr Dis Treat 11, 2191-2208.
Jewell, E. L., Huang, J. J., Abu-Rustum, N. R., Gardner, G. J., Brown, C. L., Sonoda, Y., Barakat, R. R., Levine, D. A., and Leitao, M. M. (2014) Detection of sentinel lymph nodes in minimally invasive surgery using indocyanine green and near-infrared fluorescence imaging for uterine and cervical malignancies. Gynecologic Oncology 133, 274-277.
Jori, G. (1996) Tumour photosensitizers: approaches to enhance the selectivity and efficiency of photodynamic therapy. Journal of Photochemistry and Photobiology B: Biology 36, 87-93.
Kilin, V., Anton, H., and Klymchenko, S., Counterion-enhanced cyanine dye loading into lipid nano-droplets for single-particle tracking in zebrafish. Biomaterials, 2014. 35: p. 7.
Liu et al., Advanced Drug Delivery Reviews 110-111 (2017) 13-37.
Luo, S., Zhang, E., Su, Y., Cheng, T., and Shi, C. (2011) A review of NIR dyes in cancer targeting and imaging. Biomaterials 32, 7127-7138.
Mojzisova, H., Bonneau, S., and Brault, D. (2007) Structural and physico-chemical determinants of the interactions of macrocyclic photosensitizers with cells. European Biophysics Journal 36, 943-953.
Pascal, S., Haefele, A., Monnereau, C., Charaf-Eddin, A., Jacquemin, D., Le Guennic, B., Andraud, C., and Maury, O. (2014) Expanding the Polymethine Paradigm: Evidence for the Contribution of a Bis-Dipolar Electronic Structure. The Journal of Physical Chemistry A 118, 4038-4047.

(56) References Cited

OTHER PUBLICATIONS

Patel, N.J., et al., Effect of Metalation on Porphyrin-Based Bifunctional Agents in Tumor Imaging and Photodynamic Therapy. Bioconjugate Chemistry, 2016. 27(3): p. 667-680.
Phillips, E., et al., Clinical translation of an ultrasmall inorganic optical-PET imaging nanoparticle probe. Science Translational Medicine, 2014. 6(260): p. 260ra149-260ra149.
Reisch, A., Didier, P., Richert, L., Oncul, S., Arntz, Y., Mely, Y., and Klymchenko, S. , Collective fluoresecense switching of counter-ion assumbled dyes in polymer nanoparticles. Nature Communications, 2014(5).
Shen, T., Xu, X., Guo, L., Tang, H., Diao, T., Gan, Z., Zhang, G., and Yu, Q. (2017) Efficient Tumor Accumulation, Penetration and Tumor Growth Inhibition Achieved by Polymer Therapeutics: The Effect of Polymer Architectures. Biomacromolecules 18, 217-230.
Shi, C., Wu, J. B., Chu, G. C. Y., Li, Q., Wang, R., Zhang, C., Zhang, Y., Kim, H. L., Wang, J., Zhau, H. E., Pan, D., and Chung, L. W. K. (2014) Heptamethine carbocyanine dye-mediated near-infrared imaging of canine and human cancers through the HIF-1?/OATPs signaling axis. Oncotarget 5, 10114-10126.
Shi, Changhong, et al. Review on near-infrared heptamethine cyanine dyes as theranostic agents for tumor imaging, targeting, and photodynamic therapy. J. Biomed. Opt., 2016. 21(5).
Shulov, I., and Klymchenko, A. , Non-coordinating anions assemble cyanine amphiphiles into ultra-small fluorescent nanoparticles. Chem. Commun. , 2016(25): p. 4.
Shulov, I., et al. , Fluorinated counterion-enhanced emission of rhodamine aggregates: ultrabright nanoparticles for bioimaging and light-harvesting. Nanoscale, 2015(7).
Suddard-Bangsund, J., Traverse, C. J., Young, M., Patrick, T. J., Zhao, Y., and Lunt, R. R. (2016) Organic Salts as a Route to Energy Level Control in Low Bandgap, High Open-Circuit Voltage Organic and Transparent Solar Cells that Approach the Excitonic Voltage Limit. Advanced Energy Materials 6, 1501659-n/a.
Sui, B., Zhong, G., and Sun, J. (2016) Drug-loadable Mesoporous Bioactive Glass Nanospheres: Biodistribution, Clearance, BRL Cellular Location and Systemic Risk Assessment via 45Ca Labelling and Histological Analysis. 6, 33443.
Tan, X., Luo, S., Wang, D., Su, Y., Cheng, T., and Shi, C. (2012) A Nir heptamethine dye with intrinsic cancer targeting, imaging and photosensitizing properties. Biomaterials 33, 2230-2239.
Trivedi, E. R., Harney, A. S., Olive, M. B., Podgorski, I., Moin, K., Sloane, B. F., Barrett, A. G. M., Meade, T. J., and Hoffman, B. M. (2010) Chiral porphyrazine near-IR optical imaging agent exhibiting preferential tumor accumulation. Proceedings of the National Academy of Sciences 107, 1284-1288.
Vahrmeijer, A. L., Hutteman, M., van der Vorst, J. R., van de Velde, C. J. H., and Frangioni, J. V. (2013) Image-guided cancer surgery using near-infrared fluorescence. Nat Rev Clin Oncol 10, 507-518.
Wang, Y., Liu, T., Zhang, E., Luo, S., Tan, X., and Shi, C. (2014) Preferential accumulation of the near infrared heptamethine dye IR-780 in the mitochondria of drug-resistant lung cancer cells. Biomaterials 35, 4116-4124.
Wilson, B. C. (2002) Photodynamic therapy for cancer: principles. Can J Gastroenterol 16, 393-396.
Winterbourn, C. C. (2014) The challenges of using fluorescent probes to detect and quantify specific reactive oxygen species in living cells. Biochimica et Biophysica Acta (BBA)—General Subjects 1840, 730-738.
Yang, X., Shi, C., Tong, R., Qian, W., Zhau, H. E., Wang, R., Zhu, G., Cheng, J., Yang, V. W., Cheng, T., Henary, M., Strekowski, L., and Chung, L. W. K. (2010) Near IR Heptamethine Cyanine Dye-Mediated Cancer Imaging. Clinical Cancer Research 16, 2833-2844.
Yi, X., Yan, F., Wang, F., Qin, W., Wu, G., Yang, X., Shao, C., Chung, L. W. K., and Yuan, J. (2015) IR-780 Dye for Near-Infrared Fluorescence Imaging in Prostate Cancer. Medical Science Monitor : International Medical Journal of Experimental and Clinical Research 21, 511-517.
Young, M., Suddard-Bangsund, J., Patrick, T. J., Pajares, N., Traverse, C. J., Barr, M. C., Lunt, S. Y., and Lunt, R. R. (2016) Organic Heptamethine Salts for Photovoltaics and Detectors with Near-Infrared Photoresponse up to 1600 nm. Advanced Optical Materials 4, 1028-1033.
Yuan, J., Yi, X., Yan, F. E. I., Wang, F., Qin, W., Wu, G., Yang, X., Shao, C., and Chung, L. W. (2015) Near-infrared fluorescence imaging of prostate cancer using heptamethine carbocyanine dyes. Molecular Medicine Reports 11, 821-828.
Yuan, L., Lin, W., Zheng, K., He, L., and Huang, W. (2013) Far-red to near infrared analyte-responsive fluorescent probes based on organic fluorophore platforms for fluorescence imaging. Chemical Society Reviews 42, 622-661.
Zhang, C., Liu, T., Su, Y., Luo, S., Zhu, Y., Tan, X., Fan, S., Zhang, L., Zhou, Y., Cheng, T., and Shi, C. (2010) A near-infrared fluorescent heptamethine indocyanine dye with preferential tumor accumulation for in vivo imaging. Biomaterials 31, 6612-6617.
Zhang, E., Zhang, C., Su, Y., Cheng, T., and Shi, C. (2011) Newly developed strategies for multifunctional mitochondria-targeted agents in cancer therapy. Drug Discovery Today 16, 140-146.
Zheng, Q., Jockusch, S., Zhou, Z., Altman, R. B., Zhao, H., Asher, W., Holsey, M., Mathiasen, S., Geggier, P., Javitch, J. A., and Blanchard, S. C. (2017) Electronic tuning of self-healing fluorophores for live-cell and single-molecule imaging. Chem Sci 8, 755-762.
International Search Report and Written Opinion for corresponding International Application PCT/US2018/045779 dated Jan. 28, 2019 (20 pages).
European Search Report and Opinion for European Patent Application EP 18844750.2, dated Mar. 31, 2021 (10 pages).
Canadian Examination Report for CA Application 3,072,418 dated Aug. 7, 2023 (4 pages).
Canadian Examination Report for CA Application 3,072,418 dated May 27, 2024 (4 pages).

\* cited by examiner

CyPF$_6$
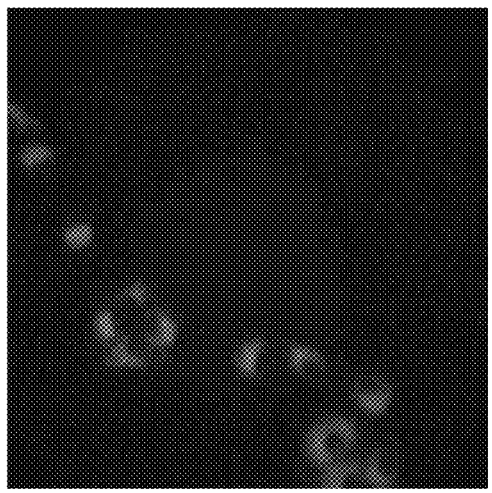
CyTPFB
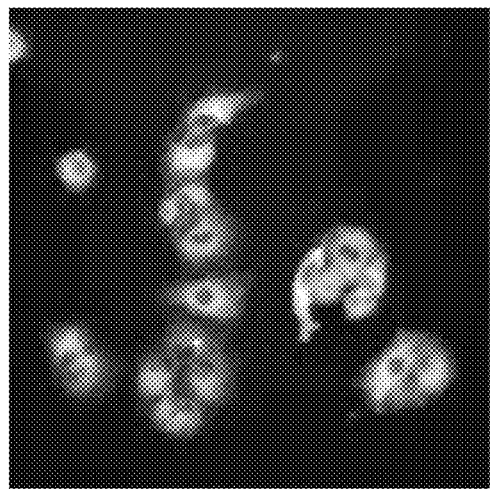
Fig. 14A
Fig. 14B
Cy7Cl
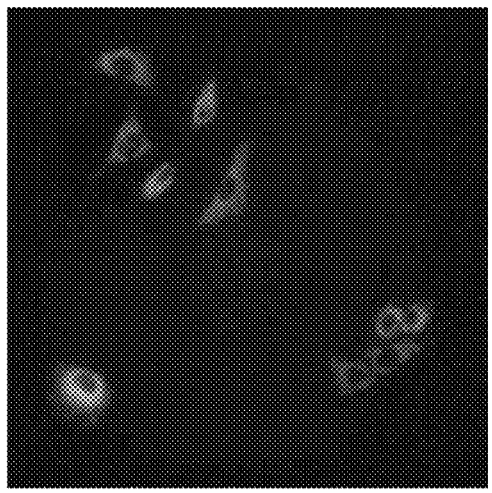
Cy7TPFB
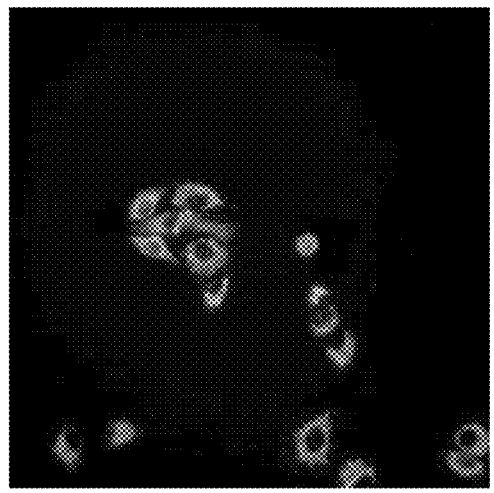
Fig. 14C
Fig. 14D

TUNABLE LUMINESCENT ORGANIC SALTS FOR ENHANCED IMAGING AND PHOTODYNAMIC THERAPY

CROSS-REFERENCE TO RELATED APPLICATIONS

This application is a 371 U.S. National Stage of International Application No. PCT/US2018/045779, filed Aug. 8, 2018, which claims the benefit of U.S. Provisional Application No. 62/542,350, filed Aug. 8, 2017. The entire disclosures of the above applications are incorporated herein by reference.

GOVERNMENT RIGHTS

This invention was made with government support under 1254662 and 1702591 awarded by the National Science Foundation. The government has certain rights in the invention.

FIELD

The present disclosure relates to tunable luminescent organic salts for tissue imaging and/or photodynamic therapy.

BACKGROUND

This section provides background information related to the present disclosure which is not necessarily prior art.

Figure 1B:
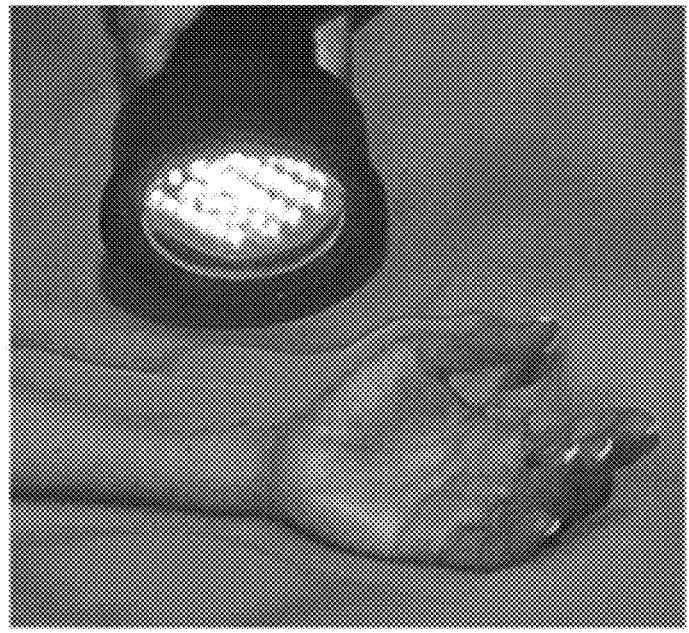

Luminescent and fluorescent dyes offer great potential as both diagnostic and therapeutic agents, and their combined application has been termed "theranostics". They can be used for in vivo imaging of tumors as well as photodynamic therapy (PDT) to treat tumors. PDT utilizes photosensitizers as drugs that localize in tumors and become activated by light (through excitation) to generate cytotoxic species. PDT provides double selectivity through the use of both the dye and light, with the goal of minimal effect from the dye or light alone if there is low dark cytotoxicity. Luminescent dyes that absorb and emit in the near-infrared (NIR) range offer several advantages: while visible light (400-700 nm) travels only micrometers in tissues, invisible NIR light (700-1200 nm) can travel centimeters in tissues. 810 nm and 980 nm NIR light have been shown to penetrate 3 cm of skin, skull, and brain tissue. Additionally, visible light is absorbed by tissue components and causes autofluorescence, but NIR light is not absorbed by biological material and drastically reduces background noise. FDA-approved NIR-responsive fluorescent dyes including indocyanine green, 5-aminolevulinic acid, and methylene blue are available and used in medical diagnostics, but they suffer from low brightness. For example, FIG. 1A shows a fluorescence from a lymph node tumor containing indocyanine green, and FIG. 1B shows PDT being performed on a subject who was administered PHOTOFRIN® porfimer sodium marketed by Pinnacle Biologics, Inc. (Chicago, IL). Other commercially available NIR-responsive fluorescent dyes include heptamethine cyanine (Cy7), Alexa Fluor 750, and heptamethine dye IR-808. However, these dyes display low brightness, high cytotoxicity, and undesirable aggregation.

Figure 2A:
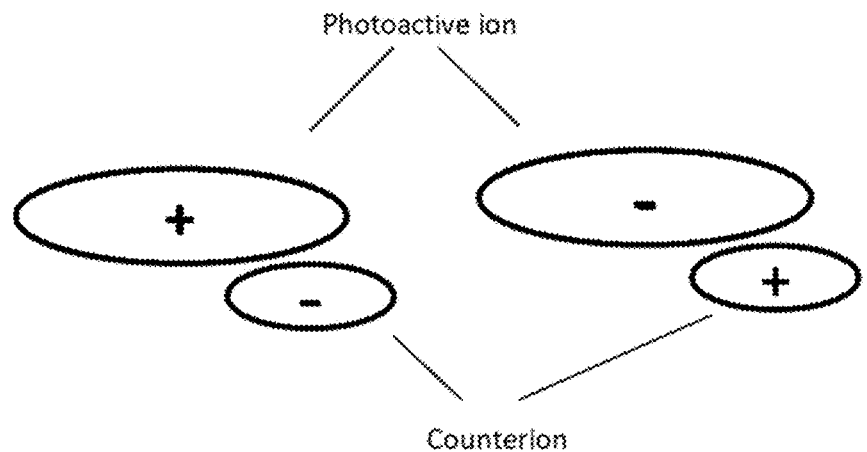
Figure 2B:
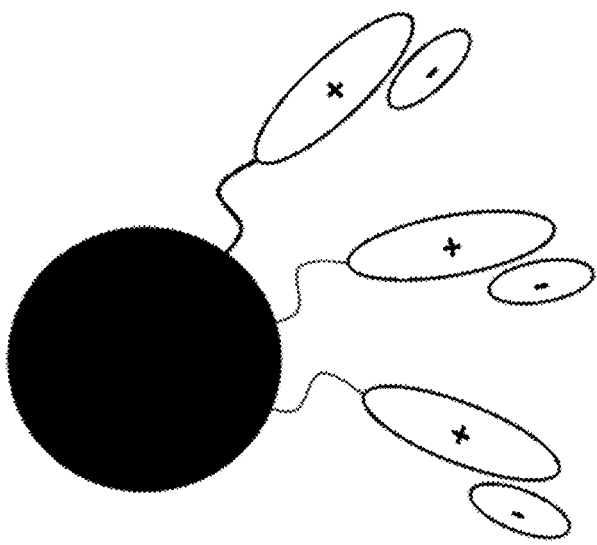

Luminescent organic salts, composed of a luminescent cation and an anion, as depicted in FIG. 2A and salts tethered to nanoparticles, as depicted in FIG. 2B, have been developed to increase their solubility and photostabilization. The anion is largely thought to have no impact on optoelectronic properties of the luminescent organic salts. Very few reports have investigated the impact of the anion, but only in encapsulated matricies: bulky anions have been shown to inhibit aggregation-induced quenching in nanoparticle-encapsulated organic salts.

SUMMARY

This section provides a general summary of the disclosure, and is not a comprehensive disclosure of its full scope or all of its features.

In various aspects, the current technology provides a method of exciting an organic salt in a cell. The method includes contacting or having contacted the cell with a composition including the organic salt, the organic salt having a photoactive ion and a counterion, wherein the cell uptakes the organic salt and the organic salt is substantially free of a coating within the cells and non-toxic to the cell in the dark. The method also includes exposing the cell to light having a first wavelength, wherein the organic salt absorbs the light having the first wavelength and the photoactive ion becomes excited.

In one aspect, the organic salt is in the form of a pair, an aggregate, or a nanoparticle within the cell.

In one aspect, the nanoparticle has a diameter of greater than or equal to about 0.5 nm to less than or equal to about 100 nm.

In one aspect, the organic salt is not cytotoxic at a concentration of greater than or equal to about 3 µM.

In one aspect, the organic salt has a $^{light}C_{50}$ of less about 10 µM and a $^{dark}IC_{50}$ greater than about 10 µm.

In one aspect, the organic salt has a $^{light}C_{50}$ of greater than about 5 µM and a $^{dark}IC_{50}$ of greater than about 5 µM.

In one aspect, the organic salt has an $^{dark}IC_{50}$:$^{light}IC_{50}$ ratio of greater than or equal to about 5.

In one aspect, the light having the first wavelength is visible light or near-infrared light (NIR).

In one aspect, the first wavelength is greater than or equal to about 600 nm to less than or equal to about 1600 nm.

In one aspect, the excited photoactive ion emits light having a second wavelength.

In one aspect, the light having the second wavelength is visible light or near-infrared light (NIR).

In one aspect, the excited photoactive ion is non-toxic to the cell, such that the excited photoactive ion does not cause cell death.

In one aspect, the excited photoactive ion is non-toxic to the cell, such that the excited photoactive ion does not cause cell death at a concentration of less than or equal to about 2.5 µM.

In one aspect, the organic salt is non-toxic to the cell, such that the organic salt does not cause cell death at a concentration of greater than or equal to about 3 µM.

In one aspect, the excited photoactive ion is activated to generate reactive oxygen species within the cell.

In one aspect, the excited photoactive ion is activated to generate reactive oxygen species in the cell or to disrupt an electron transport chain within the cell, and emits light having a second wavelength.

In one aspect, the counterion has a volume averaged equivalent spherical radius of greater than or equal to about 0.275 nm.

In one aspect, the counterion is a weakly coordinating ion that does not include $PnX_6^-$, $X^-$, $XO_4^-$, $XO_3^-$, $XO_2^-$, or $XO^-$, where X is a halogen and Pn is a pnictogen.

In one aspect, the counterion has an absolute highest occupied molecular orbital (HOMO) energy of less than or equal to about 5 eV.

In one aspect, the counterion has an absolute highest occupied molecular orbital (HOMO) energy of greater than about 5 eV.

In one aspect, the method further includes, prior to the contacting, tuning or having tuned the organic salt to have a desired toxicity after the exposing the cell to light by pairing the photoactive ion with the counterion, wherein the counterion induces the desired toxicity of the excited photoactive ion.

In one aspect, the counterion is selected from counterions that impart different levels of toxicity to the photoactive ion.

In one aspect, the photoactive ion is a photoactive cation and the counterion is an anion.

In one aspect, the anion is selected from the group consisting of tetrakis(4-fluorophenyl)borate (FPhB$^-$), cobalticarborane (CoCB$^-$), tetrakis(pentafluorophenyl)borate (TPFB$^-$), tetrakis[3,5-bis(trifluoro methyl)phenyl]borate (TFM$^-$), Δ-tris(tetrachloro-1,2-benzene diolato) phosphate (V) (TRIS$^-$), tetraphenylborate, tetra(p-tolyl)borate, tetrakis(4-biphenylyl)borate, tetrakis(1-imidazolyl)borate, tetrakis(2-thienyl)borate, tetrakis(4-chlorophenyl)borate, tetrakis(4-fluorophenyl)borate, tetrakis(4-tert- butylphenyl)borate, tetrakis[3,5-bis(trifluoromethyl)]borate, [4-[bis(2,4,6-trimethylphenyl)phosphino]-2,3,5,6-tetrafluorophenyl]hydrobis(2,3,4,5,6-pentafluorophenyl)borate, [4-di-tert-butylphosphino-2,3,5,6-tetrafluorophenyl]hydrobis(2,3,4,5,6-pentafluorophenyl)borate anion; (Λ, R)-(1,1'-binaphthalene-2,2'diolato)(bis(tetrachlor-1,2-benzenediolato)phosphate (V)) anion (BINPHAT-), hexafluoroantimonate (SbF6-), tetrafluoroborate (BF4-), acetate, trifluoracetate, benzene sulfonate, bis(trifluoromethane)sulfonimide (TFSI), alkylsulfate, tosylate, methanesulfonate, tetrakis(4-methylphenyl)-borane, tetra-4-biphenylylborate, tetrakis(4-methoxyphenyl)borate, tetrakis[4-(2-methyl-2-propanyl)phenyl]borate, (2-methylphenyl)(triphenyl)borate, bis(2-methylphenyl)(diphenyl)borate, tetrakis(4'-methyl-4-biphenylyl)borate, tetrakis(4-isopropoxyphenyl)borate, derivatives thereof, and combinations thereof.

In one aspect, the photoactive ion is a photoactive anion and the counterion is a cation, wherein the cation is selected from the group consisting of (2-oxo-2-phenyl-ethyl)-triphenyl-phosphonium, 1-benzyl-4-(4-methoxy-phenyl)-4H-(1,2,4)triazol-1-ium, 1-benzyl-4-phenyl-3-styryl-4H-(1,2,4)triazol-1-ium, 1-benzyl-4-phenyl-3-styryl-4H-(1,2,4)triazol-1-ium, 2,4,6 tris-(4-chloro-phenyl)-pyranylium, 2,4,6-tris-(4-chloro-phenyl)-thiopyranylium, 2,4,6-tris-(4-hydroxy-phenyl)-pyranylium, 2,4,6-tris-(4-tert-butyl-phenyl)-(1,3)oxazin-1-ylium, 4,6-bis-(4-chloro-phenyl)-2,3-diphenyl-pyranylium, 1-hexyl-3-methylimidazolium, 1-hexyl-3-(3,3,4,4,5,5,6,6-tridecafluorooctyl)-methylimidazolium, 1-hexyl-3-(3,3,4,4,5,5,6,6,7,7,8,8-nonafluorohexyl)-methylimidazolium, methylpyridinium, trimethylmethanaminium, methyl ammonium, acetamidinium, 5-azaspiro[4.4]nonan-5-ium, benzylammonium, iso-butylammonium, n-butylammonium, t-butylammonium, cyclohexylammonium, 1,4-diazabicyclo[2,2,2]octane-1,4-diium, diethylammonium, ethane-1,2-diammonium, ethylammonium, formamidinium, guanidinium, n-hexylammonium, imidazolium, n-octylammonium, phenethylammonium, piperazine-1,4-diium, propane-1,3-diammonium, iso-propylammonium, pyrrolidinium, quinuclidin-1-ium, phosphonium, pyrrolidium, thiazolium, sulfinium, imidazolium, pyridinium, sulfonated cyanine3 (Cy3), sulfonated cyanine3.5 (Cy3.5), sulfonated cyanine5 (Cy5), sulfonated cyanine5.5 (Cy5.5), sulfonated cyanine7 (Cy7), sulfonated cyanine7.5 (Cy7.5), derivatives thereof, halogenated derivatives thereof, and combinations thereof.

In one aspect, the photoactive ion is a cationic or anionic form of a photoactive molecule selected from the group consisting of porphyrins, rhodamines, cyanines, polymethines, heptamethines, phthalocyanines, squaraines, perylenes, quinines, xanthenes, naphthalenes, coumarins, oxadiazoles, oxazines, acridines, arylmethines, tetrapyrroles, indocarbocyanines, oxacarbocyanines, thiacarbocyanines, merocyanines, porfimers, derivatives thereof, and combinations thereof.

In one aspect, the photoactive ion is a photoactive cation selected from the group consisting of 1-Butyl-2-(2-[3-[2-(1-butyl-1H-benzo[cd]indol-2-ylidene)-ethylidene]-2-phenyl-cyclopent-1-enyl-vinyl)-benzo[cd]indolium, 1-Butyl-2-(2-[3-[2-(1-butyl-1H-benzo[cd]indol-2-ylidene)-ethylidene]-2-chloro-cyclohex-1-enyl]-vinyl)-benzo[cd]indolium, 1-Butyl-2-(2-[3-[2-(1-butyl-1H-benzo[cd]indol-2-ylidene)-ethylidene]-2-phenyl-cyclohex-1-enyl]-vinyl)-benzo[cd]indolium, 1-Butyl-2-(2-[3-[2-(1-butyl-1H-benzo[cd]indol-2-ylidene)-ethylidene]-2-diphenylamino-cyclopent-1-enyl]-vinyl)-benzo[cd]indolium, 1-Butyl-2-[7-(1-butyl-1H-benzo[cd]indol-2-ylidene)-hepta-1,3,5-trienyl]-benzo[cd]indolium, 2-[2-[2-chloro-3-[(1,3-dihydro-3,3-dimethyl-1-ethyl-2H-benz[e]indol-2-ylidene)ethylidene]-1-cylohexen-1-yl]-ethenyl]-3,3-dimethyl-1-ethyl-1H-benz[e]indolium ("Cy"), N,N,N',N'-Tetrakis-(p-di-n-butylaminophenyl)-p-benzochinon-bis-immonium, 4-[2-[2-Chloro-3-[(2,6-diphenyl-4H-thiopyran-4-ylidene)ethylidene]-1-cyclohexen-1-yl]ethenyl]-2,6-diphenylthiopyrylium, 1-Butyl-2-[2-[3-[(1-butyl-6-chlorobenz[cd]indol-2(1H)-ylidene)ethylidene]-2-chloro-5-methyl-1-cyclohexen-1-yl]ethenyl]-6-chlorobenz[cd]indolium, 1-Butyl-2-[2-[3-[(1-butyl-6-chlorobenz[cd]indol-2(1H)-ylidene)ethylidene]-2-chloro-1-cyclohexen-1-yl]ethenyl]-6-chlorobenz[cd]indolium, Dimethyl{4-[1,7,7-tris(4-dimethylaminophenyl)-2,4,6-heptatrienylidene]-2,5-cyclohexadien-1-ylidene}ammonium, 5,5'-Dichloro-11-diphenylamino-3,3'-diethyl-10,12-ethylenethiatricarbocyanine, 2-[2-[2-Chloro-3-[2-(1,3-dihydro-1,1,3-trimethyl-2H-benzo[e]-indol-2-ylidene)-ethylidene]-1-cyclohexen-1-yl]-ethenyl]-1,1,3-trim ethyl-1H-benzo[e]indolium, 2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium, 2-[2-[3-[(1,3-Dihydro-3,3-dimethyl-1-propyl-2H-indol-2-ylidene)ethylidene]-2-(phenylthio)-1-cyclohexen-1-yl]ethenyl]-3,3-dimethyl-1-propylindolium, 1,1',3,3,3',3'-4,4',5,5'-di-benzo-2,2'-indotricarbocyanine perchlorate, 2-[2-[2-Chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium, 3,3'-Diethylthiatricarbocyanine, 2-[[2-[2-[4-(dimethylamino)phenyl]ethenyl]-6-methyl-4H-pyran-4-ylidene]methyl]-3-ethyl, 2-[7-(1,3-Dihydro-1,3,3-trimethyl-2H-indol-2-ylidene)-1,3,5-heptatrienyl]-1,3,3-trimethyl-3H-indolium, cyanine3 (Cy3), cyanine3.5 (Cy3.5), cyanine5 (Cy5), cyanine5.5 (Cy5.5), cyanine7 (Cy7), cyanine7.5 (Cy7.5) derivatives thereof, and combinations thereof.

In one aspect, the cell is a cancer cell.

In one aspect, the cell is a eukaryotic or prokaryotic cell.

In one aspect, the cell is located in a tumor of a subject.

In one aspect, the organic salt is coupled to a biomolecule, an antibody, an antibody fragment, a targeting agent, a sugar molecule, a polysaccharide, a protein, a peptide, a nucleic acid, a nanoparticle surface, a lipid carrier, a micelle surface, or a liposome surface.

In one aspect, the organic salt has a Stokes shift of greater than or equal to about 50 nm, or greater than or equal to about 100 nm.

In one aspect, the organic salt has a bandgap greater than or equal to about 0 eV to less than or equal to about 1.8 eV.

In one aspect, wherein prior to the contacting, the organic salt is contained with a dissolvable or bioabsorbable coating, wherein the dissolvable or bioabsorbable coating is substantially removed prior to the contacting.

In one aspect, the counterion is a weakly coordinating ion.

In one aspect, the organic salt is aggregated into an organic salt particle.

In various aspects, the current technology also provides a method of exciting an organic salt in a tissue of a subject. The method includes administering or having administered a safe and effective amount of a composition including an organic salt to the subject, the organic salt having a photoactive ion and a counterion, wherein the photoactive ion and the counterion are non-toxic in the dark, and the organic salt enters the tissue and is substantially free of a coating within the tissue. The method also includes exposing the tissue to light having a first wavelength, wherein the organic salt absorbs the light having the first wavelength and becomes excited.

In one aspect, the exposing is performed at least 1 hour after the composition is administered.

In one aspect, the organic salt comprises a coating that is absorbed in the subject such that the organic salt is substantially free of the coating as it contacts cells of the tissue.

In one aspect, the organic salt in the composition is substantially free of a coating prior to the administering.

In various aspects, the current technology further provides a method of exciting an organic salt in a tissue of a subject. The method includes exposing the tissue in the subject to light having a wavelength that excites the organic salt, wherein prior to the exposing, a composition including an organic salt was administered to the subject, the organic salt having a photoactive ion and a counterion, and wherein cells of the tissue took up the organic salt and the organic salt is substantially free of a coating within the cells.

In one aspect, the photoactive ion is selected from the group consisting of 1-Butyl-2-(2-[3-[2-(1-butyl-1H-benzo[cd]indol-2-ylidene)-ethylidene]-2-phenyl-cyclopent-1-enyl]-vinyl)-benzo[cd]indolium, 1-Butyl-2-(2-[3-[2-(1-butyl-1H-benzo[cd]indol-2-ylidene)-ethylidene]-2-chloro-cyclohex-1-enyl]-vinyl)-benzo[cd]indolium, 1-Butyl-2-(2-[3-[2-(1-butyl-1H-benzo[cd]indol-2-ylidene)-ethylidene]-2-phenyl-cyclohex-1-enyl]-vinyl)-benzo[cd]indolium, 1-Butyl-2-(2-[3-[2-(1-butyl-1H-benzo[cd]indol-2-ylidene)-ethylidene]-2-diphenylamino-cyclopent-1-enyl]-vinyl)-benzo[cd]indolium, 1-Butyl-2-[7-(1-butyl-1H-benzo[cd]indol-2-ylidene)-hepta-1,3,5-trienyl]-benzo[cd]indolium, 2-[2-[2-chloro-3-[2-(1,3-dihydro-3,3-dimethyl-1-ethyl-2H-benz[e]indol-2-ylidene)ethylidene]-1-cylohexen-1-yl]-ethenyl]-3,3-dimethyl-1-ethyl-1H-benz[e]indolium ("Cy"), N,N,N',N'-Tetrakis-(p-d i-n-butylaminophenyl)-p-benzochinon-bis-immonium, 4-[2-[2-Chloro-3-[(2,6-diphenyl-4H-thiopyran-4-ylidene)ethylidene]-1-cyclohexen-1-yl]ethenyl]-2,6-diphenylthiopyrylium, 1-Butyl-2-[2-[3-[(1-butyl-6-chlorobenz[cd]indol-2(1H)-ylidene)ethylidene]-2-chloro-5-methyl-1-cyclohexen-1-yl]ethenyl]-6-chlorobenz[cd]indolium, 1-Butyl-2-[2-[3-[(1-butyl-6-chlorobenz[cd]indol-2(1H)-ylidene)ethylidene]-2-chloro-1-cyclohexen-1-yl]ethenyl]-6-chlorobenz[cd]indolium, Dimethyl{44-[1,7,7-tris(4-dimethylaminophenyl)-2,4,6-heptatrienylidene]-2,5-cyclohexadien-1-ylidene}ammonium, 5,5'-Dichloro-11-diphenylamino-3,3'-diethyl-10,12-ethylenethiatricarbocyanine, 2-[2-[2-Chloro-3-[2-(1,3-dihydro-1,1,3-trimethyl-2H-benzo[e]-indol-2-ylidene)-ethylidene]-1-cyclohexen-1-yl]-ethenyl]-1,1,3-trimethyl-1H-benzo[e]indolium, 2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium, 2-[2-[3-[(1,3-Dihydro-3,3-dimethyl-1-propyl-2H-indol-2-ylidene)ethylidene]-2-(phenylthio)-1-cyclohexen-1-yl]ethenyl]-3,3-dimethyl-1-propylindolium, 1,1',3,3,3',3'-4,4',5,5'-di-benzo-2,2'-indotricarbocyanine perchlorate, 2-[2-[2-Chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium, 3,3'-Diethylthiatricarbocyanine, 2-[[2-[2-[4-(dimethylamino)phenyl]ethenyl]-6-methyl-4H-pyran-4-ylidene]methyl]-3-ethyl, 2-[7- (1,3-Dihydro-1,3,3-trim ethyl-2H-indol-2-ylidene)-1,3,5-heptatrienyl]-1,3,3-trimethyl-3H-indolium, 2-[2[-2-Chloro-3-[[1,3-dihydro-1,1-dimethyl-3-(4-sulfobutyl)-2H-benzo[e]indol-2-ylidene]-ethylidene]-1-cyclohexen-1-yl]-ethenyl]-1,1-dimethyl-3-(4-sulfobutyl)-1H-benzo[e]indolium hydroxide, 2-[7-[1,3-Dihydro-1,1-dimethyl-3-(4-sulfobutyl)-2H-benz[e]indol-2-ylidene]-1,3,5-heptatrien-1-yl]-1,1-dimethyl-3-(4-sulfobutyl)-1H-benz[e]indolium, cyanine3 (Cy3), cyanine3.5 (Cy3.5), cyanine5 (Cy5), cyanine5.5 (Cy5.5), cyanine7 (Cy7), cyanine7.5 (Cy7.5), derivatives thereof, and combinations thereof.

In one aspect, the counterion is selected from the group consisting of tetrakis(4-fluorophenyl)borate (FPhB⁻), cobalticarborane (CoCB⁻), tetrakis(pentafluorophenyl)borate (TPFB⁻), tetrakis[3,5-bis(trifluoro methyl)phenyl]borate (TFM⁻), Δ-tris(tetrachloro-1,2-benzene diolato) phosphate (V) (TRIS⁻), tetraphenylborate, tetra(p-tolyl)borate, tetrakis (4-biphenylyl)borate, tetrakis(1-imidazolyl)borate, tetrakis (2-thienyl)borate, tetrakis(4-chlorophenyl)borate, tetrakis(4-fluorophenyl)borate, tetrakis(4-tert- butylphenyl)borate, tetrakis[3,5-bis(trifluoromethyl)]borate, [4-[bis(2,4,6-trimethylphenyl)phosphino]-2,3,5,6-tetrafluorophenyl]hydrobis (2,3,4,5,6-pentafluorophenyl)borate, [4-di-tert-butylphosphino-2,3,5,6-tetrafluorophenyl]hydrobis(2,3,4,5,6-pentafluorophenyl)borate anion; (Λ,R)-(1,1'-binaphthalene-2,2'diolato)(bis(tetrachlor-1,2-benzenediolato)phosphate (V)) anion (BINPHAT-), hexafluoroantimonate (SbF6-), tetrafluoroborate (BF4-), acetate, trifluoracetate, benzene sulfonate, bis(trifluoromethane)sulfonimide (TFSI), alkylsulfate, tosylate, methanesulfonate, tetrakis(4-methylphenyl)-borane, tetra-4-biphenylylborate, tetrakis(4-methoxyphenyl)borate, tetrakis[4-(2-methyl-2-propanyl) phenyl]borate, (2-methylphenyl)(triphenyl)borate, bis(2-methylphenyl)(diphenyl)borate, tetrakis(4'-methyl-4-biphenylyl)borate, tetrakis(4-isopropoxyphenyl)borate, (2-oxo-2-phenyl-ethyl)-triphenyl-phosphonium, 1-benzyl-4-(4-m ethoxy-phenyl)-4H-(1,2,4)triazol-1-ium, 1-benzyl-4-phenyl-3-styryl-4H-(1,2,4)triazol-1-ium, 1-benzyl-4-phenyl-3-styryl-4H-(1,2,4)triazol-1-ium, 2,4,6 tris-(4-chloro-phenyl)-pyranylium, 2,4,6-tris-(4-chloro-phenyl)-thiopyranylium, 2,4,6-tris-(4-hydroxy-phenyl)-pyranylium, 2,4,6-tris-(4-tert-butyl-phenyl)-(1,3)oxazin-1-ylium, 4,6-bis-(4-chloro-phenyl)-2,3-diphenyl-pyranylium, 1-hexyl-3-methylimidazolium, 1-hexyl-3-(3,3,4,4,5,5,6,6-tridecafluorooctyl)-methylimidazolium, 1-hexyl-3-(3,3,4,4,5,5,6,6,7,7,8,8-nonafluorohexyl)-methylimidazolium, methylpyridinium, trimethylmethanaminium, methyl ammonium, acetamidinium, 5-azaspiro[4.4]nonan-5-ium, benzylammonium, iso-butylammonium, n-butylammonium, t-butylammonium, cyclohexylammonium, 1,4-diazabicyclo [2,2,2]octane-1,4-diium, diethylammonium, ethane-1,2-diammonium, ethylammonium, formamidinium, guanidinium, n-hexylammonium, imidazolium, n-octylammonium, phenethylammonium, piperazine-1,4-diium, propane-1,3-diammonium, iso-propylammonium, pyrrolidinium, quinuclidin-1-ium, phosphonium, pyrrolidinium, thiazolium, sulfinium, imidazolium, pyridinium, sulfonated cyanine3 (Cy3), sulfonated cyanine3.5 (Cy3.5), sulfonated cyanine5 (Cy5), sulfonated cyanine5.5 (Cy5.5), sulfonated cyanine7 (Cy7), sulfonated cyanine7.5 (Cy7.5), derivatives thereof, and combinations thereof.

In various aspects, the current technology also provides a method of treating a subject having a tumor. The method includes exposing the tumor in the subject to light having a first wavelength, wherein the tumor includes tumor cells containing an organic salt being substantially free of a coating and having a photoactive ion and a counterion, wherein the light having the first wavelength excites the organic salt.

In one aspect, the excited organic salt emits light having a second wavelength.

In one aspect, the method further includes visualizing the light having the second wavelength in real time, and resecting the tumor from the subject.

In one aspect, the excited organic salt generates reactive oxygen species within the tumor cells, and wherein the reactive oxygen species kill the tumor cells.

In one aspect, the excited organic salt interacts with electron transport chain in mitochondria of the tumor cells and causes death of the tumor cells.

In one aspect, the method further includes administering a safe and effective amount of a conventional drug for treating the tumor to the subject.

In one aspect, the subject was administered a composition comprising the organic salt to the subject at least 1 hour prior to the exposing.

In various aspects, the current technology further provides an organic salt for use in a method of treating cancer, wherein the organic salt is substantially free of a coating, includes a photoactive ion and a counterion, and is not cytotoxic in the dark.

In various aspects, the current technology also provides an organic salt for use as a medicament for the treatment of cancer, wherein the organic salt is substantially free of a non-bioresorbable coating, includes a photoactive ion and a counterion, and is not cytotoxic in the dark.

In various aspects, the current technology also provides the use of an organic salt, for the manufacture of a medicament for the treatment of cancer, wherein the organic salt is substantially free of a non-bioresorbable coating, includes a photoactive ion and a counterion, and is not cytotoxic in the dark.

In various aspects, the current technology further provides a method of deactivating dark cytotoxicity of an organic salt to a cell. The method includes obtaining an organic salt that is cytotoxic to the cell in the dark, the organic salt including a photoactive ion and a first counterion; selecting a second counterion; and substituting the first counterion with the second counterion to generate a deactivated organic salt, wherein the deactivated organic salt has a lower cytotoxicity to the cell than the organic salt prior to the substituting.

In one aspect, the substituting is performed by ion exchange.

In one aspect, the deactivated organic salt luminesces when exposed to visible or near-infrared (NIR) light.

In one aspect, the second counterion is a weakly coordinating ion.

In one aspect, the weakly coordinating ion is not $PnX_6^-$, $X^-$, $XO_4^-$, $XO_3^-$, $XO_2^-$, or $XO^-$, where X is a halogen and Pn is a pnictogen.

In one aspect, the weakly coordinating ion has an absolute highest occupied molecular orbital (HOMO) energy of less than about 5 eV.

In one aspect the weakly coordinating ion has an absolute highest occupied molecular orbital (HOMO) energy of greater than about 5 eV.

In one aspect the deactivated organic salt retains the form of a nanoparticle in a cell or in an extracellular environment.

In one aspect the nanoparticle has a diameter of greater than or equal to about 0.5 nm to less than or equal to about 100 nm.

In one aspect, the deactivated organic salt is not cytotoxic at a concentration of greater than or equal to about 3 µM.

In one aspect, the deactivated organic salt has a strongest peak absorption at a wavelength of greater than or equal to about 700 nm.

In one aspect, the deactivated organic salt has a bandgap of less than or equal to about 1.8 eV.

In one aspect, the second counterion has a volume averaged equivalent spherical radius of greater than or equal to about 0.275 nm.

In one aspect, the deactivated organic salt has a $^{light}IC_{50}$ of less than about 10 µM and a $^{dark}IC_{50}$ of greater than about 10 µM.

In one aspect, the deactivated organic salt has a $^{light}IC_{50}$ of greater than about 5 µM and a $^{dark}IC_{50}$ of greater than about 5 µM.

In one aspect, the deactivated organic salt has an $^{dark}IC_{50}$:$^{light}IC_{50}$ ratio of greater than or equal to about 5.

In various aspects, the current technology also provides a method of treating a subject having a tumor. The method includes obtaining the subject, wherein the subject received a pretreatment including administering a composition including an organic salt to the subject, the organic salt being non-toxic in the dark, and having a photoactive ion and a non-spherical and weakly coordinating counterion, wherein the organic salt accumulates in cells of the tumor and is substantially free of a coating in the cells; and inducing the organic salt to become toxic to the tumor cells.

In one aspect, the inducing includes exposing the tumor in the subject to light having a first wavelength, wherein the light having the first wavelength excites the organic salt and the excited organic salt is toxic to the tumor cells.

In one aspect, prior to the pretreatment, the organic salt was deactivated by substituting a first counterion with the non-spherical and weakly coordinating counterion by ion exchange or ion synthesis.

In one aspect, the toxic organic salt generates reactive oxygen species within the tumor cells, and wherein the reactive oxygen species kill the tumor cells.

In one aspect, the toxic organic salt disrupts electron transport chains in mitochondria of the tumor cells and causes death of the tumor cells.

In various aspects, the current technology further provides a method of treating a subject having a tumor. The method includes obtaining the subject, wherein the subject received a pretreatment comprising administering a composition including an organic salt to the subject, the organic salt being non-toxic in the dark, and having a photoactive ion and a non-spherical and weakly coordinating counterion, wherein the organic salt accumulates in cells of the tumor and is substantially free of a coating in the cells. The method also includes inducing or having induced the organic salt to luminesce in the tumor cells, identifying the tumor by visualizing the luminescence, and resecting the tumor from the subject.

In one aspect, the inducing includes exposing the tumor in the subject to light having a first wavelength, wherein the light having a first wavelength excites the organic salt and the excited organic salt emits light having a second wavelength.

In one aspect, the organic salt has a bandgap of less than or equal to about 1.8 eV.

In one aspect, the first and second wavelengths both have a wavelength of greater than or equal to about 700 nm.

In one aspect, the exposing the tumor in the subject to light is performed with a laser or a fiber optic cable.

In one aspect, the luminescent organic salt does not cause cell death.

In one aspect, the visualizing the luminescence is performed with an imaging system comprising a detector that detects the luminescence and a monitor that displays luminescent images in real time.

In one aspect, prior to the pretreatment, the organic salt was deactivated by substituting a first counterion with non-spherical and weakly coordinating counterion by ion exchange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1B. Tunable luminescent organic salts have the potential to transform luminescent imaging and photodynamic therapy. Tunable luminescent dyes would enable non-toxic imaging for tumor detection and image-guided surgery. Cancer cells that spread to the lymph nodes can be visualized with indocyanine green (FIG. 1A, prior art image). Dyes can also be tuned to be phototoxic for enhanced PDT without side effects. PDT with PHOTOFRIN® porfimer sodium (FIG. 1B, photofrin.net).

Figure 2C:
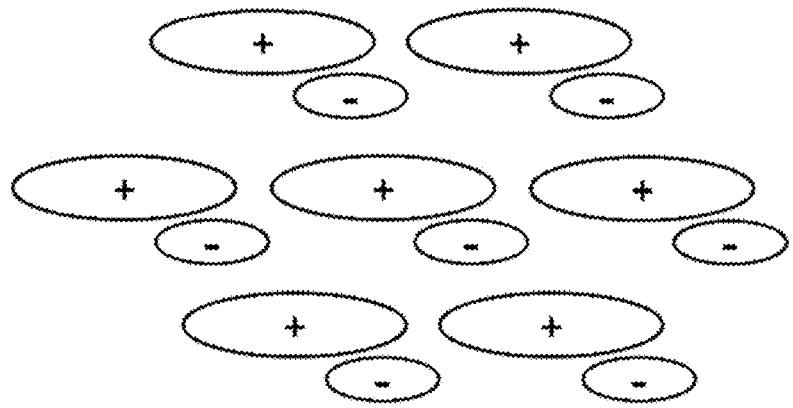

FIGS. 2A-2C. FIG. 2A is a schematic illustration of an exemplary organic salt configuration. FIG. 2B is a schematic illustration of exemplary organic salts tethered to a nanoparticle. FIG. 2C is a schematic illustration of exemplary aggregated particles or nanoparticles of organic salts.

Figure 3:
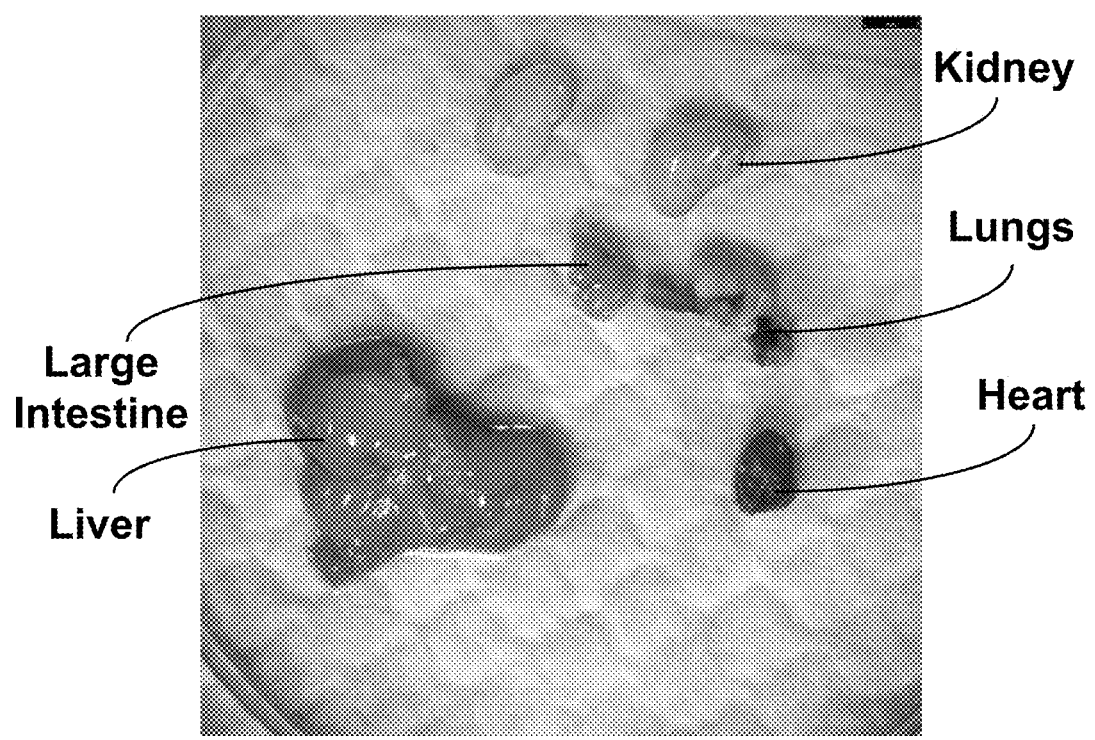

FIG. 3. shows exemplary $CySbF_e$ localization of in organs of interest of a FVB WT mouse. After 96 hours only background levels of organic salt are found in the heart, intestine and lungs, while greater concentrations are found in the liver and the kidneys.

Figure 4:
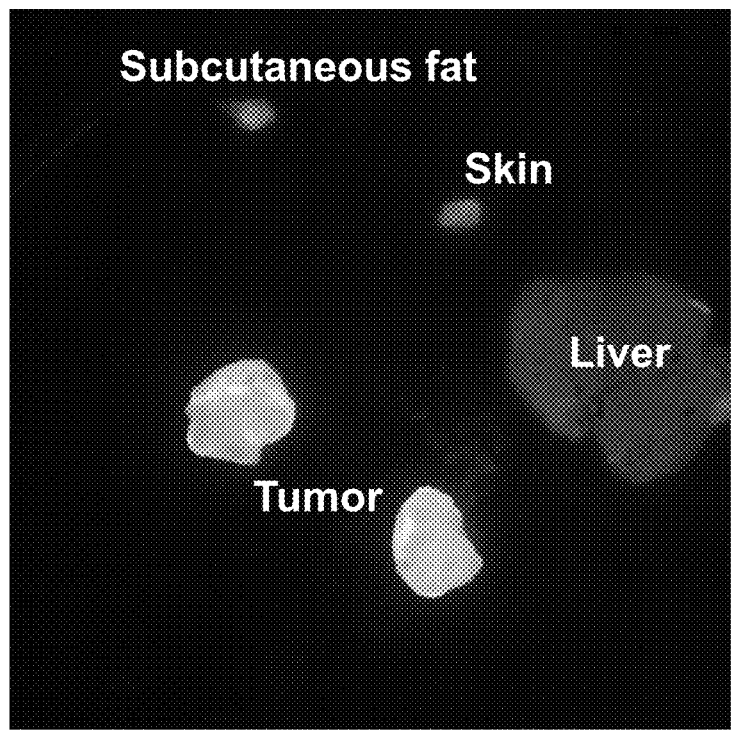

FIG. 4. Shows exemplary $CyPF_6$ localization of in organs of interest in a orthotopic breast cancer mouse model. After 72 hours there is concentration of the organic salt to the tumor (cut in half) in comparison to the other organs of interest (liver, fat, and skin). The differential uptake of the organic salt has benefits both for diagnostic and therapeutic purposes.

Figure 5:
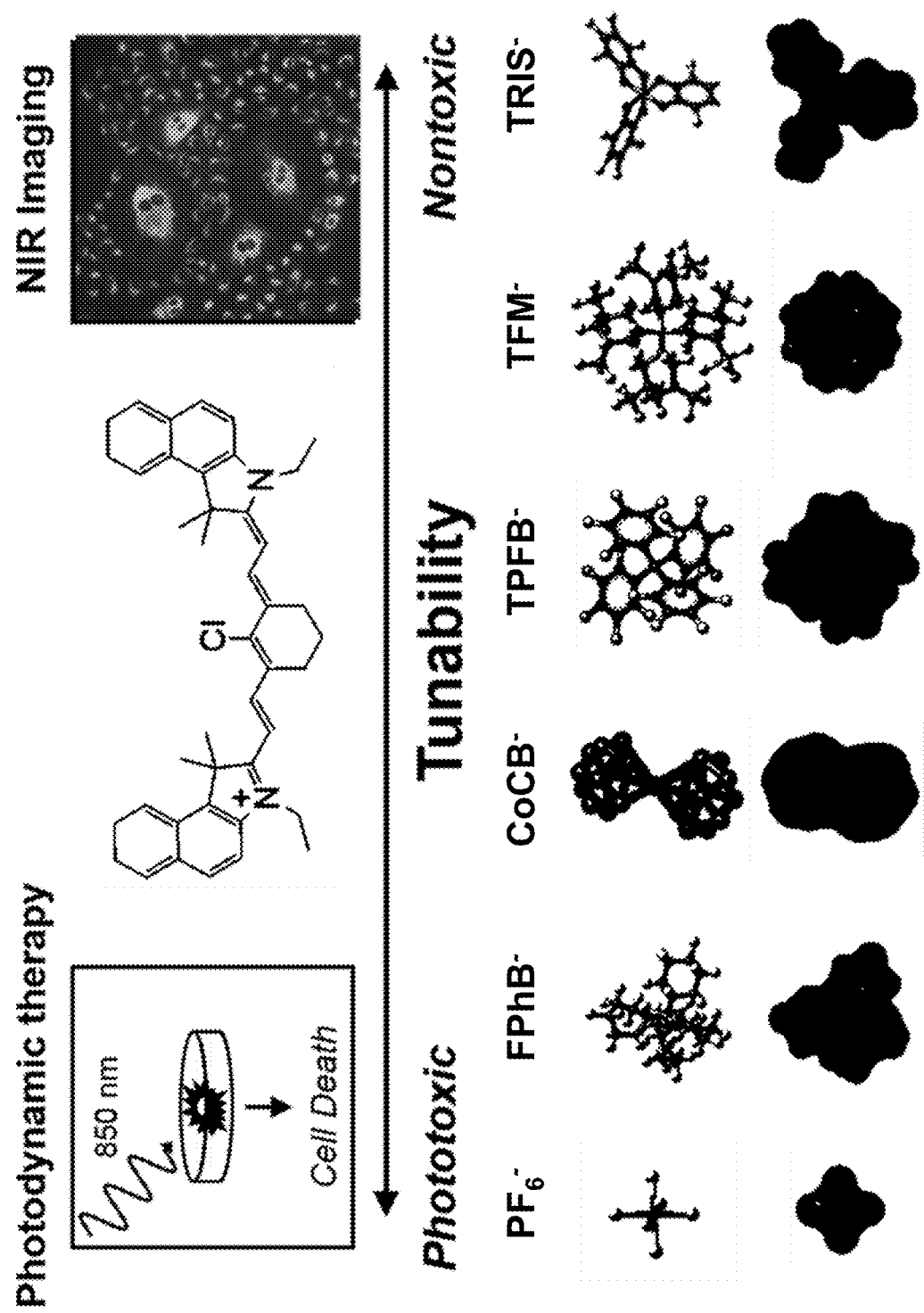

FIG. 5. Optoelectronic tunability in photodynamic therapy and near-infrared (IR) imaging can be achieved by pairing a luminescent cation such as heptamethine cyanine ($Cy^+$) with varying anions. Anions on the left side of the figure enhance phototoxicity of the luminescent cation for applications in photodynamic therapy, and anions on the right side of the figure reduce toxicity for applications in fluorescence imaging. The anions are hexafluorophosphate ($PF_6^-$); tetrakis(4-fluorophenyl)borate ($FPhB^-$); cobalticarborane ($CoCB^-$); tetrakis (pentafluorophenyl) borate ($TPFB^-$); tetrakis[3,5-bis(trifluoro methyl)phenyl]borate ($TFM^-$); and Δ-tris(tetrachloro-1,2-benzene diolato) phosphate(V) ($TRIS^-$).

Figure 6:
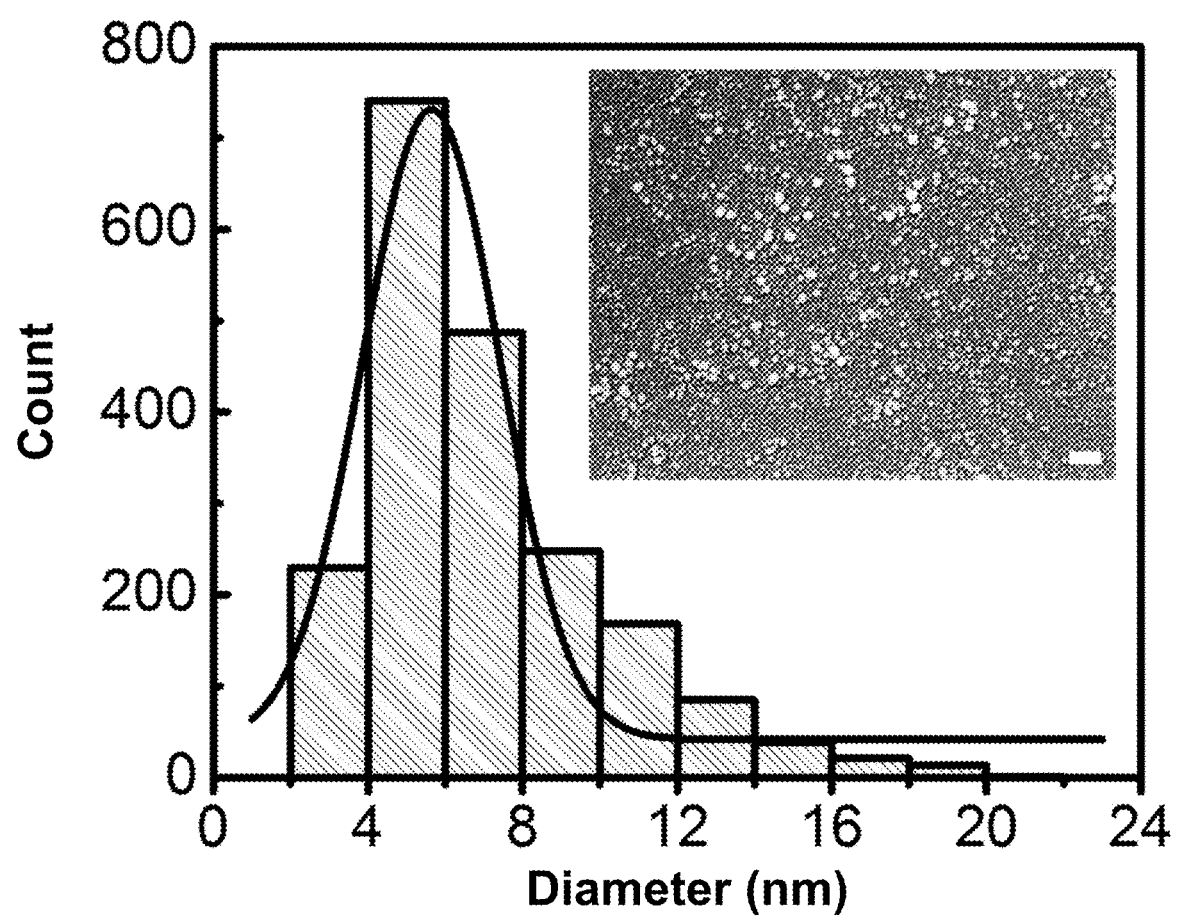

FIG. 6. is a graph showing exemplary nanoparticle aggregation size distribution measured from SEM images (inset, scale bar=100 nm) of CyTPFB. Average aggregate size is 5.6±1.8 nm with no observable precipitation.

Figure 7A:
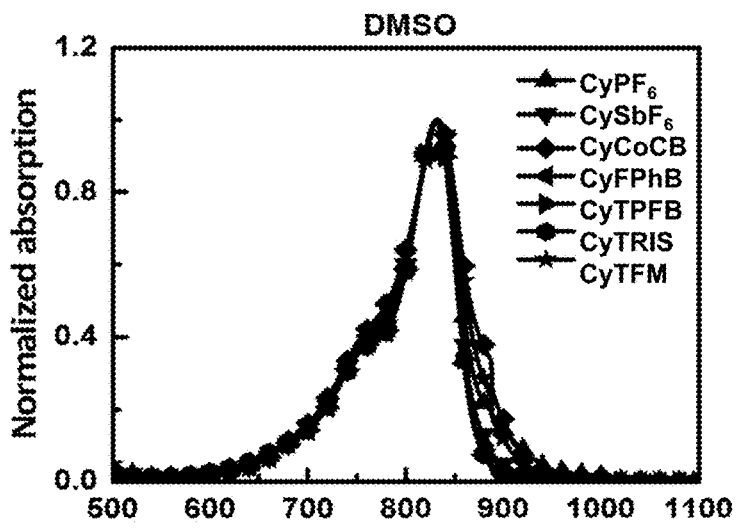
Figure 7B:
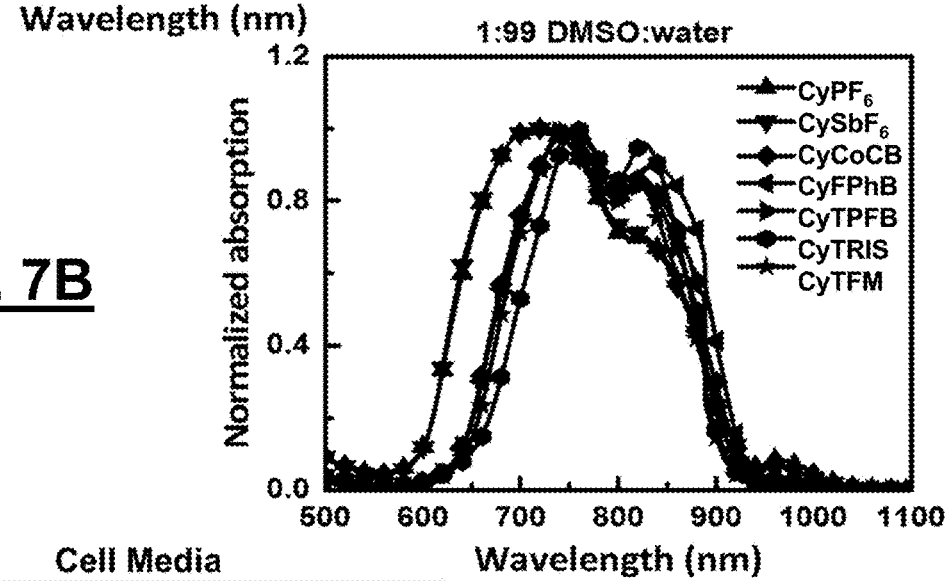
Figure 7C:
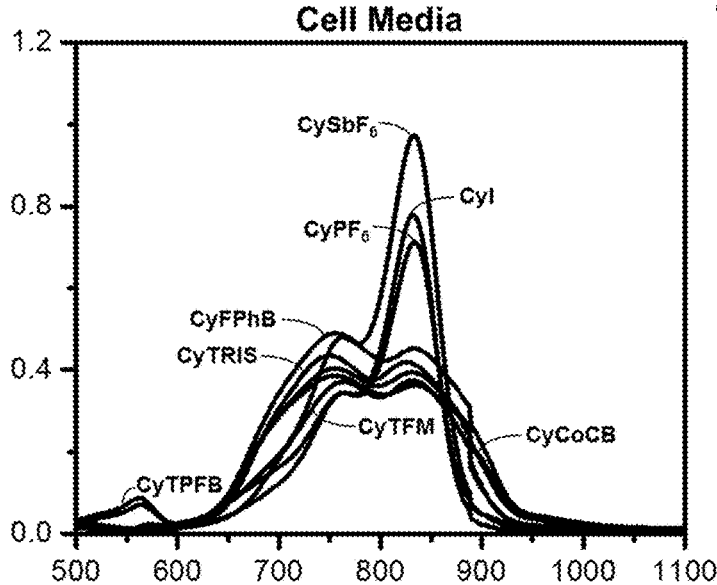

FIGS. 7A-7C. FIG. 7A shows normalized absorption data in dimethylsulfoxide (DMSO) for exemplary organic salts having various anions paired with an exemplary $Cy^+$ cationic dye. FIG. 7B shows normalized absorption data in a mixture of 1% DMSO and 99% water for the same set of exemplary organic salts. Broadening is demonstrated on both sides of the absorption peak. Organic salts were first dissolved in DMSO and then diluted in water, forming nanoparticles. FIG. 7C shows exemplary organic salts dissolved in DMSO that are diluted to 4 µM in cell media and characterized by UV-Vis spectroscopy. Combinations of H- and J-aggregation of organic salts can be seen by blue-shifted peaks (lower wavelength) and red-shifted peaks (higher wavelength), respectively. The nanoparticles with small hard anions redissolve in cell media likely due to sterics.

Figure 8A:
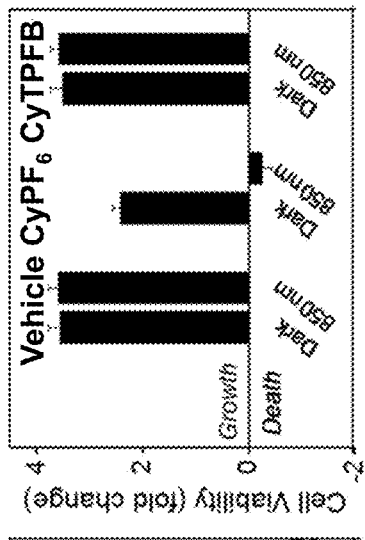
Figure 8B:
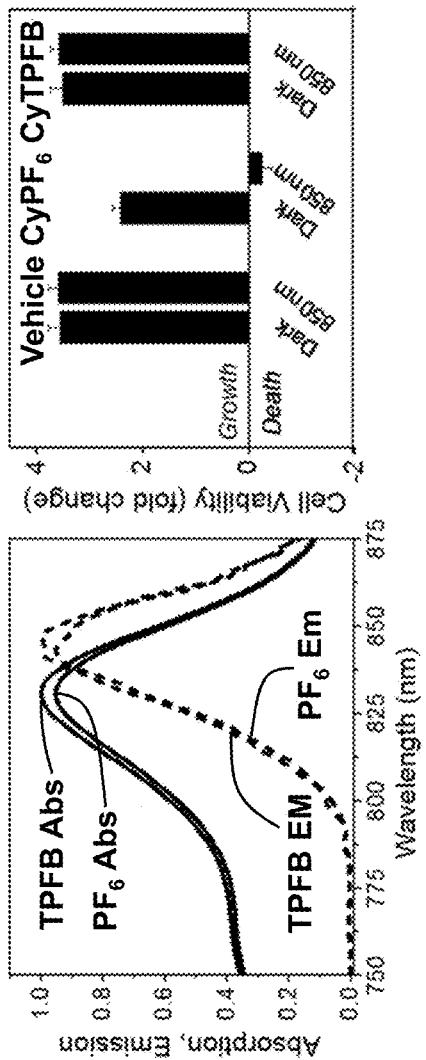
Figure 8C:
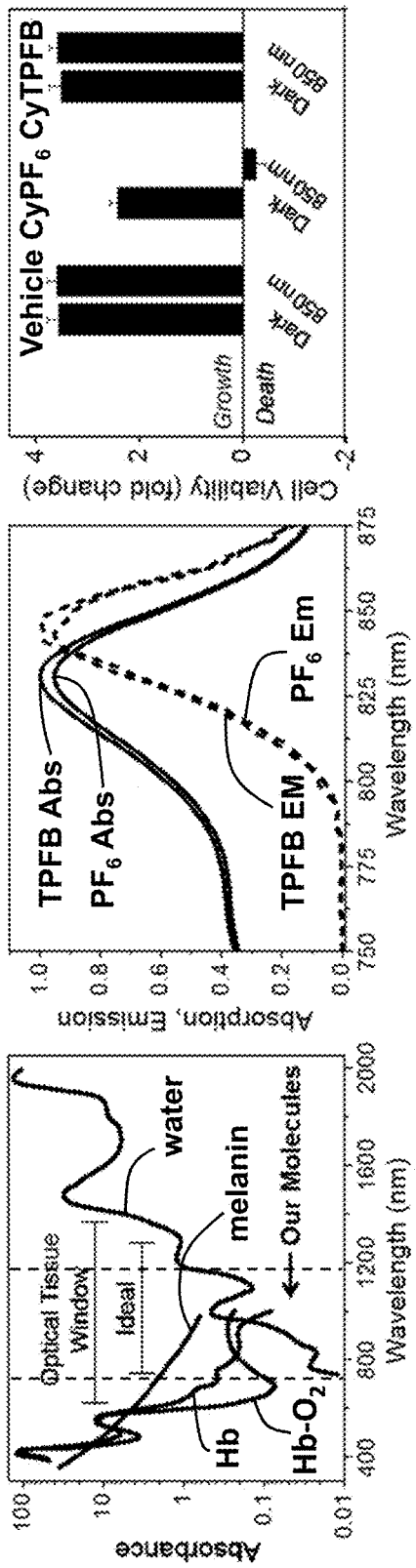

FIGS. 8A-8F. Non-toxic cation-anion pair enhances live cell IR fluorescence imaging. FIG. 8A is a graph showing tunable organic salts absorb and emit in the IR (700-1200 nm) and eliminate background noise from absorbance/emission tissue components such as melanin, water, oxyhemoglobin (Hb-O2) and hemoglobin (Hb). FIG. 8B shows normalized absorption (Abs) and emission (Em) spectra of $CyPF_6$ and CyTPFB. FIG. 8C is a graph showing that $CyPF_6$ is toxic both in the dark and under IR (850 nm) illumination in eukaryotic cells (A549 cell line), while CyTPFB is not toxic at even 20 fold the concentration of $CyPF_6$. A549 cells were incubated with vehicle, 1 µM $CyPF_6$, or 1 µM CyTPFB with or without IR (850 nm) excitation. Cell viability determined by trypan blue staining and cell counting. (D) CyTPFB staining in A549 cells. (E) DNA staining using 4',6-diamidino-2-phenylindole (DAPI). (F) Superimposed CyTPFB+DAPI staining.

Figure 9A:
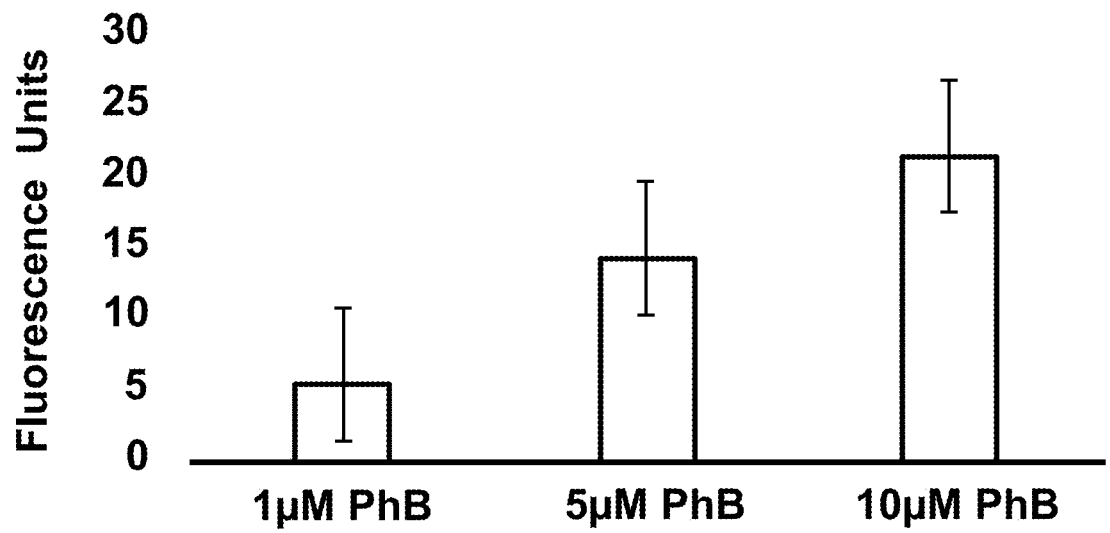
Figure 9B:
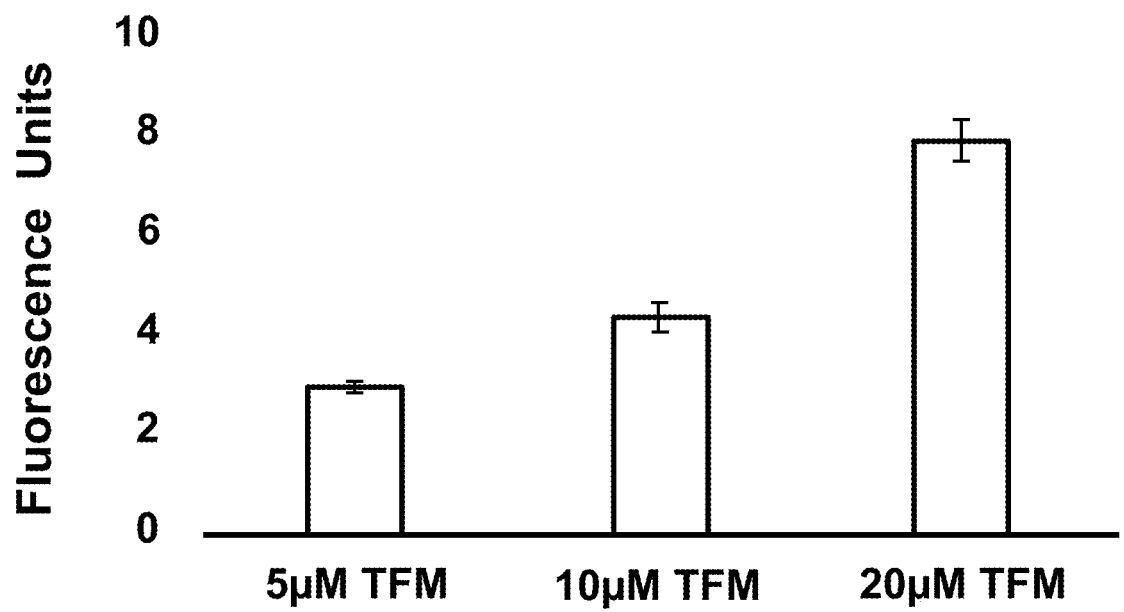

FIGS. 9A-9B. Fluorescence intensity increases in exemplary A549 cells in a concentration dependent manner. In FIG. 9A cells dosed with a range of CyPhB show increasing fluorescence that corresponds with the dosage of the organic salt. In FIG. 9B, cells dosed with a range of CyTFM show increasing fluorescence that corresponds with the dosage of the organic salt.

Figure 10:
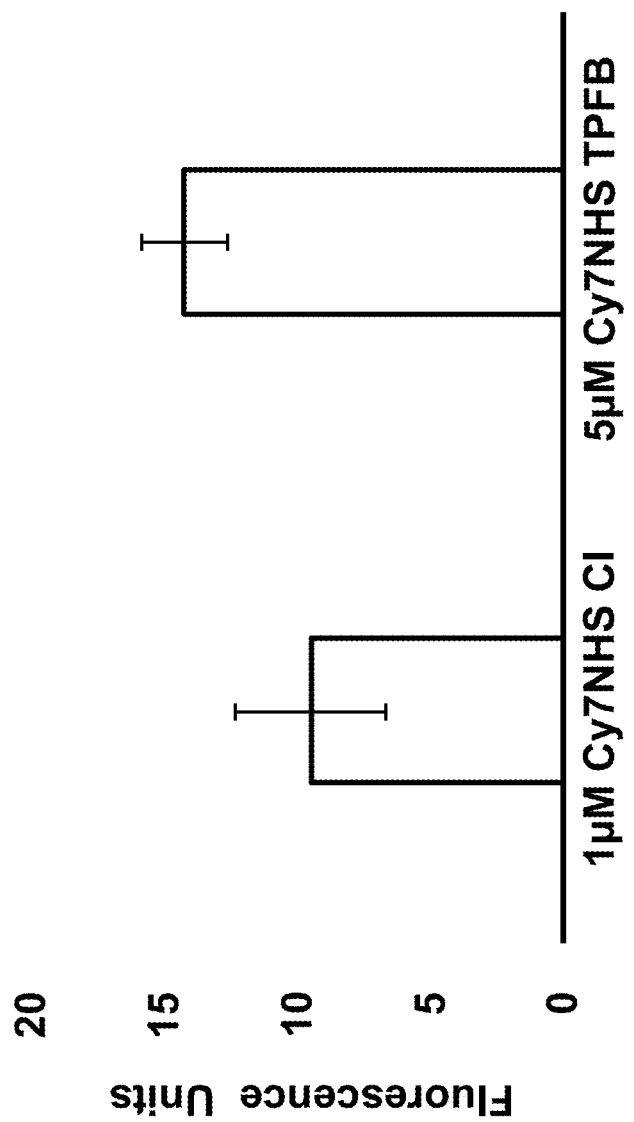

FIG. 10. shows that fluorescence intensity is increased when exemplary A549 cells receive a higher dosage at the cytotoxic limit of the anion-cation pairing. However, $Cy7NHS^+$ is less toxic when paired with $TPFB^-$ which allows for a higher dosage (5 µM) which leads to a 50% increase in brightness when compared to $Cy7NHS^+$ when paired with its commercial counterion Cl—.

Figures 11A, 11B:
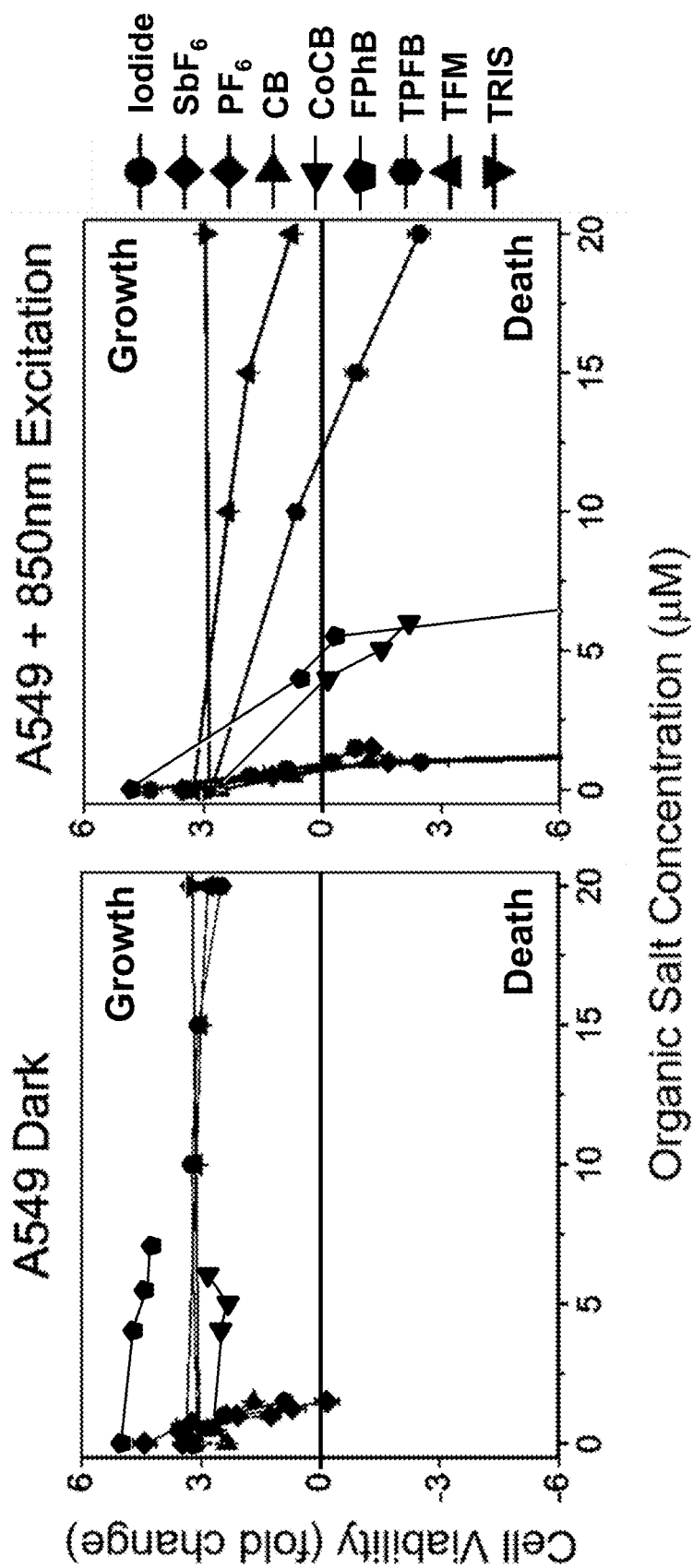

FIGS. 11A-11B. Organic salts with tunable toxicity can be used to target human lung cancer (A549) cells. Toxicity of photoactive cation heptamethine cyanine ($Cy^+$) is tuned with anion pairing. A549 cells are incubated with luminescent organic salts with (FIG. 11A) or without (FIG. 11B) IR (850 nm) excitation. Cell viability is determined by trypan blue staining and cell counting.

Figures 12A, 12B:
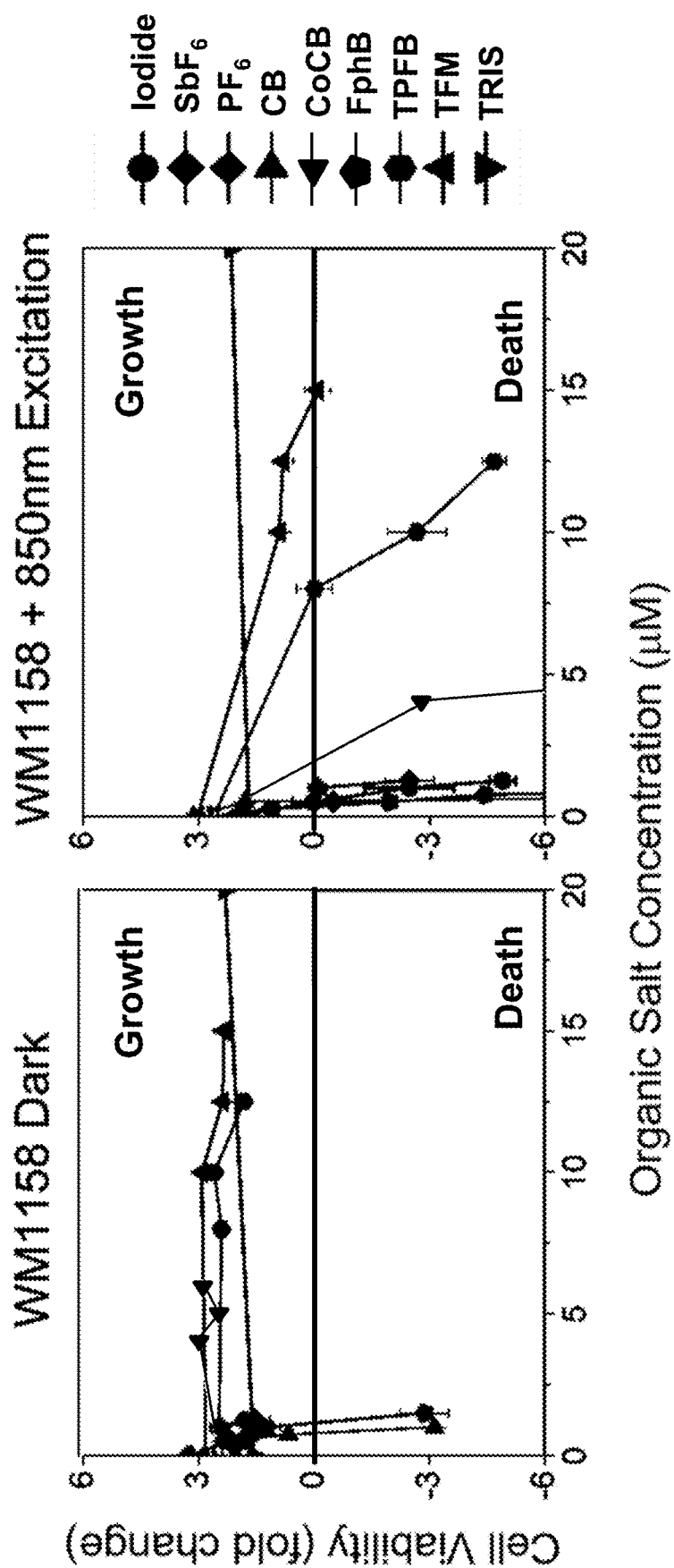

FIGS. 12A-12B. Organic salts with tunable toxicity can be used to target human melanoma (WM1158) cells. Toxicity of photoactive cation heptamethine cyanine (Cy$^+$) is tuned with anion pairing. WM1158 cells are incubated with luminescent organic salts with (FIG. 12A) or without (FIG. 12B) IR (850 nm) excitation. Cell viability is determined by trypan blue staining and cell counting.

Figure 13:
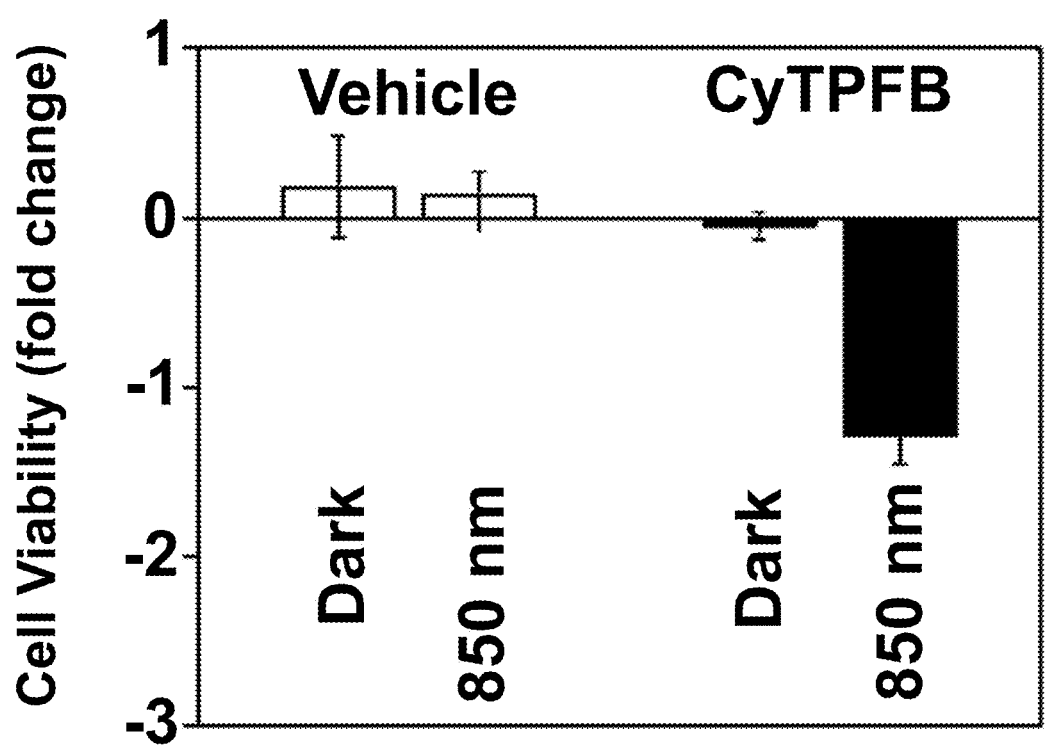

FIG. 13. Organic salts can be used to target drug resistant cancer cells. Sk-Mel-28 Vem$^R$ (drug resistant human melanoma cell line) is incubated with CyTPFB with or without IR (850 nm) excitation. Cell viability is determined by trypan blue staining and cell counting FIGS. 14A-14D. Non-toxic novel and commercial exemplary fluorescent dyes can be tuned to be non-toxic for brighter imaging. In FIG. 14A, novel fluorescent cation Cy+ paired with PF6$^-$ is cytotoxic at low concentrations (1.6 µM), leading to dim images. However, as seen in FIG. 14B, Cy$^+$ paired with TPFB$^-$ is non-toxic even at greater than 75× concentrations (126 µM) and provides brighter images. As shown in FIG. 14C, commercially available Cy7 is cytotoxic at 1 µM and provides dim images. In FIG. 14D, when Cy7 is paired with counterion TPFB$^-$, it also becomes non-toxic at higher concentrations (6 µM) and provides brighter images.

Figure 15A:
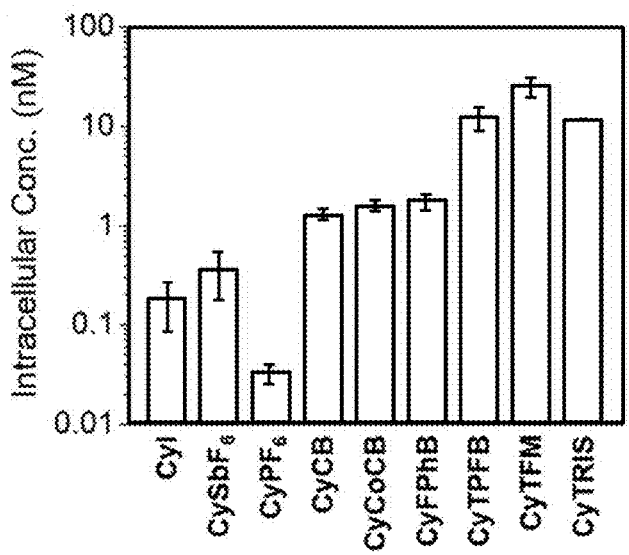
Figure 15B:
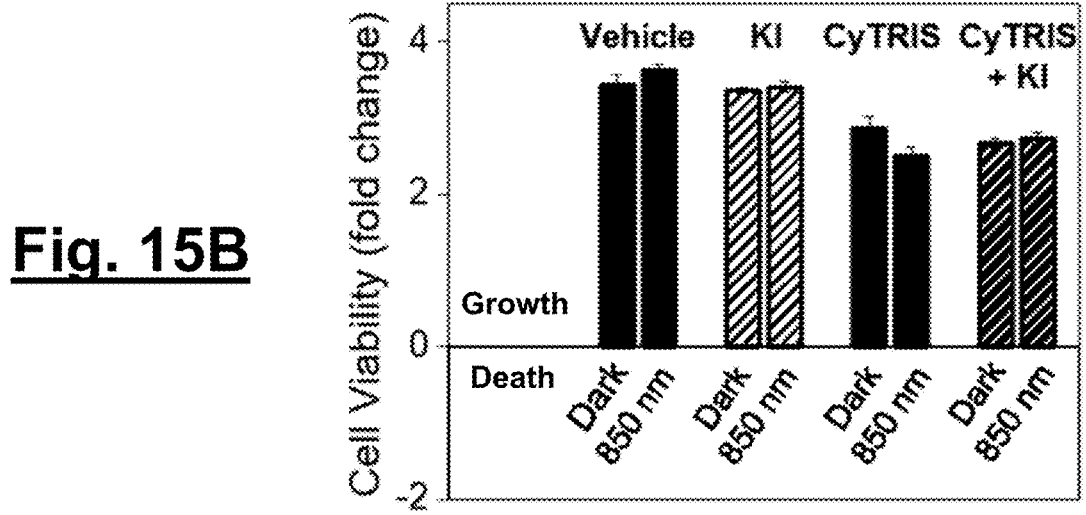
Figure 15C:
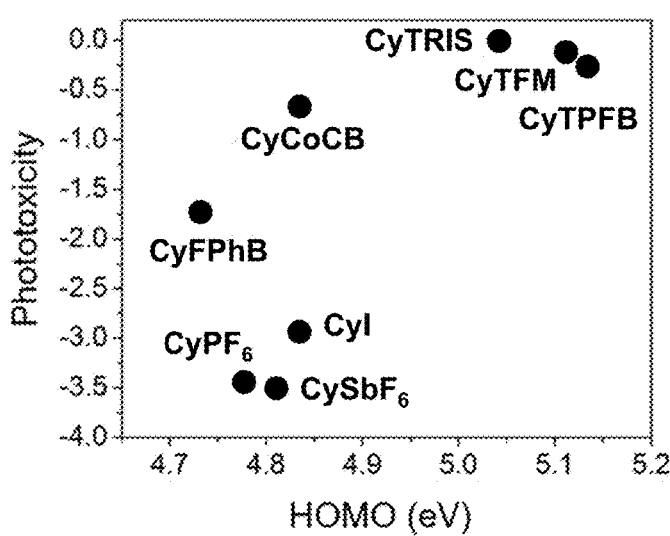

FIGS. 15A-15C. Tunability in phototoxicity is likely due to energy levels of organic salts, not cellular accumulation or anion toxicity. FIG. 15A is a graph showing intracellular organic salt accumulation by A549 cells determined using ultrahigh performance liquid chromatography-mass spectrometry. In all cases, cells are incubated with 1 µM of indicated organic salt for 24 h. FIG. 15B is a graph showing that iodide (I$^-$) is not toxic when paired with potassium (K$^+$), and KI addition does not make CyTRIS toxic in eukaryotic cells. A549 cells are incubated with vehicle, 1 µM KI, or 30 µM CyTRIS with or without IR (850 nm) excitation. Cell viability is determined by trypan blue staining and cell counting. FIG. 15C is a graph, wherein the slope of the cell viability fold change over organic salt concentration is positively correlated with the energy level of the organic salt highest occupied molecular orbital (HOMO) estimated from correlations between ultraviolet photoemission spectroscopy and solar cell devices.

Figure 16:
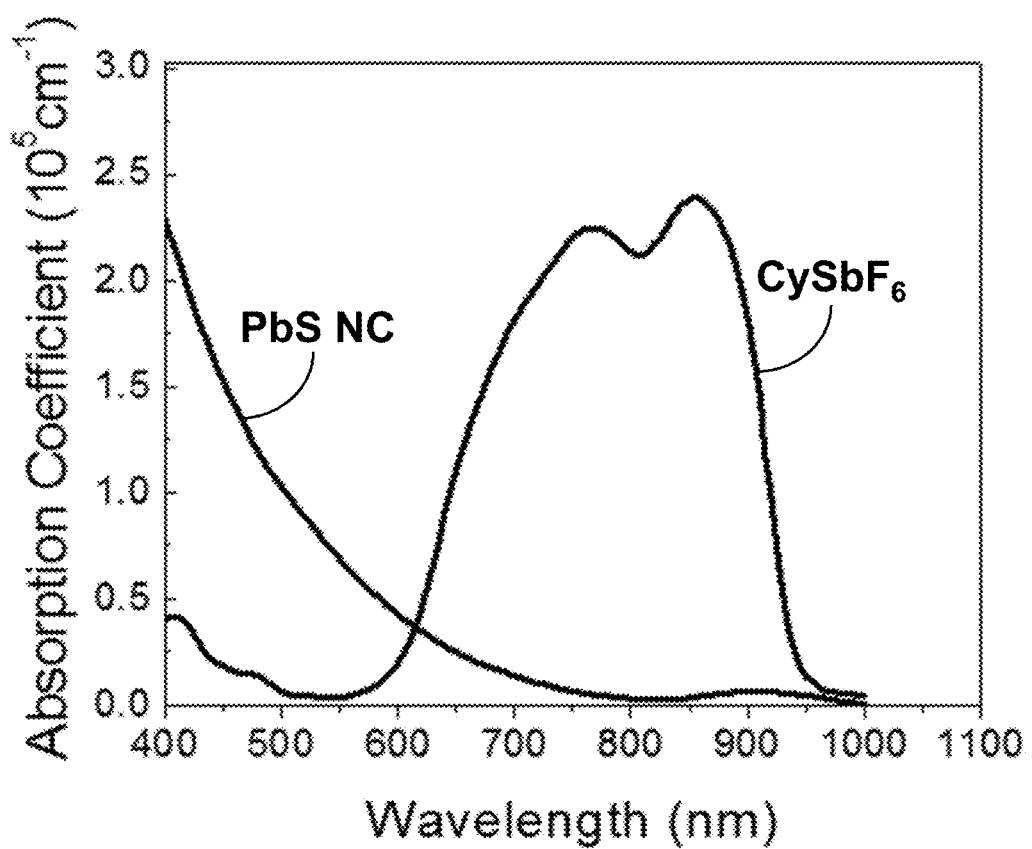

FIG. 16. shows an graph of absorption coefficient v. wavelength comparison for an exemplary organic salt and nanocrystal with similar bandgap.

Figure 17:
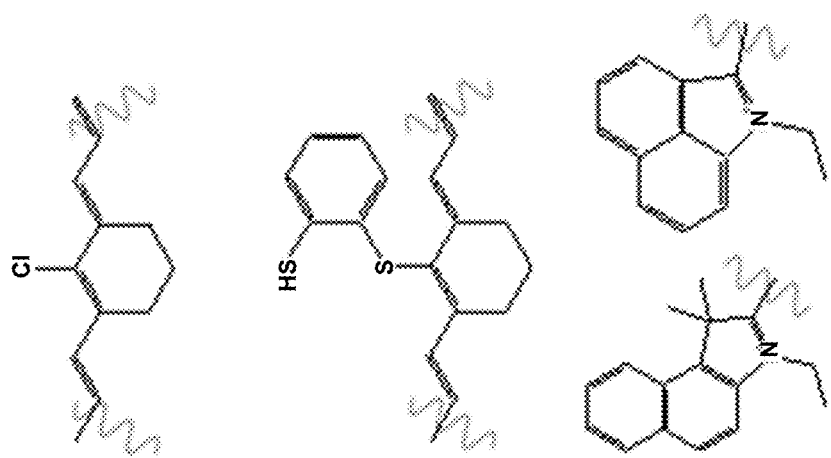
Figure 17:
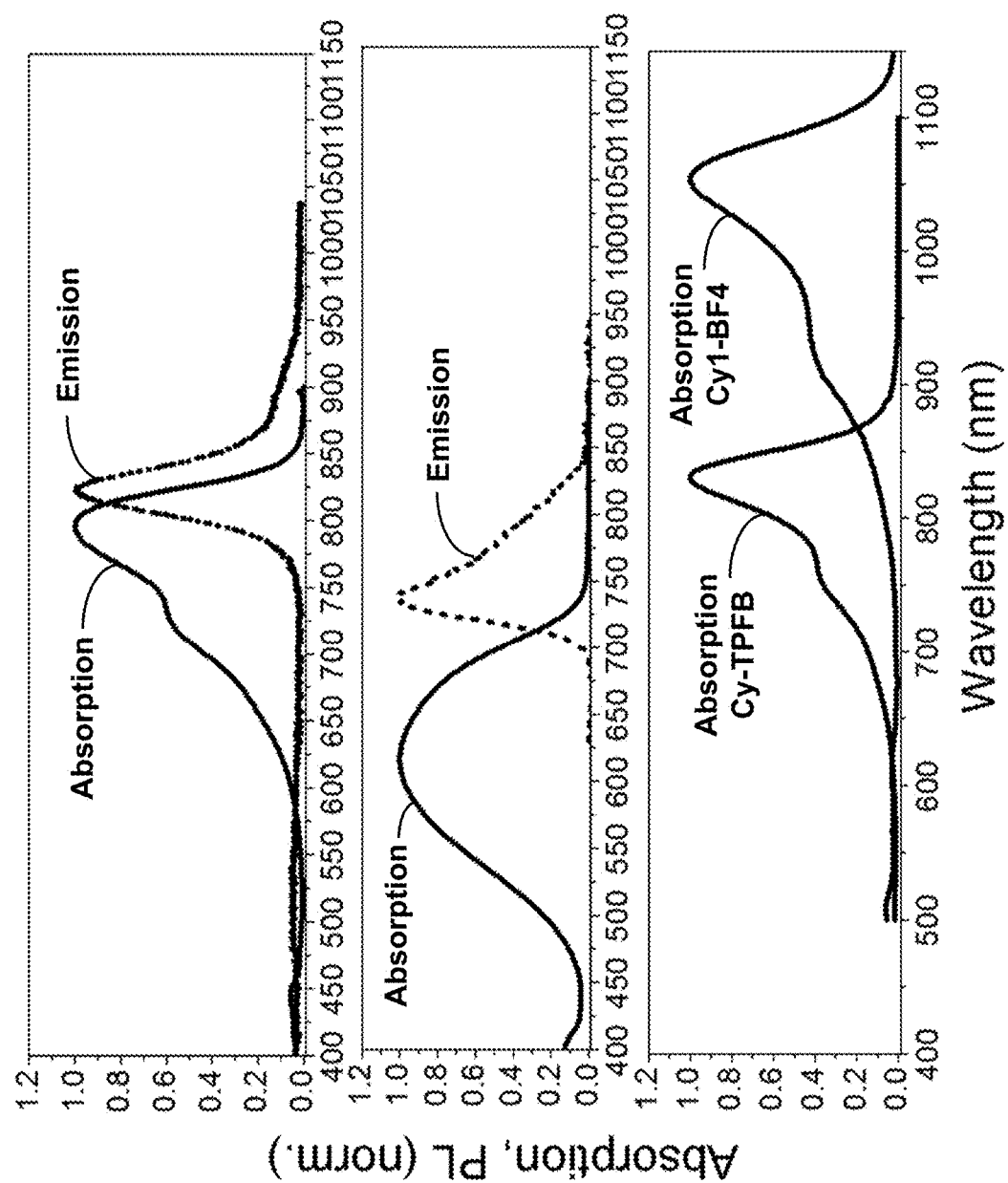

FIG. 17. A Stokes shift of an organic salt can be increased by modification of the luminescent cation. Heptamethine analog of Cy$^+$ (top panel) modified via S$_N$2 reaction on a central methane backbone induces a large absorption blueshift (middle panel) that results in an enhanced Stokes shift. Such modifications can be made to deeper-IR absorbing methines to increase Stokes shifts while keeping absorbance in the IR range (bottom panel).

Figure 18:
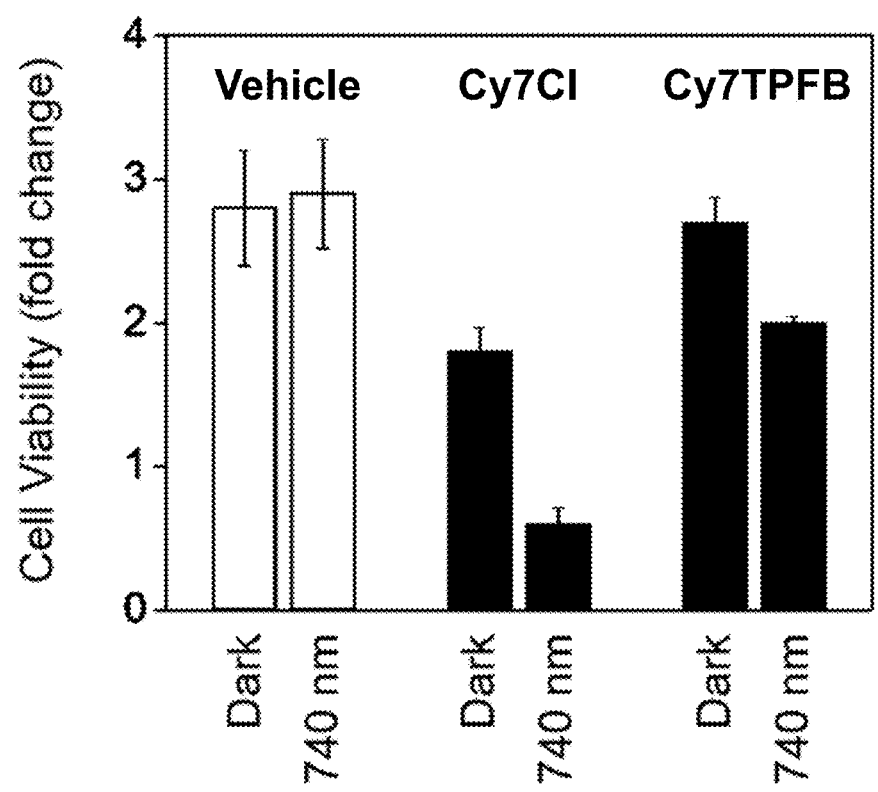

FIG. 18. Commercially available fluorophore Cy7 (Lumiprobe) can be tuned for toxicity via counterion pairing. FIG. 18 is a graph showing the toxicity of Cy7 in cells can be decreased by pairing with counterion TPFB$^-$. A549 cells are incubated with vehicle, 1 µMCy7Cl, or 1 µM Cy7TPFB with or without IR (740 nm) excitation. Cell viability determined by trypan blue staining and cell counting.

Figure 19A:
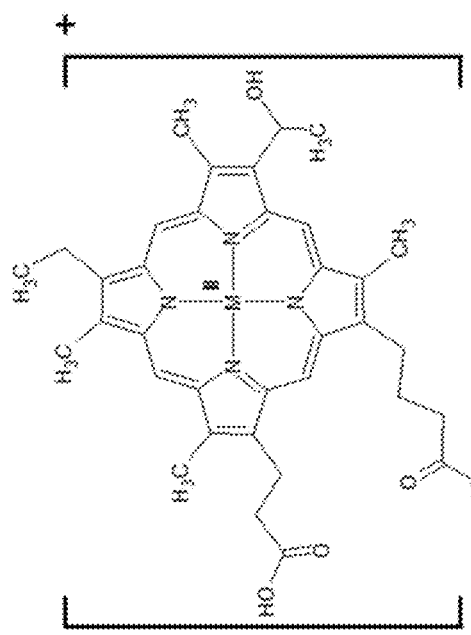
Figure 19B:
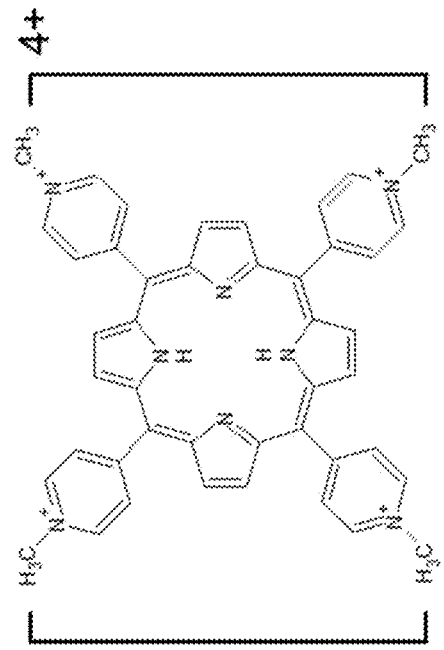
Figure 19C:
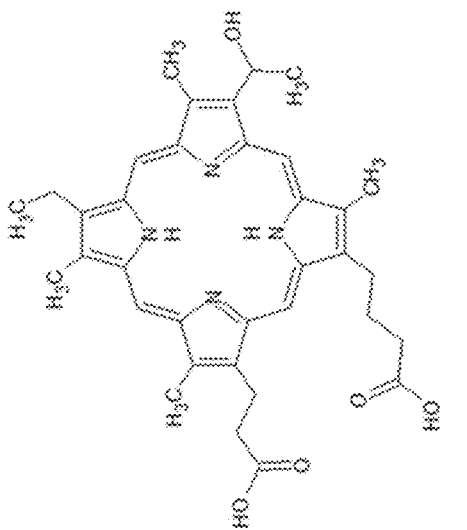
Figure 19D:
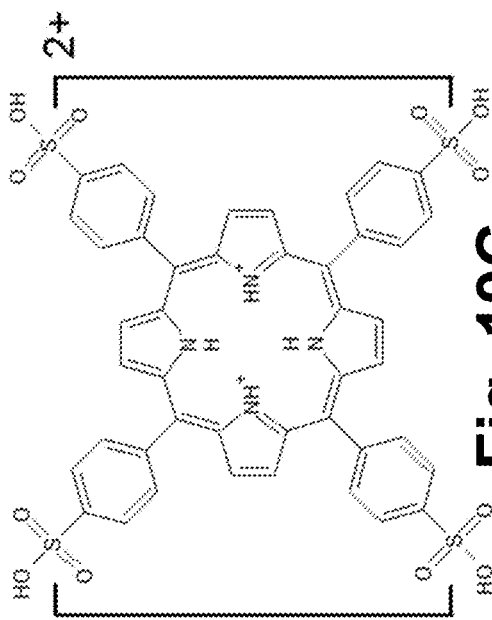

FIGS. 19A-19D. Photofrin and its analogs can be converted into cations for pairing with tunable anions. FIG. 19A shows a PHOTOFRIN® porfimer sodium monomer. FIG. 19B shows that a metal can be added to the core of PHOTOFRIN® porfimer sodium for conversion into a salt cation. FIGS. 19C and 19D show commercially available PHOTOFRIN® porfimer sodium-like derivatives with varying degrees of charge that are utilized to explore the impact of anion concentration.

Figure 20A:
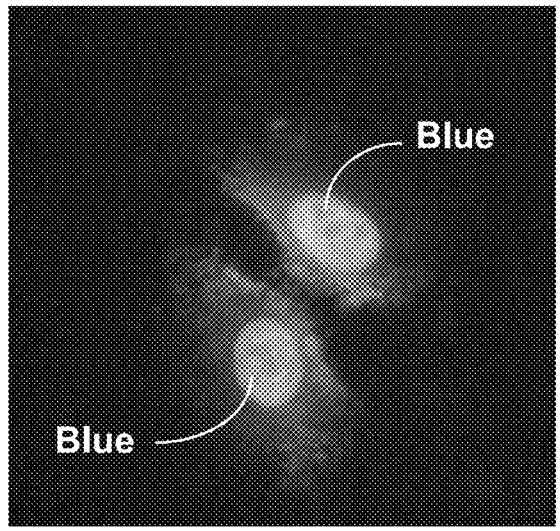
Figure 20B:
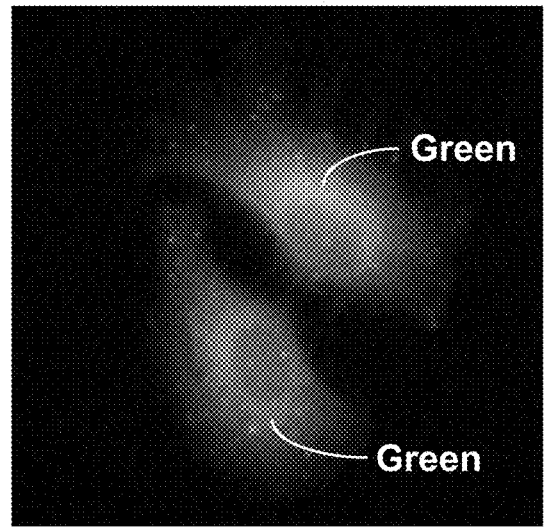
Figure 20C:
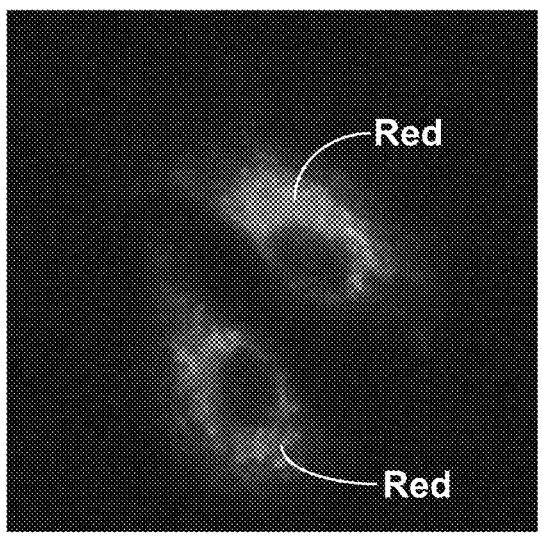
Figure 20D:
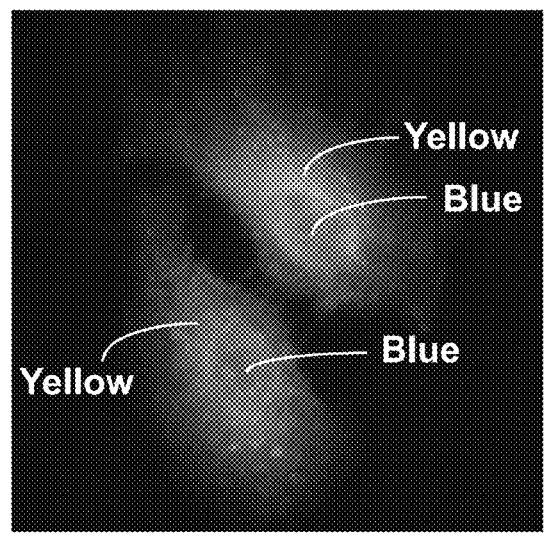

FIGS. 20A-20D. Exemplary fluorescent organic salts preferentially accumulate in the mitochondria and lysosomes of cells. A549 cells are treated with 1 µM CyPF6. FIG. 20A shows DNA staining using 4',6-diamidino-2-phenylindole (DAPI). FIG. 20B shows mitochondrial staining using Rhodamine 123 (Rho123). FIG. 20C shows CyPF$_6$ staining. FIG. 20D shows superimposed CyPF$_6$+DAPI+Rho123 staining.

Figure 21:
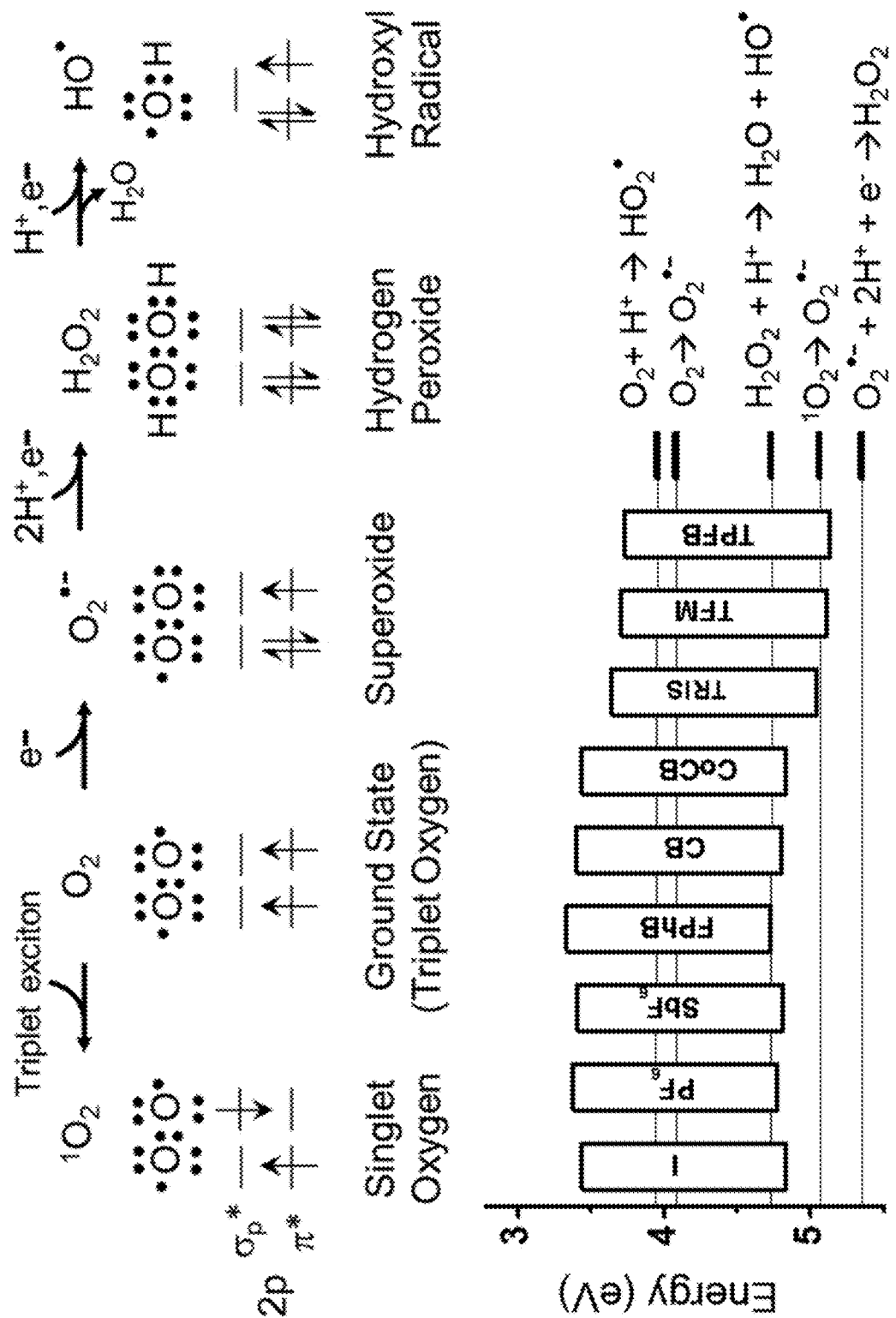

FIG. 21. Different cation-anion pairs of organic salts are resonant with distinct reactive oxygen species (ROS). FIG. 21 shows examples of ROS and their formation, but many other species and routes of formation also exist. For A549 cells, CyFPhB appears to be the most phototoxic based on HOMO resonance. This HOMO resonance could be cancer-type specific as changes in cellular pH and mitochondrial function, for example, can shift redox potentials for ROS generation.

Figure 22:
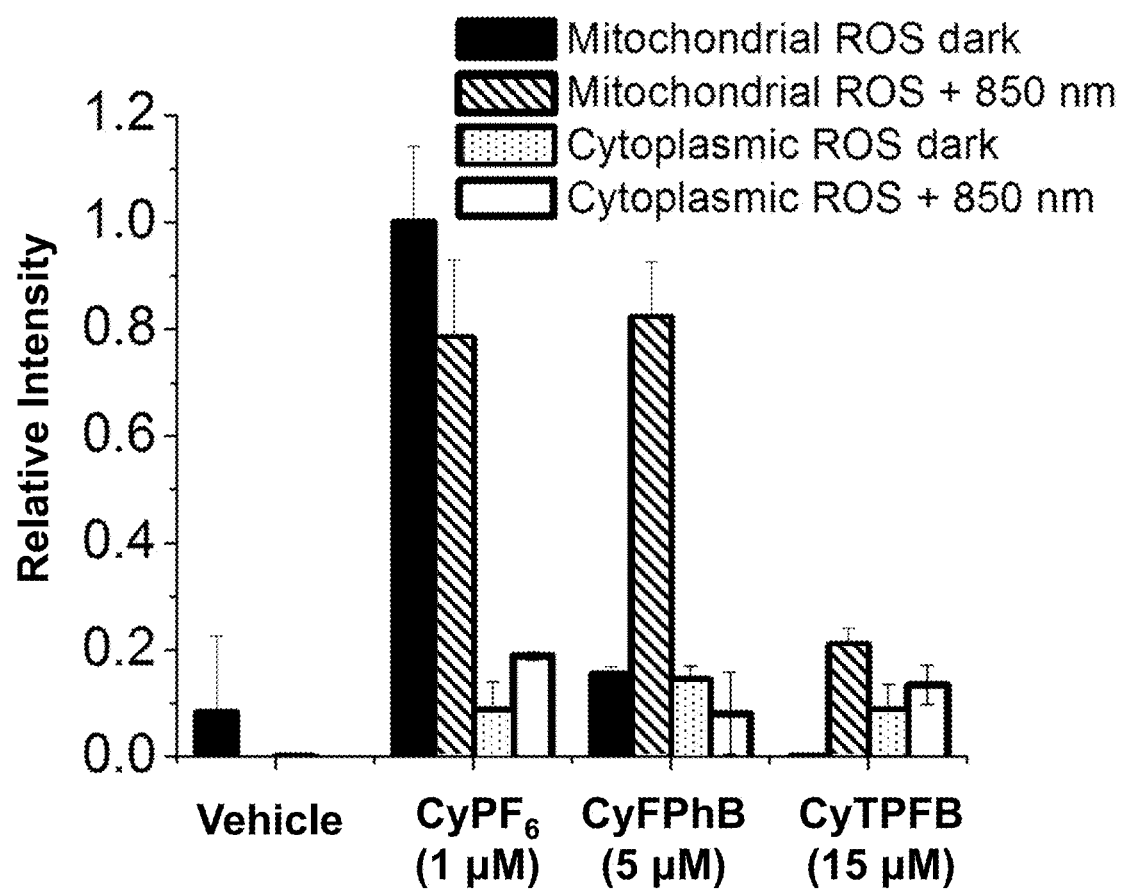

FIG. 22. Luminescent organic salts generate mitochondrial ROS. FIG. 22 is a bar graph showing that CyPF$_6$ is cytotoxic, catalyzing superoxide with or without light; CyFPhB is phototoxic but not cytotoxic, photo-generating ROS only with illumination; and CyTPFB is non-toxic, generating minimal ROS even with light at high concentrations. MitoSOX is used to measure mitochondrial superoxide, and H2DCFDA for general cytoplasmic ROS in A549 cell treated with organic salts at indicated phototoxic concentrations for 4 days.

Figures 23A, 23B:
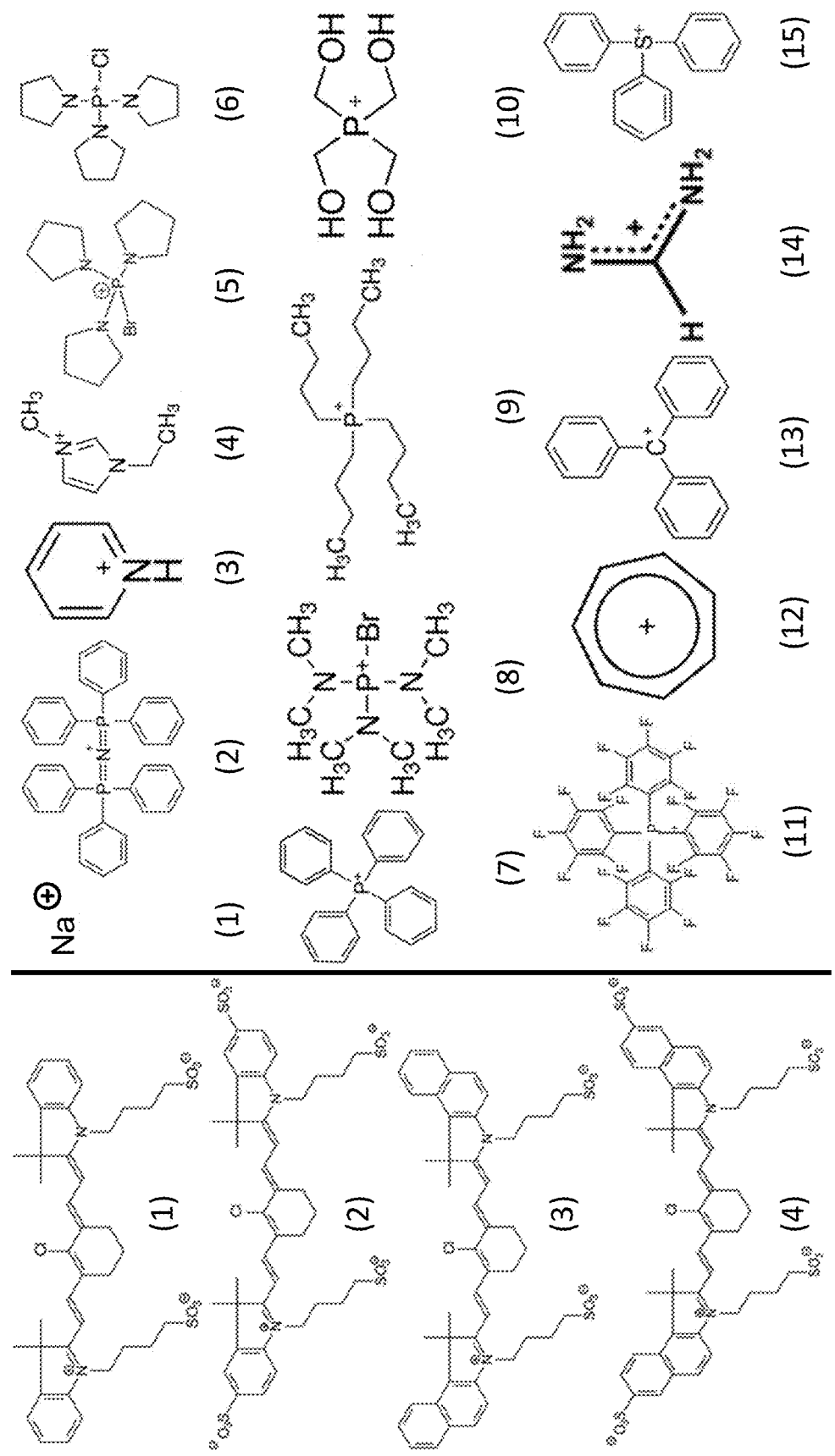

FIGS. 23A-23B. FIG. 23A shows exemplary anionic heptamethines: (1) 783$^-$, (2) 789$^{-3}$, (3) 820$^-$, (4) 823$^{-3}$. FIG. 23B shows exemplary cationic counterions: (1) Sodium ion, (2) Bis(triphenylphosphoranylidene)ammonium, (3) Pyridinium, (4) 1-Ethyl-3-methylimidazolium, (5) Bromotripyrrolidinophosphonium, (6) Chlorotripyrrolidinophosphonium, (7) Tetraphenylphosphonium, (8) Bromotris (dimethylamino)phosphonium, (9) Tetrabutylphosphonium, (10) Tetrakis(hydroxymethyl)phosphonium, (11) Tetrakis (pentafluorophenyl)phosphonium, (12) Tropylium, (13) Tritylium, (14) Formamidine, (15) Triphenylsulfonium.

Figure 24A:
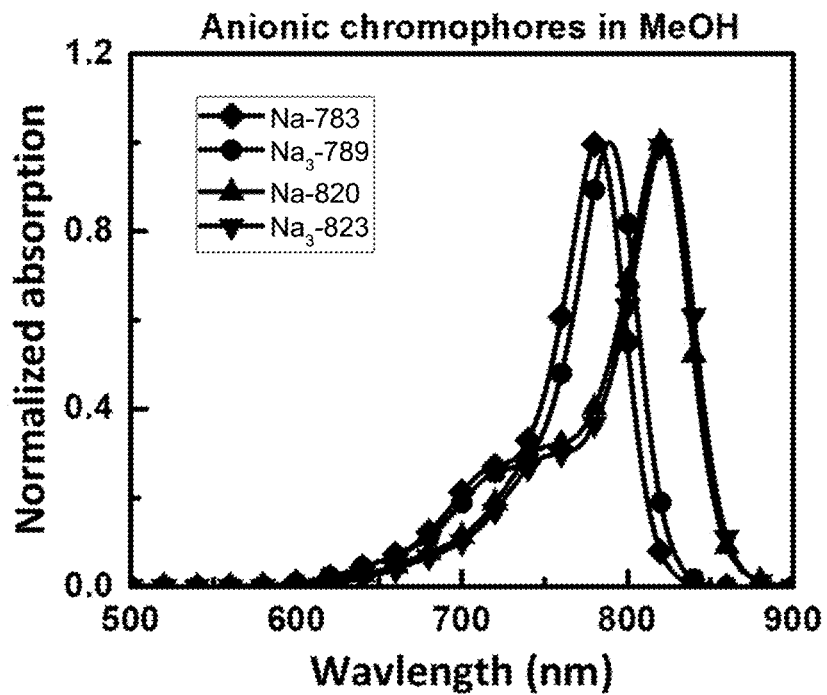
Figure 24B:
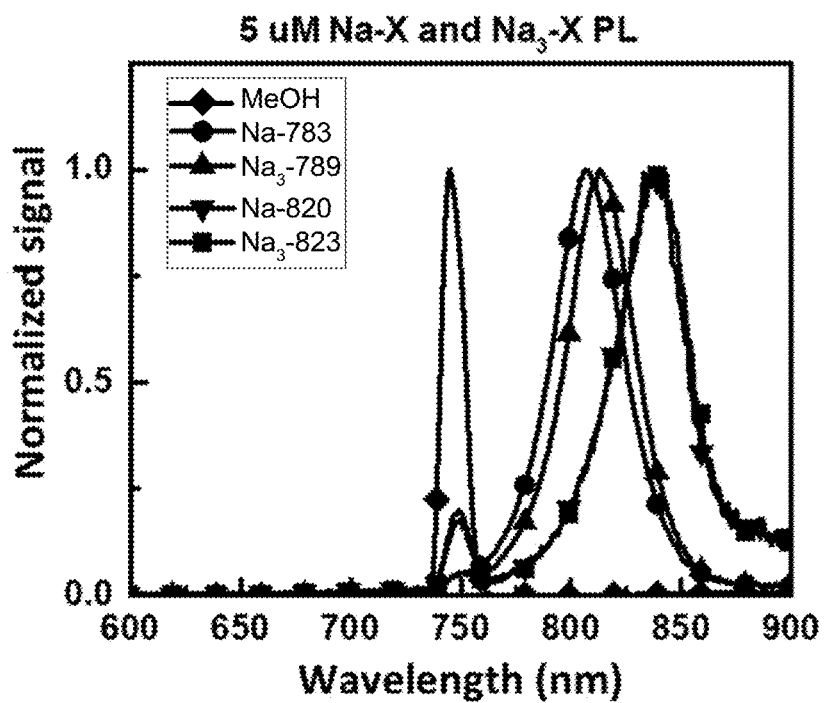
Figure 24C:
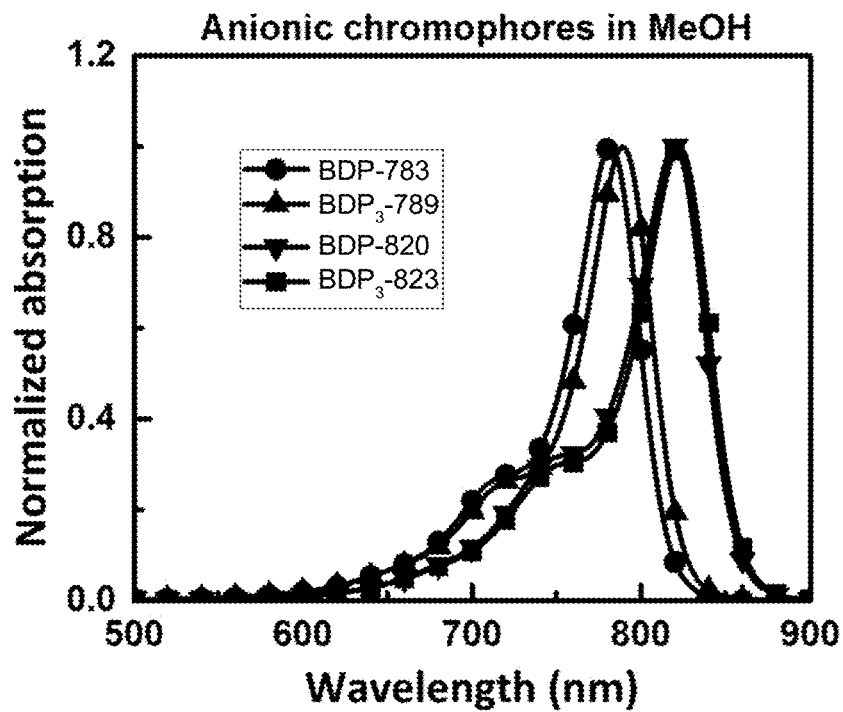
Figure 24D:
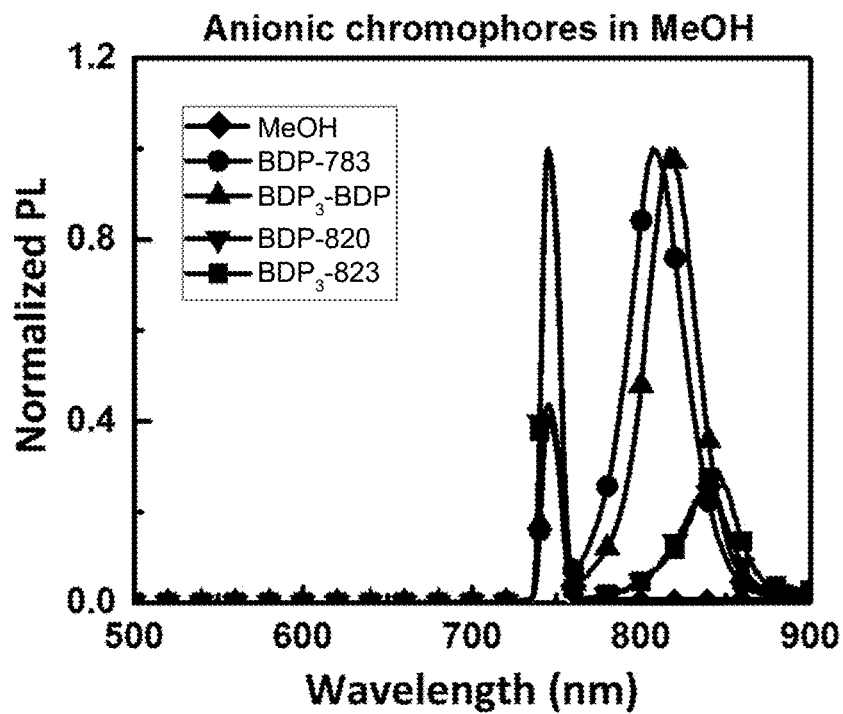

FIGS. 24A-24D FIGS. 24A and 24B show optical data for exemplary organic salts pairing anionic heptamethines with sodium cations. FIG. 24A shows normalized absorption curves for the organic salts in methanol (MeOH). FIG. 24B shows normalized photoluminescence (PL) data in MeOH. FIGS. 24C and 24D show optical data for exemplary organic salts pairing anionic heptamethines with bromotris(dimethylamino)phosphonium (BDP) cations. FIG. 24C shows normalized absorption curves for the organic salts in methanol (MeOH). FIG. 24D shows normalized photoluminescence (PL) data in MeOH Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and B.

Example embodiments will now be described more fully with reference to the accompanying drawings.

Current fluorescent dyes lack optoelectronic control, preventing independent control of optical properties from electronic properties. In biomedical applications, inadequate optoelectronic control leads to low concentration, low brightness, and non-specific toxicity in live cells. To overcome these limitations, a platform for optoelectronic tuning of fluorescent and luminescent organic salts through unique cation-anion interactions is developed. Luminescent ions that provide the optical properties (excitation/emission) have been coupled with counterions that independently modulate molecular orbital energies. Unique ion-counterion pairs can be used to image or target, for example, tissues, including normal tissues, drug-sensitive cancer tissues, and drug-resistant cancer tissues. Through counterion pairing, unencapsulated luminescent ions can be tuned to be either non-toxic for enhanced imaging, or phototoxic for improved photodynamic therapy Compositions The current technology provides compositions that are suitable for at least one of photodynamic therapy (PDT) and cell/tissue imaging. The compositions comprise an organic salt having a photoactive ion and a counterion. As used herein, the term "photoactive" refers to a molecule or compound, in particular, an ion, capable of chemical or physical change in response to illumination, such as at, for example, wavelengths of greater than or equal to about 350 nm. In particular, photoactive ions absorb light at particular wavelengths, which excites an electron and induces the chemical or physical change. At the same time, the energy of the excited electron and a hole is modulated by the counterion. In various aspects of the current technology, a photoactive ion that absorbs light having a particular wavelength becomes excited. As used herein, "exciting" an organic salt refers to promoting an electron from a lower-energy occupied orbital to a higher-energy empty orbital resulting in an excited state organic salt. Accordingly, an "excited organic salt" is an organic salt comprising a photoactive ion with at least one electron in an excited state as a result of light absorption. In various embodiments, the photoactive ion is excited when it absorbs visible or infrared (IR) light. In some embodiments, the excited ion luminesces (more specifically, fluoresces), i.e., emits visible light or IR light. As used herein "visible light" is light having a wavelength of from greater than or equal to about 400 nm to less than or equal to about 700 nm and "IR light" is light having a wavelength of greater than or equal to about 700 nm to less than or equal to about 1 mm. As used herein, "IR" light includes near-infrared (NIR) light.

The organic salt has a Stokes shift of greater than or equal to about 10 nm, greater than or equal to about 25 nm, greater than or equal to about 50 nm, greater than or equal to about 75 nm, or greater than or equal to about 100 nm. Additionally, or alternatively, the organic salt has a bandgap of greater than 0 eV to less than or equal to 1.8 eV, or a bandgap of less than or equal to about 1.8 eV. For example, an organic salt without a bandgap, i.e., a bandgap of 0, is a conductive organic salt that acts like a metal or a semimetal. Accordingly, in various embodiments, the organic salt has a bandgap of about 0 eV, about 0.2 eV, about 0.4 eV, about 0.6 eV, about 0.8 eV, about 1.0 eV, about 1.2 eV, about 1.4 eV, about 1.6 eV, about 1.8 eV.

In various embodiments, the organic salt is an ion-counterion pair (a "pair"), an aggregate (at least two pairs), or a nanoparticle as depicted in FIG. 2C. However, it is understood that wherein some embodiments the photoactive ion is a cation and the counterion is an anion, in other embodiments, the photoactive ion is an anion and the counterion is a cation. The organic salt is in the form of a pair, an aggregate or a nanoparticle when it is located in a cell (i.e., in cytosol), in an extracellular environment or matrix, or in a cell culture medium. The nanoparticles have a diameter of greater than or equal to about 0.5 nm to less than or equal to about 100 nm, greater than or equal to about 0.5 nm to less than or equal to about 75 nm, greater than or equal to about 0.5 nm to less than or equal to about 50 nm, greater than or equal to about 0.5 nm to less than or equal to about 25 nm, or greater than or equal to about 0.5 nm to less than or equal to about 10 nm.

The photoactive ion is a photoactive organic cation or a photoactive organic anion. In various aspects of the current technology, a photoactive cation can be converted into a corresponding photoactive anion and a photoactive anion be converted into a corresponding photoactive cation. For example, a photoactive cation can be converted into a photoactive anion by adding groups to the photoactive cation that have a negative charge. Non-limiting examples of groups having a negative charge include sulfate ($SO_4^{2-}$), sulfonate ($SO_3^-$), nitrate ($NO_3^-$), nitrite ($NO_2^-$), phosphate ($PO_4^{3-}$), phosphonate ($PO_3^-$). Similarly, a photoactive anion can be converted into a photoactive cation by adding groups to the photoactive anion that have a positive charge. Non-limiting examples of groups having a positive charge include ammonium ($NH_4^+$), quarternized ammonium ($R_4N^+$), phosphonium ($R_4P^+$), arsonium ($R_4As^+$), stibonium ($R_4Sb^+$), and bismuthonium ($R_4Bi^+$) where R is any group (same or different), cyclic or not.

In various aspects of the current technology, the photoactive ion is a cationic or anionic form of a photoactive molecule selected from the group consisting of porphyrins, rhodamines, cyanines, polymethines, heptamethines, phthalocyanines, squaraines, perylenes, quinines, xanthenes, naphthalenes, coumarins, oxadiazoles, oxazines, acridines, arylmethines, tetrapyrroles, indocarbocyanines, oxacarbocyanines, thiacarbocyanines, merocyanines, porfimers, derivatives thereof, oligomers thereof, and combinations thereof. As used herein, "derivatives" of any of the ions described herein refer to or include ions that resemble a base ion, but that contain minor changes, variations, or substitutions, such as in, for example, solubilizing groups with varying alkyl chain lengths or substitution with other solubilizing groups, which do not substantially change the bandgap or electronic properties of the organic ion, as well as substitutions at a central methane position with various halides, halogens, and/or ligands. As used herein, a "substantial change" to the bandgap or electronic properties is a change of greater than about 5% or greater than about 10%. In regard to oligomers, in certain aspects of the current technology, the photoactive ion is an oligomer of one photoactive molecule or an oligomer of a plurality of photoactive molecules, formed by ether and ester linkages. Further, the oligomer can be a mixture of oligomers.

Photoactive ions include, as non-limiting examples, porphyrins, rhodamines, cyanines, polymethines, heptamethines, phthalocyanines, squaraines, perylenes, quinines, xanthenes, naphthalenes, coumarins, oxadiazoles, oxazines, acridines, arylmethines, tetrapyrroles, indocarbocyanines, oxacarbocyanines, thiacarbocyanines, merocyanines, porfimers, derivatives thereof, and combinations thereof.

Non-limiting examples of photoactive ions include 1-Butyl-2-(2-[3-[2-(1-butyl-1H-benzo[cd]indol-2-ylidene)-ethylidene]-2-phenyl-cyclopent-1-enyl]-vinyl)-benzo[cd]indolium, 1-Butyl-2-(2-[3-[2-(1-butyl-1H-benzo[cd]indol-2-ylidene)-ethylidene]-2-chloro-cyclohex-1-enyl]-vinyl)-benzo[cd]indolium, 1-Butyl-2-(2-[3-[2-(1-butyl-1H-benzo[cd]indol-2-ylidene)-ethylidene]-2-phenyl-cyclohex-1-enyl]-vinyl)-benzo[cd]indolium, 1-Butyl-2-(2-[3-[2-(1-butyl-1H-benzo[cd]indol-2-ylidene)-ethylidene]-2-diphenylamino-cyclopent-1-enyl]-vinyl)-benzo[cd]indolium, 1-Butyl-2-[7-(1-butyl-1H-benzo[cd]indol-2-ylidene)-hepta-1,3,5-trienyl]-benzo[cd]indolium, 2-[2-[2-chloro-3-[2-(1,3-dihydro-3,3-dimethyl-1-ethyl-2H-benz[e]indol-2-ylidene)ethylidene]-1-cylohexen-1-yl-ethenyl]-3,3-dimethyl-1-ethyl-1H-benz[e]indolium ("Cy"), N, N, N',N'-Tetrakis-(p-di-n-butylaminophenyl)-p-benzochinon-bis-immonium, 4-[2-[2-Chloro-3-[(2,6-diphenyl-4H-thiopyran-4-ylidene)ethylidene]-1-cyclohexen-1-yl]ethenyl]-2,6-diphenylthiopyrylium, 1-Butyl-2-[2-[3-[(1-butyl-6-chlorobenz[cd]indol-2(1H)-ylidene)ethylidene]-2-chloro-5-methyl-1-cyclohexen-1-yl]ethenyl]-6-chlorobenz[cd]indolium, 1-Butyl-2-[2-[3-[(1-butyl-6-chlorobenz[cd]indol-2(1H)-ylidene)ethylidene]-2-chloro-1-cyclohexen-1-yl]ethenyl]-6-chlorobenz[cd]indolium, Dimethyl{4-[1,7,7,-tris(4-dimethylaminophenyl)-2,4,6-heptatrienylidene]-2,5-cyclohexadien-1-ylidene}ammonium, 5,5'-Dichloro-11-diphenylamino-3,3'-diethyl-10,12-ethylenethiatricarbocyanine, 2-[2-[2-Chloro-3-[2-(1,3-dihydro-1,1,3-trimethyl-2H-benzo[e]-indol-2-ylidene)-ethylidene]-1-cyclohexen-1-yl]-ethenyl]-1,1,3-trimethyl-1H-benzo[e]indolium, 2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium, 2-[2]3-[(1,3-Dihydro-3,3-dimethyl-1-propyl-2H-indol-2-ylidene)ethylidene]-2-(phenylthio)-1-cyclohexen-1-yl]ethenyl]-3,3-dimethyl-1-propylindolium, 1,1',3,3,3',3'-4,4',5,5'-di-benzo-2,2'-indotricarbocyanine perchlorate, 2-[2-[2-Chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium, 3,3'-Diethylthiatricarbocyanine, 2-[[2-[2-[4-(dimethylamino)phenyl]ethenyl]-6-methyl-4H-pyran-4-ylidene]methyl]-3-ethyl, 2-[7-1,3-Dihydro-1,3,3-trimethyl-2H-indol-2-ylidene)-1,3,5-heptatrienyl]-1,3,3-trim ethyl-3H-indolium, 2-[2-[2-Chloro-3-[[1,3-dihydro-1,1-dimethyl-3-(4-sulfobutyl)-2H-benzo[e]indol-2-ylidene]ethylidene]-1-cyclohexen-1-yl]-ethenyl]-1,1-dimethyl-3-(4-sulfobutyl)-1H-benzo[e]indolium hydroxide, 2-[7-[1,3-

Dihydro-1,1-dimethyl-3-(4-sulfobutyl)-2H-benz[e]indol-2-ylidene]-1,3,5-heptatrien-1-yl]-1,1-dimethyl-3-(4-sulfobutyl)-1H-benz[e]indolium, cyanine3 (Cy3), cyanine3.5 (Cy3.5), cyanine5 (Cy5), cyanine5.5 (Cy5.5), cyanine7 (Cy7), cyanine7.5 (Cy7.5), derivatives thereof, and combinations thereof.

The counterion, which modulates dark and light cytotoxicity of the photoactive ion, is a weakly coordinating counterion or a non-coordinating counterion. The counterion has a volume averaged equivalent spherical radius of greater than or equal to about 0.275 nm, greater than or equal to about 0.28 nm, greater than or equal to about 0.29 nm, or greater than or equal to about 0.3 nm. As used herein, a "weakly coordinating counterion" and "non-coordinating counterion" are counterions that weakly interact with ions and metal centers, and that can reduce or eliminate ligand coordination, oxidation, and abstraction. Weakly coordinating ions can replace strong electrostatic interactions by a variety of weak interactions via greater charge delocalization. Such weak interactions are often influenced by coverage with poorly polarizable halogen atoms, such as, for example, fluorine, that can also increase thermodynamic stability. Bulky and weakly coordinating ions do not include $PnX_6^-$, $X^-$, $XO_4^-$, $XO_3^-$, $XO_2^-$, or $XO^-$, where X is a halogen and Pn is a pnictogen, which may be considered strongly coordinating ions. Non-limiting examples of counterions that are not suitable include the anions $F^-$, $Cl^-$, $Br^-$, $I^-$, $BF_4^-$, $PF_6^-$, $SbF_6^-$, $AsF_6^-$, $SO_3F^-$, and $ClO_4$; and the cations $Li^+$, $LiH^+$, $BeH^+$, $GeH_3^+$, $BeO^+$, $Na^+$, $K^+$, $Rb^+$, $Cs^+$, $Be^{2+}$, $Mg^{2+}$, $Ca^{2+}$, $Sr^{2+}$, $Ba^{2+}$.

Whether a counterion will make an organic salt suitable for PDT or imaging (or both as a theranostic) depends on its absolute highest occupied molecular orbital (HOMO) energy and its lowest unoccupied molecular orbital (LUMO) energy. In some embodiments, the organic salt has an absolute HOMO energy of less than or equal to about 5.2 eV, less than or equal to about 5 eV, less than about 4.5 eV, less than about 4 eV, or less than about 3.5 eV, or an absolute HOMO of from greater than or equal to about 1 eV to less than or equal to about 5.2 eV, such as an absolute HOMO energy of about 5.2, about 5 eV, about 4.75 eV, about 4.5 eV, about 4.25 eV, about 4 eV, about 3.75 eV, about 3.5 eV, about 3.25 eV, about 3 eV, about 2.75 eV, about 2.5 eV, about 2.25 eV, or about 1 eV or less or the organic salt has an absolute LUMO energy of greater than or equal to about 2.0 eV, greater than or equal to about 3 eV, greater than about 3.2 eV, greater than about 3.4 eV, or greater than about 4 eV, or an absolute LUMO of from greater than or equal to about 1 eV to less than or equal to about 4.0 eV, such as an absolute LUMO energy of about 1.6, about 2.0 eV, about 2.4 eV, about 2.8 eV, about 3.0 eV, about 3.2 eV, about 3.4 eV, about 3.6 eV, about 3.8 eV, about 4 eV or higher. In such embodiments, the counterion makes the organic salt phototoxic, i.e., non-toxic to cells in the dark and toxic to the cells in the light, which is useful for PDT and theranostics. The closer the absolute HOMO energy is to from about 5.0 to about 5.2 eV, the better suited the organic salt is for theranostics. In other embodiments, the organic salt has an absolute HOMO energy of greater than about 5.2 eV, greater than or equal to about 5.5 eV, greater than or equal to about 6 eV, or greater than or equal to about 6.5 eV, or an absolute HOMO energy of about 5.25 eV, about 5.5 eV, about 5.75 eV, about 6 eV, about 6.25 eV, about 6.5 eV, about 6.75 eV, about 7 eV, about 7.25 eV, about 7.5 eV, about 7.75 eV, about 8 eV, about 8.25 eV, about 8.5 eV, about 8.75 eV, about 9 eV, about 9.25 eV, about 9.5 eV, about 9.75 eV, about 10 eV or higher or the organic salt has an absolute LUMO energy of greater than or equal to about 3.4 eV, greater than or equal to about 3.7 eV, greater than or equal to about 4.2 eV, or greater than or equal to about 4.7 eV, or an absolute LUMO energy of about 3.4, about 3.45 eV, about 3.7 eV, about 3.9 eV, about 4.2 eV, about 4.4 eV, about 4.7 eV, about 4.95 eV, about 5.2 eV, about 5.45 eV, about 5.7 eV, about 5.95 eV, about 6.2 eV, or higher. In such embodiments, the counterion makes the organic salt non-cytotoxic, i.e., non-toxic to cells in the dark and in the light, which is useful for imaging. Therefore, when deactivating a cytotoxic salt or tuning an organic salt by exchanging counterions, the absolute HOMO energy of the counterion modulates the toxic nature of the resulting organic salt provided the resulting organic salt forms a nanoparticle, an aggregate or a pair.

"Cytotoxicity" refers a compound's (e.g., an ion's or organic salt's) quality of being toxic to cells, regardless of presence or absence of illumination. "Dark cytotoxicity" refers to toxicity of the organic salt to cells when it is not an excited state, i.e., in the absence of illumination that excites an electron from a ground state to an excited state ("in the dark"). "Light cytotoxicity" is cellular toxicity that is induced from the organic salt when it becomes "excited." Similarly, "phototoxicity" refers to toxicity that results from an organic salt becoming excited due to the presence of illumination, wherein the organic salt is not toxic to cells in the dark. For example, an organic salt that is phototoxic is not toxic to cells in the dark, but is toxic to cells in the light.

"Activated" organic salts are organic salts that are excited and the excitation causes cellular toxicity. Accordingly, organic salts that are toxic to cells in the dark can become "deactivated," i.e., made to be non-toxic to cells in the dark, by substituting the counterion with a second counterion that renders the organic salt nontoxic in the dark only (i.e., phototoxic) or non-toxic in both the dark and the light.

The light or dark cellular toxicity of the organic salt can be described by a half maximal inhibitory concentration ($IC_{50}$), where the $IC_{50}$ is concentration of the organic salt at which 50% of a cell population dies. The term "dark $IC_{50}$" refers to the $IC_{50}$ of an organic salt in the dark and the term "light IC50" ($^{light}IC_{50}$) refers to the $IC_{50}$ of an organic salt in the light. Organic salts suitable for PDT have a $^{light}IC_{50}$ of less than or equal to about 10 µM, less than or equal to about 5 µM, less than or equal to about 3 µM, or less than or equal to about 1 µM, and a $^{dark}IC_{50}$ of greater than or equal to about 10 µM, greater than equal to about 20 µM, greater than or equal to about 50 µM, greater than or equal to about 100 µM, greater than or equal to about 150 µM, or greater than or equal to about 200 µM. Organic salts suitable for imaging have a $^{light}IC_{50}$ of greater than or equal to about 5 µM, greater than or equal to about 20 µM, greater than or equal to about 50 µM, greater than or equal to about 75 µM, greater than or equal to about 100 µM, greater than or equal to about 150 µM, or greater than or equal to about 200 µM, greater than or equal to about 300 mM, greater than or equal to about 400 µM, or greater than or equal to about 500 µM, and a $^{dark}IC_{50}$ of greater than or equal to about 5 µM, greater than or equal to about 20 µM, greater than or equal to about 50 µM, greater than or equal to about 75 µM, greater than or equal to about 100 µM, greater than or equal to about 150 µM, or greater than or equal to about 200 µM, greater than or equal to about 300 mM, greater than or equal to about 400 µM, or greater than or equal to about 500 µM. In other embodiments, the organic salt has an $^{dark}IC_{50}:^{light}IC_{50}$ ratio of greater than or equal to about 5, greater than or equal to about 10, greater than or equal to about 20, greater than or equal to about 50, or greater than or equal to about 100.

In certain aspects of the current technology, the counterion is non-spherical. By "non-spherical," it is meant that the counterion is either non-elemental or not of the form $AX_4^-$, $AX_6^-$ where A is, for example, B, P, S, Sb, or CI, and X is, for example, F, Cl, Br, I, H, or O.

In embodiments where the photoactive ion is a cation, the counterion is an anion. In embodiments where the photoactive ion is an anion, the counterion is a cation. Similar to the photoactive ion, a cationic counterion can be converted into a corresponding anionic counterion and an anionic counterion can be converted into a corresponding cationic counterion. For example, a cationic counterion can be converted into an anionic cation by adding groups to the photoactive cation that have a negative charge. Non-limiting examples of groups having a negative charge include sulfate ($SO_4^{2-}$), sulfonate ($SO_3^-$), nitrate ($NO_3^-$), nitrite ($NO_2^-$), phosphate ($PO_4^{3-}$), and phosphonate ($PO_3$). Similarly, an anionic counterion can be converted into a cationic counterion by adding groups to the photoactive anion that have a positive charge. Non-limiting examples of groups having a positive charge include ammonium ($NH_4^+$), quarternized ammonium ($R_4N^+$), phosphonium ($R_4P^+$), arsonium ($R_4As^+$), stibonium ($R_4Sb^+$), and bismuthonium ($R_4Bi^+$) where R is any group (same or different), cyclic or not.

Non-limiting examples of counterions include tetrakis(4-fluorophenyl)borate (FPhB$^-$), cobalticarborane (CoCB$^-$), tetrakis(pentafluorophenyl)borate (TPFB$^-$), tetrakis[3,5-bis(trifluoro methyl)phenyl]borate (TFM$^-$), Δ-tris(tetrachloro-1,2-benzene diolato) phosphate(V) (TRIS$^-$), tetraphenylborate, tetra(p-tolyl)borate, tetrakis(4-biphenylyl)borate, tetrakis(1-imidazolyl)borate, tetrakis(2-thienyl)borate, tetrakis(4-chlorophenyl)borate, tetrakis(4-fluorophenyl)borate, tetrakis(4-tert- butylphenyl)borate, tetrakis[3,5-bis(trifluoromethyl)]borate, [4-[bis(2,4,6-trimethylphenyl)phosphino]-2,3,5,6-tetrafluorophenyl]hydrobis(2,3,4,5,6-pentafluorophenyl)borate, [4-di-tert-butylphosphino-2,3,5,6-tetrafluorophenyl]hydrobis(2,3,4,5,6-pentafluorophenyl) borate anion; (Λ,R)-(1,1'-binaphthalene-2,2'diolato)(bis(tetrachlor-1,2-benzenediolato)phosphate(V)) anion (BINPHAT-), hexafluoroantimonate (SbF6-), tetrafluoroborate (BF4-), acetate, trifluoracetate, benzene sulfonate, bis(trifluoromethane)sulfonimide (TFSI), alkylsulfate, tosylate, methanesulfonate, tetrakis(4-methylphenyl)-borane, tetra-4-biphenylylborate, tetrakis(4-methoxyphenyl)borate, tetrakis [4-(2-methyl-2-propanyl)phenyl]borate, (2-methylphenyl)(triphenyl)borate, bis(2-methylphenyl)(diphenyl)borate, tetrakis(4'-methyl-4-biphenylyl)borate, tetrakis(4-isopropoxyphenyl)borate, (2-oxo-2-phenyl-ethyl)-triphenylphosphonium, 1-benzyl-4-(4-methoxy-phenyl)-4H-(1,2,4) triazol-1-ium, 1-benzyl-4-phenyl-3-styryl-4H-(1,2,4)triazol-1-ium, 1-benzyl-4-phenyl-3-styryl-4H-(1,2,4)triazol-1-ium, 2,4,6 tris-(4-chloro-phenyl)-pyranylium, 2,4,6-tris-(4-chloro-phenyl)-thiopyranylium, 2,4,6-tris-(4-hydroxy-phenyl)-pyranylium, 2,4,6-tris-(4-tert-butyl-phenyl)-(1,3) oxazin-1-ylium, 4,6-bis-(4-chloro-phenyl)-2,3-diphenyl-pyranylium, 1-hexyl-3-methylimidazolium, 1-hexyl-3-(3,3,4,4,5,5,6,6-tridecafluorooctyl)-methylimidazolium, 1-hexyl-3-(3,3,4,4,5,5,6,6,7,7,8,8-nonafluorohexyl)-methylimidazolium, methylpyridinium, trimethylmethanaminium, methyl ammonium, acetamidinium, 5-azaspiro[4.4]nonan-5-ium, benzylammonium, iso-butylammonium, n-butylammonium, t-butylammonium, cyclohexylammonium, 1,4-diazabicyclo[2,2,2]octane-1,4-diium, diethylammonium, ethane-1,2-diammonium, ethylammonium, formamidinium, guanidinium, n-hexylammonium, imidazolium, n-octylammonium, phenethylammonium, piperazine-1,4-diium, propane-1,3-diammonium, iso-propylammonium, pyrrolidinium, quinuclidin-1-ium, phosphonium, pyrrolidium, thiazolium, sulfinium, imidazolium, pyridinium, sulfonated cyanine3 (Cy3), sulfonated cyanine3.5 (Cy3.5), sulfonated cyanine5 (Cy5), sulfonated cyanine5.5 (Cy5.5), sulfonated cyanine7 (Cy7), sulfonated cyanine7.5 (Cy7.5), derivatives thereof, and combinations thereof.

In one embodiment, the composition is used for imaging, and the counterion is TFM, TPFB, or TRIS. In another embodiment, the composition is used for PDT and the counterion is FPhB, CB, or CoCB.

In some embodiments, the organic salt is substantially free of a coating or substantially free of a non-bioresorbable coating when it is located within a cell or organelle or in an extracellular environment or matrix. As used herein, "substantially free" of a coating means that less than or equal to about 20%, less than or equal to about 15%, less than or equal to about 10%, less than or equal to about 5%, less than or equal to about 2.5%, or less than or equal to about 1% of the surface area of the organic salt is covered with a coating, such that the organic dye is free to interact with a target cell and/or become endocytosed. Therefore, in some embodiments the organic salt is a coated when administered to a subject, but is substantially free of the coating when the organic salt is in a extracellular environment or matrix or within a cell, i.e., in the cytosol or organelle. In other words, when present during administering to a subject, the coating can be absorbed, digested, or otherwise removed in at least one of the digestive tract, circulation, and intracellular environment of the subject. Accordingly, the coating can be removed before or after the organic salt enters a cell. In other embodiments, the organic salt is administered without a coating.

In some embodiments, the organic salt comprises a polymeric or non-polymeric bioresorbable coating. As used herein, a "bioresorbable coating" is a coating that is at least partially bioresorbed in the bloodstream, digestive system, or in a cell after intravenous injection or in the gut after oral administration, such that the organic salt becomes substantially free of the coating as it interacts with or enters a target cell. Bioresorbable non-polymeric coatings comprise, as non-limiting examples, $MgF_2$, calcium phosphate, apatite, calcium carbonate, calcium fluoride, and mixtures thereof. Bioresorbable polymeric coatings comprise, as non-limiting examples, polysaccharides, polylactides (PLA); PLGA (poly (lactide-co-glycolide)); polyanhydrides; polyorthoesters; poly(N-(2-hydroxypropyl) methacrylamide); DLPLA—poly(dl-lactide); LPLA—poly(1-lactide); PGA-polyglycolide; PDO—poly(dioxanone); PGA-TMC—poly(glycolide-co-trimethylene carbonate); PGA-LPLA—poly(l-lactide-co-glycolide); PGA-DLPLA—poly(dl-lactide-co-glycolide); LPLA-DLPLA—poly(1-lactide-co-dl-lactide); and PDO-PGA-TMC-poly(glycolide-co-trimethylene carbonate-co-dioxanone), and combinations, copolymers, and derivatives thereof. In various embodiments, the bioresorbable coating comprises pores having an opening diameter of greater than or equal to about 1 nm to less than or equal to about 1 μm and a porosity, i.e., ratio of void volume to total volume, of greater than or equal to about 30% to less than or equal to about 75%.

In various embodiments, the organic salt is coupled to an adjunct material. The adjust material is a biomolecule; a sugar, such as a sugar molecule or a polysaccharide; a protein; a peptide; an intracellular organelle localization peptides/signals; an outer surface of a nanoparticle; a lipid carrier, such as an outer surface of a micelle or liposome; a nucleic acid; such as a deoxyribonucleic acid (DNA) or a ribonucleic acid (RNA); an antibody (monoclonal or polyclonal), including an antibody fragment (such as, for example Fab, Fab', Fab$_2$, Fab'$_2$, Fd, Fd', scFv, scFv$_2$, dAb, or combinations thereof), and an antibody fragment fusion molecule; a targeting agent, or a combination thereof. Targeting agents include agents that direct the organic salt to a specific tissue type or cell type. In various embodiments, the targeting agent is an antibody that recognizes a molecule on a specific cell or a ligand that binds to a receptor expressed by a specific cell. Non-limiting examples of tumor-targeting peptides are provided by Liu et al., Advanced Drug Delivery Reviews 110-111 (2017) 13-37, which is incorporated herein by reference in its entirety. Intracellular organelle localization peptides/signals include peptides and nucleic acids that localize the organic salt at or near an organelle, such as a mitochondrion, a nucleus, a golgi apparatus, or an endoplasmic reticulum.

In various embodiments, the composition further comprises a pharmaceutically acceptable carrier, diluent, stabilizing agent, or combination thereof. Non-limiting examples of suitable carriers include water, phosphate buffer, phosphate buffer saline (PBS), isotonic saline, dextrose solution (greater than or equal to about 1% dextrose to less than or equal to about 10% dextrose), sodium chloride solution (greater than or equal to about 0.1% sodium chloride to less than or equal to about 1.5% sodium chloride), dimethyl sulfoxide (DMSO), isotonic saline, other aqueous solutions, or combinations thereof. Various non-aqueous solutions may be suitable as well. Non-limiting examples of suitable excipients include. Non-limiting examples of suitable diluents include starch, cellulose derivatives, magnesium stearate, and combinations thereof. Non-limiting examples of suitable stabilizing agents include cellulose, calcium carbonate, dicalcium phosphate, carboxymethyl cellulose, starch, mannitol, and mixtures thereof. In some embodiments, the organic salt has a concentration in the composition of greater than or equal to about 0.5 mg/mL to less than or equal to about 10 mg/mL, greater than or equal to about 1 mg/mL to less than or equal to about 7.5 mg/mL, greater than or equal to about 1.5 mg/mL to less than or equal to about 5 mg/mL. In other embodiments, the composition consists of the organic salt.

In various embodiments, the composition further comprises a secondary agent. The secondary agent is a therapeutic molecule, a drug for treating a tumor/cancer, an antimicrobial agent, or a combination thereof.

The current technology further provides an organic salt, as described above, for use in a method of treating cancer, wherein the organic salt is substantially free of a coating when located within a cancer cell, comprises a photoactive ion and a counterion, and is non-toxic to cells in the dark. Also provided is an organic salt, as described above, for use in a method of treating cancer, wherein the organic salt comprises a photoactive ion, a counterion, and a bioresorbable coating, and is non-toxic to cells in the dark. Yet further provided are an organic salt, as described above, for use in the treatment of cancer; and an organic salt, as described above, for use as a medicament for the treatment of cancer. The current technology also provides the use of an organic salt, as described above, for the manufacture of a medicament for the treatment of cancer.

Method Of Tuning The Cytotoxicity Of Photoactive Ions

The currently technology provides methods of tuning the cellular toxicity of photoactive ions. More specifically, the cellular toxicity can be dark cellular toxicity or light cellular toxicity. For example, if an organic salt comprising a photoactive ion and an unsuitable counter ion is cytotoxic in the dark at a desired concentration, the dark cellular toxicity can be deactivated, i.e., the organic salt can be made nontoxic to cells, by removing the unsuitable counterion and pairing the photoactive ion with a second different acceptable counterion. As a non-limiting example, and as described in more detail below, and with reference to FIG. 11A, the photoactive cation Cy$^+$ is cytotoxic when paired with the unsuitable anion PF$_6^-$. However, substituting the unsuitable anion with an anion according to the current technology, such as with FPhB$^-$, CoCB$^-$, TPFB$^-$, CyTFM$^-$, or TRIS$^-$, as non-limiting examples, deactivates the dark cellular toxicity. It is understood that substituting the PF$_6^-$ with any of the suitable counter anions described herein will deactivate the cytotoxicity.

Accordingly, the current technology provides a method of deactivating dark cellular toxicity of an organic salt to a cell. The method comprises obtaining a first organic salt that is cytotoxic to the cell in the dark, wherein the first organic salt comprises a photoactive ion and a first (unsuitable) counterion. The method also comprises selecting a second (suitable) counterion, and substituting the first counterion with the second counterion to generate a deactivated second organic salt, wherein the deactivated second organic salt has a lower cellular toxicity to the cell than the first organic salt prior to the substituting. In various aspects of the current technology, the substituting is performed by ion exchange or ion synthesis. This can be done by "exchange" or during an initial reaction, or via a subsequent reaction. Moreover, the second counterion is a suitable counterion as described above. In other aspects of the current technology, the deactivated organic salt luminesces when exposed to visible or IR light.

Even though an organic salt may be nontotoxic to cells in the dark, in various embodiments, cellular toxicity is activated when the photoactive ion is excited. This phototoxicity is desired during, for example, PDT, but may not be desired during, for example, imaging. Therefore, phototoxicity is tunable by substituting counterions. For example, as described in more detail below, and with reference to FIG. 11B, the photoactive cation Cy$^+$ paired with the anions FPhB or CoCB is phototoxic, which may be useful for PDT. To deactivate this phototoxicity, the anion FPhB or CoCB can be substituted with TPFB, TFM, or IRIS, which results in an organic salt that is not toxic to cells in the dark and in the light, which may be useful for imaging. It is understood that other suitable counterions described herein provide organic salts that are phototoxic or non-toxic to cells in the light.

Accordingly, the current technology provides a method of deactivating or activating phototoxicity of an organic salt to a cell. The method comprises obtaining a first organic salt that is either phototoxic or non-phototoxic, wherein the first organic salt comprises a photoactive ion and a first counterion that provides either cellular toxicity in the light or no cellular toxicity in the light. Whereas an electron of the photoactive ion become excited when the photoactive ion absorbs light of a certain wavelength, the first counterion modulates the energy of the electron and a hole. The method also comprises selecting a second counterion, which modulates the energy of the electron and the hole to a different extent than the first counterion, and substituting the first counterion with the second counterion to generate a second light activated or light deactivated organic salt, wherein the light activated organic salt has a phototoxicity that is higher than that of the first organic salt and the light deactivated organic salt has a phototoxicity that is lower than that of the first organic salt. In various aspects of the current technology, the substituting is performed by ion exchange or ion synthesis. Moreover, the second counterion is a suitable counterion as described above. In other aspects of the current technology, the deactivated or activated second organic salt luminesces when exposed to visible or IR light. In embodiments where the first organic salt is toxic to cells in the dark, the second counterion may be chosen to deactivate dark cellular toxicity and to be either phototoxic or non-phototoxic.

Method Of Exciting An Organic Salt In A Cell

The current technology also provides a method of exciting an organic salt in a cell. The method comprises contacting the cell with a composition comprising the organic salt, the organic salt comprising a photoactive ion and a counterion, wherein the cell uptakes the organic salt such that the organic salt is substantially free of a coating within the cell and the organic salt is non-toxic to the cell in the dark (such as for example, at a concentration of greater than or equal to about 3 µM or at a concentration of greater than or equal to about 5 nM to less than or equal to about 1 mM). The method also comprises exposing the cell to light having a first wavelength, wherein the organic salt absorbs the light having the first wavelength and the photoactive ion becomes excited.

As discussed above, the light having the first wavelength is can be visible light or IR light. The first wavelength is greater than or equal to about 600 nm to less than or equal to about 1600 nm, greater than or equal to about 650 nm to less than or equal to about 1600 nm, or greater than or equal to about 700 nm to less than or equal to about 1600. In various embodiments, the first wavelength is about 600 nm, about 650 nm, about 700 nm, about 750 nm, about 800 nm, about 850 nm, about 900 nm, about 950 nm, about 1000 nm, about 1050 nm, about 1100 nm, about 1150 nm, about 1200 nm, about 1250 nm, about 1300 nm, about 1350 nm, about 1400 nm, about 1450 nm, about 1500 nm, about 1550 nm, or about 1600 nm. In some embodiments, the excited organic salt emits light having a second wavelength, which can be visible light or IR light. In some embodiments, the excited organic salt is non-toxic to the cell (in the light), such that the excited organic salt does not cause cell death at, for example, a concentration of greater than or equal to about 3 µM or at a concentration of greater than or equal to about 5 nM to less than or equal to about 1 mM. In other embodiments, the excited organic salt is activated to generate reactive oxygen species (ROS) within the cell and/or to disrupt electron transport chains in mitochondria, which both result in cell death.

The method may also comprise, prior to the contacting, tuning the organic salt to have a desired toxicity after the exposing the cell to light by pairing the photoactive ion with the counterion, wherein the counterion induces the desired toxicity of the excited photoactive ion. Tuning the organic salt can be performed by the methods described above.

The cell can be a prokaryotic cell, such as a bacterium, or a eukaryotic cell, such as from a tissue. In some embodiments, the cell is a cancer cell or a tumor cell. For example, the cell may be located in a tumor of a subject having cancer. The cancer can be a carcinoma, a sarcoma, leukemia, a lymphoma, a myeloma, a germinoma, or a brain or spinal cord cancer. When the cell is a tumor cell, the excited organic salt may be activated to be toxic and to kill the tumor cell by generating ROS or disrupting electron transport chains or it may be non-toxic, but luminescent, such that the tumor cell can be visualized optically if the luminescence has a wavelength in the visible range or with a detector if the luminescence has a wavelength in the IR range. Accordingly, the exposing the cell to light may comprise exposing a tissue comprising the cell to light.

When the tissue is in a subject, the method may also include, prior to the contacting, administering a safe and effective amount of the composition comprising an organic salt to the subject, wherein the organic salt contacts the cell in vivo. The administering can be performed intravenously, orally, or topically, depending on the location of the tissue and the exposing the cell to light having the first wavelength comprises exposing the tissue comprising the cell to light, which may be performed greater than or equal to about 1 hour after the administering, greater than or equal to about 10 hours after the administering, greater than or equal to about 24 hours after the administering, or greater than or equal to about 48 hours after the administering.

Similarly, the current technology further provides a method of exciting an organic salt in a tissue of a subject. The method comprises exposing the tissue in the subject to light, wherein, prior to the exposing a composition comprising an organic salt was administered to the subject, the luminescent organic salt comprising a photoactive ion and a counterion, wherein cells of the tissue took up the luminescent organic salt and the luminescent organic salt is substantially free of a coating within the cells. The exposing the tissue to light excites the organic salt. The excited organic salt is at least one of activated to be toxic to the tissue or luminescent, such that the tissue can be visualized. When the excited organic salt is luminescent, it emits light having a second wavelength and the method can further comprise visualizing the light having the second wavelength in real time, and resecting the tissue. In various embodiments, the organic salt was administered to the subject greater than or equal to about 1 hour before the exposing, greater than or equal to about 10 hours before the exposing, greater than or equal to about 24 hours before the exposing, or greater than or equal to about 48 hours before the exposing.

Method of Treating a Subject Having a Tumor

The current technology also provides a method of treating a subject having a tumor. The method comprises exposing the tumor in the subject to light having a first wavelength, wherein the tumor comprises tumor cells containing an organic salt being substantially free of a coating and comprising a photoactive ion and a counterion, wherein the light having the first wavelength excites the organic salt.

In certain embodiments, prior to the exposing, the method comprises obtaining the subject, wherein the subject was previously administered a composition comprising the organic salt. The composition could be any composition described above, including a composition wherein the organic salt is coated with a bioresorbable coating. However, the bioresorbable coating is resorbed by the subject after the administering, such that the organic salt is substantially free of the coating as it contacts or enters cells of the tumor.

In some embodiments, the excited organic salt emits light having a second wavelength and the method further comprises visualizing the light having the second wavelength in real time, and resecting the tumor from the subject. Because the organic dye is selectively accumulated in tumor cells, as shown in FIGS. 3 and 4, the tumor can be identified and removed while leaving healthy, non-cancerous tissue substantially intact, i.e., minimizing damage to healthy tissue.

In other embodiments, the excited organic salt generates ROS within the tumor cells and/or disrupts electron transport chains in mitochondria of the tumor cells, wherein the ROS and/or electron transport chain disruption kills the tumor cells. Because the organic dye is selectively accumulated in tumor cells, the tumor cells are selectively killed while leaving healthy, non-cancerous tissue substantially intact, i.e., minimizing damage to healthy tissue.

In yet other embodiments, the method further comprises administering a safe and effective amount of a conventional drug for treating the tumor to the subject.

Method of Treating a Subject Having a Tumor Using Photodynamic Therapy

The current technology also provides a method of treating a subject having a tumor. The subject may have, for example, a carcinoma, a sarcoma, leukemia, a lymphoma, a myeloma, a germinoma, or a brain or spinal cord cancer. The method comprises obtaining the subject, wherein the subject received a pretreatment comprising administering a composition comprising an organic salt to the subject, the organic salt comprising a photoactive ion and a non-spherical and weakly coordinating counterion, wherein the organic salt selectively accumulates in cells of the tumor and is substantially free of a coating within the cells of the tumor. In some embodiments, prior to the pretreatment, the organic salt was deactivated by substituting a first counterion with the non-spherical and weakly coordinating counterion by ion exchange or ion synthesis.

The method further comprises inducing the organic salt to become toxic to the tumor cells. The inducing comprises exposing the tumor in the subject to light having a first wavelength, wherein the light having the first wavelength excites and activates the organic salt, the activated organic salt being toxic to the tumor cells. The activated organic salt generates ROS within the tumor cells and/or disrupts electron transport chains in mitochondria of the tumor cells, wherein the ROS and/or electron transport chain disruption kills the tumor cells. Because the organic dye is selectively accumulated in tumor cells, the tumor cells are selectively killed while leaving healthy, non-cancerous tissue substantially intact, i.e., minimizing damage to healthy tissue.

Method of Imaging a Tumor in a Subject

The current technology also provides a method of treating a subject having a tumor. The subject may have, for example, a carcinoma, a sarcoma, leukemia, a lymphoma, a myeloma, a germinoma, or a brain or spinal cord cancer. The method comprises obtaining the subject, wherein the subject received a pretreatment comprising administering a composition comprising an organic salt to the subject, the organic salt being non-toxic in the dark, and comprising a photoactive ion and a non-spherical and weakly coordinating counterion, wherein the organic salt selectively accumulates in cells of the tumor and is substantially free of a coating in the cells of the tumor. In some embodiments, prior to the pretreatment, the organic salt was deactivated by substituting a first counterion with the non-spherical and weakly coordinating counterion by ion exchange or ion synthesis.

The method further comprises inducing the organic salt to luminesce in the tumor cells. The inducing the organic salt to luminesce comprises exposing the tumor in the subject to light having a first wavelength, wherein the light having a first wavelength excites the organic salt and the excited organic salt emits light having a second wavelength as luminescence. The exposing the tumor in the subject to light can be performed by any method known in the art, such as, for example, with a laser or a fiber optic cable. In various embodiments, the luminescing organic salt is activated and causes tumor cell death. In other embodiments, the luminescing organic salt is not activated and is non-cytotoxic to the tumor cells. The toxicity of the excited organic salt can be modulated through the counterion as described above.

After the inducing the organic salt to luminesce in the tumor cells, the method comprises identifying the tumor by visualizing the luminescence, and resecting the tumor from the subject. The visualizing the luminescence is performed with an imaging system comprising a detector that detects the luminescence and a monitor that displays luminescent images in real time. The detector can be, for example, a charge coupled device (CCD), a photomultiplier tube (PMT), a complementary metal-oxide-semiconductor (CMOS), or an avalanche photodiode (APD), as non-limiting examples.

Embodiments of the present technology are further illustrated through the following non-limiting examples.

EXAMPLE 1

Here, the impact of anions on the optoelectronic properties of luminescent organic salts is demonstrated for the first time. This is achieved by cation-anion pairs of luminescent organic salts that can be modulated to be either non-toxic for enhanced imaging, or phototoxic for improved PDT. For example, FIG. 5 shows the tunability of the anion heptamethine cyanine ($Cy^+$), wherein the $Cy^+$ exhibits decreased phototoxicity as it is paired with (from most phototoxic to least phototoxic) hexafluorophosphate ($PF_6^-$); tetrakis(4-fluorophenyl)borate ($FPhB^-$); cobalticarborane ($CoCB^-$); tetrakis (pentafluorophenyl) borate ($TPFB^-$); tetrakis[3,5-bis (trifluoro methyl)phenyl]borate ($TFM^-$); Δ-tris(tetrachloro-1,2-benzene diolato) phosphate(V) ($TRIS^-$). IR polymethine cyanine dyes, which have been used as effective theranostics are described. Heterocyclic polymethine cyanine dyes have been found to preferentially accumulate in tumors and circulating cancer cells without bioconjugation. This is thought to occur through a mechanism mitigated by tumor vascularization, increased retention in cancer cells, and mitochondrial depolarization. Once in the cell, they accumulate in the mitochondria and lysosomes, where irradiation induces generation of cytotoxic oxygen species. A strategy is described for preventing or inhibiting salt dissociation in cells: aggregates are formed via introduction of the salt into an aqueous media by a solvent vehicle, forming particles with diameters of about 5 nm in size with no precipitation observed. As shown in FIG. 6, little to no anion exchange occurs once introduced in cellular milieu due to aggregate formation that protects the salt's composition. This is confirmed by high resolution mass spectrometry, electron microscopy, and UV-Vis spectroscopy. Thus, the integrity of the photoactivatable cyanine salt pairing is maintained in cellular environments for bulky, weakly coordinating counterions (e.g., CyTPFB, CyTRIS, CyTFM, CyCoCB, and CyFPhB). In contrast, small counterions such as $PF_6$, $SbF_6$, and I all form nanoparticles that potentially can redissolve in cell media. Normalized absorption data are sown in FIGS. 7A, 7B, and 7C. This is likely due to steric effects, where if the counterion radius is too small it is not able to protect the nanoparticle stability. This can be characterized by the volume-averaged effective spherical radius of the counterions, where the cutoff is at about 0.275 nm. Table 1 shows the spherical radius of various counterions.

TABLE 1

Equivalent spherical radius of the volume contained by the Connolly surface. Calculated with Materials Studio v. 7.0.

| Device | $r^{a)}$ (nm) |
|---|---|
| $TPFB^-$ | 0.463 |
| $TRIS^-$ | 0.479 |

TABLE 1-continued

Equivalent spherical radius of the volume contained by the Connolly surface. Calculated with Materials Studio v. 7.0.

| Device | $r^{a)}$ (nm) |
|---|---|
| $SbF_6^-$ | 0.274 |
| $PF_6^-$ | 0.266 |
| $I^-$ | 0.197 |

The concept of tuning photoactive cations by modulating electronic properties with anions, thereby dictating their degree of phototoxicity in mammalian cells, is now demonstrated. Through specific anion pairing, luminescent organic salts can be modulated to be either non-toxic for enhanced imaging, or phototoxic for improved PDT. This approach can be further extended to photoactive anions with particular pairing of cation. Thus, highly tunable IR luminescent organic salts that allow independent control of the band gap and energy levels via counterion pairing can be developed. This novel concept of tuning luminescent organic salts is a new platform for controlling photoexcited interactions at the cellular level and can be applied to both novel and existing fluorophores, including assembled luminescent probes such as C-dots and other hybrid nanoparticles.

Methods

Chemicals

Heptamethine cyanine ($Cy^+$) salts precursors are, for example, based on Cyanine7 NHS ester (Cy7) purchased from Lumiprobe (Hunt Valley, MD) or CyI purchased from American Dye Source (Quebec, Canada). All luminescent organic salts are dissolved in DMSO (4 mM) and stored at 4° C.

Synthesis

Equimolar amounts of precursor salts (e.g., K-TPFB and CyI) are dissolved in methanol:dichloromethane (MeOH:DCM) cosolvent and stirred at room temperature under nitrogen for 1 hr. In most cases the product (e.g., CyTPFB) forms as a solid precipitate either at room temperature or under mild cooling and is then collected using vacuum filtration and rinsed to yield crude products. Crude products are redissolved in minimal DCM and poured through a plug of silica using DCM as eluent to remove impurities and unreacted precursors. A first fraction with similar color is collected, and excess DCM is removed in a rotary evaporator. Confirmation of reaction yield and purity are performed using a high mass accuracy time-of-flight mass spectrometer coupled to an ultra-high performance liquid chromatography system (UPLC-MS) in positive mode to quantify cations, and in negative mode to quantify anions. For assessment of ion purity, solutions of precursors and products are prepared in various known concentrations and analyzed by UPLC-MS. Typical reactions lead to product yields of >50%, with final purified purities of >95%.

Cell Culture

The cell lines human lung carcinoma (A549), metastatic human melanoma (WM1158) and Vemurafenib-resistant melanoma (Sk-Mel-28-$Vem^R$) are used. Sk-Mel-28-$Vem^R$ is generated by culturing a parental melanoma cell lines in the presence of 2 µM Vemurafenib for 2 months. Acquired Vemurafenib resistance is defined by >1 log change in IC50 between nonresistant and resistant cell lines. Resistance is maintained through media supplementation with 2 µM Vemurafenib, which is changed every 48 hours. All cells are cultured in DMEM without pyruvate with 10% heat inactivated fetal bovine serum supplemented with glutamine and penicillin/streptomycin, and incubated in 37° C. with 5% $CO_2$.

Viability Studies

A549 and WM1158 cells are seeded at a density of 50,000 cells per well in 6-well tissue culture plates. After 24 hours of incubation, media is aspirated and replaced with media containing luminescent dyes at indicated concentrations. Each well is irradiated with an 850 nm LED lamp with an illumination rate of 526 mW/cm² for an hour in the incubator, and control cells are left in a dark incubator without irradiation. For studies with Cy7, a 740 nm LED lamp is used instead of an 850 nm, but with a similar illumination flux. Immediately after irradiation, the media is replenished with fresh dye-laced media and allowed to incubate for another 24 hours. The same procedure is done at 48 hours and 72 hours, but the cells do not receive fresh dye-laced media after 72 hours. Viable cell number is determined at 24 and 96 hours using trypan blue staining and a Nexcelom Cellometer Auto T4 cell counter. All assays are done with 3 biological replicates. The fold change in cell proliferation over days of treatment was calculated using the following equation.

$$\text{Fold change} = \log_2 \frac{\text{Day 4 viable cell count}}{\text{Day 1 viable cell count}}$$

Sk-Mel-28 $Vem^R$ cells are seeded at a density of 95,000 cells per well in 6-well plates and allowed to grow for 2 days with Vemurafenib supplementation to reach 90% confluency. At this point, Vemurafenib supplementation is stopped, and viability with dyes is determined as described above.

Luminescent Imaging

Images are obtained using a Leica DMi8 microscope with a PE4000 LED light source, DFC9000GT camera, and LAS X imaging system. A549 cells are seeded in 3 cm tissue culture plates at a density of 50,000 cells per well in DMEM media containing luminescent organic salts at indicated concentrations. The cells incubate for 2 days at 37° C. with 5% $CO_2$ until the day of imaging. For live cell imaging, the media is aspirated and replaced with fresh dye-free media to reduce background noise. For fixed cell imaging, cells are grown on 0.5 mm coverslips within 3 cm plates. The media is aspirated and the cells are washed with phosphate buffered saline (PBS) before being submerged in cold methanol and incubated at −20° C. for 15 minutes. The cells are then washed with PBS 5 times, and the coverslips are then mounted to slides using DAPI with Fluoromount-G.

In Vivo Imaging

Mice are dosed with 1 mg/kg of organic salt in PBS (phosphate buffered saline) via intraperitoneal injection. Live imaging is performed by anesthetizing the mice with 3% isofluorane and using a Leica M165FC microscope with a PE4000 LED light source, DFC9000GT camera, and LAS X imaging software. For internal imaging, mice are sacrificed once tumors reach a size of 20 mm³ and organs of interest are retrieved and imaged using the system described previously.

Statistical Analysis

Statistical analysis is done using OriginPro 8 software. For analysis with greater than two group comparison, a one-way ANOVA analysis is performed with an ad hoc Bonferroni test. To assess the homogeneity of variance and suitability for ANOVA analysis, a Levene's test is performed. P values <0.05 is found to statistically significant. Unless otherwise indicated, error bars indicate standard error of the mean (SEM).

Determination of Intracellular Organic Salt Concentrations Using Mass Spectrometry Cells are seeded at a density of 50,000 cells per well in 6-well plates in media containing 1 µM of indicated dye. Cells are allowed to incubate for 3 days at 37° C. with 5% $CO_2$ with a media change to fresh dye-laced media on day 2. For extraction, media is aspirated from each well, and cells are washed with PBS. The cells are removed from the plate using 0.05% trypsin/EDTA and centrifuged at 1,500 rpm for 6 minutes. The supernatant is aspirated, and the cell pellet is washed with saline. Saline is aspirated, and the pellets are resuspended with room temperature HPLC-grade 3:7 methanol:acetonitrile and centrifuged at 13,000 rpm for 5 minutes. The supernatant is collected in a separate tube, and the pellet is again resuspended in HPLC grade 3:7 methanol:acetonitrile and centrifuged at 13,000 rpm for 10 minutes. The supernatant is combined with the first supernatant for analysis by liquid chromatography-mass spectrometry.

Cell extracts are analyzed the day of extraction using a Waters Xevo G2-XS QToF mass spectrometer coupled to a Waters Acquity ultrahigh pressure liquid chromatography (UPLC) system. The UPLC parameters are as follows: autosampler temperature, 10° C.; injection volume, 5 µl; column temperature, 50° C.; and flow rate, 300 µl/min. The mobile solvents are Solvent A: 10 mM ammonium formate and 0.1% formic acid in 60:40 acetonitrile:water; and Solvent B: 10 mM ammonium formate and 0.1% formic acid in 90:10 isopropanol:acetonitrile. Elution from the column is performed over 5 min with the following gradient: t=0 min, 5% B; t=3 min, 95% B; t=4 min, 95% B; t=5 min, 5% B. ESI spray voltage is 3,000 V. Nitrogen is used as the sheath gas at 30 psi and as the auxiliary gas at 10 psi, and argon as the collision gas at 1.5 mTorr, with the capillary temperature at 325° C. Data is acquired and analyzed using MassLynx 4.1 and QuanLynx software.

$Cy^+$, which typically elutes at 2.5 minutes, is analyzed in positive mode. Standards of each anion-cation pair are run at concentrations of 5 nM, 10 nM, 25 nM, 50 nM, and 100 nM to generate standard curves for quantitation. Blanks were run in between each sample to minimize sample carryover.

Results and Discussion

Tunable Organic Salts as Imagers

Figure 8D:
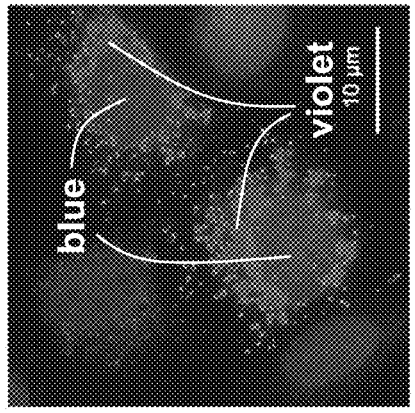
Figure 8E:
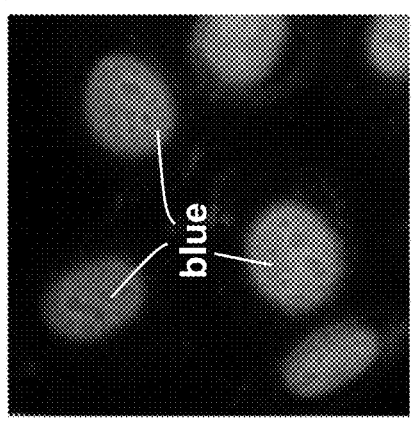
Figure 8F:
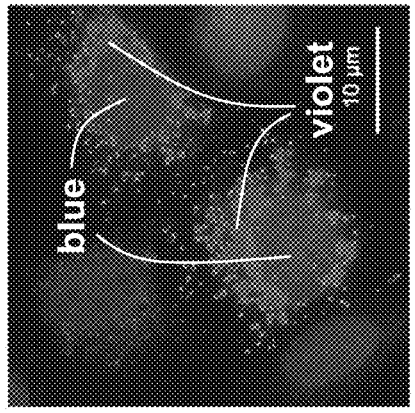

Effective fluorescence dyes must be non-toxic for live cell imaging. A virtual elimination of the toxicity of luminescent dyes with anion tuning is now demonstrated. Further developed are luminescent dyes that absorb and emit in the optical tissue window for imaging without background absorption/emission from components of tissue such as water, hemoglobin, and melanin, as shown in FIG. 8A. Heptamethine cyanine ($Cy^+$) is a photoactive cation that absorbs and emits in IR wavelengths, with an excitation/emission maximum of 830/848 nm, as shown in FIG. 8B. The deeper excitation and emission of $Cy^+$ provide an advantage over Cy7 (excitation/emission maximum of 750/773 nm), allowing imaging at greater tissue depths. Pairing $Cy^+$ with small hard anions such as iodide ($I^-$), chloride ($Cl^-$), or hexafluorophosphate ($PF_6^-$) are toxic to cells at low concentrations (1 µM) even without exposure to IR light, and only slightly more toxic once activated by IR light, as shown in FIG. 8C. Imaging live cells with these toxic cation-anion pairs requires usage of low doses that result in low absorbance and emission, resulting in poor quality images. Both the photo- and dark cytotoxicity of $Cy^+$ through pairing with weakly coordinating phenyl borate anions, such as tetrakis(pentafluorophenyl)borate ($TPFB^-$) is dramatically decreased, as shown in FIG. 8C. CyTPFB is non-toxic to cells even at greater than 20-fold higher concentrations of 20 µM. The non-toxic nature of CyTPBF allows use of high doses in eukaryotic and prokaryotic cells for enhanced IR imaging with greater brightness, as shown in FIGS. 8D-8F for a eukaryotic cell example. Similar high-intensity images with other non-toxic anions such as tetrakis[3,5-bis(trifluoro methyl)phenyl]borate ($TFM^-$) and Δ-tris(tetrachloro-1,2-benzene diolato)phosphate(V) (referred to as Δ-TRISPHAT$^-$, further abbreviated as TRIS$^-$) have been generated. Fluorescent imaging intensity is found to increase with increasing concentration both in new compounds, as shown in FIGS. 9A and 9B, and as modifications to existing compounds such as Cy7, as shown in FIG. 10. These data provide clear evidence that modulation of the anion decreases toxicity and enhances brightness. Anion exchange is not found to significantly alter the absorption, emission, or quantum yield range shown in FIG. 8B.

Tunable Organic Salts as Photosensitizers for PDT

Photosensitizers must be non-toxic, or substantially non-toxic, in the dark and selectively phototoxic with excitation to enable double selectivity. As discussed above, and as shown in FIG. 11A, $CyPF_6$ is toxic to cells at low concentrations (<2.5 µM) even without exposure to IR light. Toxicity without excitation leads to severe side effects, as all cells exposed to the agent will be affected. Thus, toxicity in the dark must be eliminated while maintaining phototoxicity in response to excitation. As shown in FIGS. 11A and 11B, the toxicity of $Cy^+$ in the dark was decreased while maintaining its phototoxicity in response to IR excitation by pairing it with anions such as tetrakis(4-fluorophenyl)borate ($FPhB^-$) and cobalticarborane ($CoCB^-$). Unlike $CyPF_6$, CyFPhB and CyCoCB allow cell growth in the dark (FIG. 11A), but cause significant cell death with IR excitation (FIG. 11B). This data is further summarized in the IC50 values under both dark and light conditions in Table 2. With reference to FIGS. 12A and 12B, this same tunability is shown in WM1158 human melanoma cells. Other reports that utilize weakly coordinating ions likely did not see this same effect due to the larger bandgap (>1.8 eV) that results in a larger charge injection barrier and prevents this mechanism from being active. It also could stem from poor ion pairing that leads to poor energy level alignment. Interestingly, phototoxic organic salts are highly effective against Sk-Mel-28 Vem$^R$ drug-resistant melanoma cells as shown in FIG. 13. This demonstrates that PDT can treat drug-resistant disease, for which no treatment options are currently available. These data demonstrate the unprecedented ability to control selective toxicity through anion design without chemical modification of the luminescent cation.

TABLE 2

Toxicity of photoactive cation heptamethine cyanine (Cy+) is determined by anion pairing. $IC_{50}$ values were generated by linear regression analysis.

| Salt | $IC_{50}$ Dark (µM) | $IC_{50}$ 850 nm (µM) |
|---|---|---|
| $CyPF_6$ | 1.6 | 0.89 |
| CyFPhB | 46 | 3.5 |
| CyCoCB | 225 | 3.4 |

TABLE 2-continued

Toxicity of photoactive cation heptamethine cyanine
(Cy+) is determined by anion pairing. $IC_{50}$ values
were generated by linear regression analysis.

| Salt | $IC_{50}$ Dark (µM) | $IC_{50}$ 850 nm (µM) |
|---|---|---|
| CyTPFB | 126 | 11 |
| CyTFM | 125 | 29 |
| CyTRIS | 1220 | 1200 |

Mechanisms of Tunability

The varying phototoxicity of organic salts is not due to differences in cellular accumulation. The data show that non-toxic organic salts, such as CyTPFB, localize inside cells proportionally to the initial introduced concentration in the cellular media and provide brighter images when used at higher concentrations (see FIGS. 14A-14D). This is further confirmed by quantitation of intracellular organic salt concentrations using mass spectrometry following incubation of cells with the same extracellular concentration of 1 µM (FIG. 15A). High intracellular accumulation is observed for low-toxicity organic salts. Furthermore, the anions themselves are not toxic: addition of a phototoxic anion (from CyI) such as I paired with a non-luminescent cation such as potassium (K) does not cause toxicity in the dark or with light (FIG. 15B). Surprisingly, the cations and anions do not dissociate in the cell despite the fact that they are salts: a non-toxic salt such as CyTRIS cannot be made toxic by addition of KI (FIG. 15B). Thus, the ability of the anion to tune the phototoxicity of the cation is likely due to optoelectronic properties modulated by one or more of the following mechanisms: 1) electronic structure, 2) molecular level interface dipoles, 3) steric hindrance, 4) electron withdrawing ability, and 5) reorganization energies for electron transfer. A correlation is observed between phototoxicity and the highest occupied molecular orbital (HOMO) energy level of the organic salts (FIG. 15C). This suggests energy level resonance(s) modulate the interaction between the organic salts and the cell. Here, it is shown that optoelectronic tuning by anion exchange allows independent control of: 1) phototoxicity with anions through modulation of energy levels that regulate electron transfer; and 2) the band gap through modification of the luminescent cation without sacrificing control of desired energy levels.

Tuning the Spectral window (Absorption And Emission) to enhance Tissue Penetration As the band gap shrinks and enables deeper tissue penetration, both HOMO and lowest unoccupied molecular orbital (LUMO) shift in unpredictable ways. Thus, optimal spectral range adjustment requires molecular orbital level adjustment to find resonance with electron transfer for particular reactive species. The ability to modulate the absorption of $Cy^+$ to go deeper into the IR can be achieved through salt aggregation or extending the conjugation of the indole group. Extended conjugation on the indole was demonstrated with benz[cd]indolium. This not only enables greater tissue penetration, but also reduces overall light sensitivity in patients. PHOTOFRIN® porfimer sodium sensitizes patients to red light (620 nm) common in indoor and outdoor light. This side effect can be resolved by extending the absorption of the fluorophore deeper into the IR, as there is no IR (750-1100 nm) light in indoor lighting, and less IR than visible light in the solar spectrum. Recent PDT-based nanocrystals show tunability via surface ligand modification, but have very poor absorbance in the NIR range due to a lack of oscillator strength near their bandgap and poor biocompatibility due to heavy elements. For example, and with reference to FIG. 16, nanocrystals have absorption coefficients of about $10^3$/cm for PbS and PbSe compared to about $10^6$/cm for cynanines with bandgaps around 850 nm, which translates to 1000 times more absorption per nanometer of material. $Cy^+$ is further modified for deeper IR absorption by increasing conjugation and modifying ligand structures to affect aggregation and intermolecular proximities. This enables deeper tissue penetration with greater efficiency in the optimal tissue window. Furthermore, larger Stokes shifts, which increase brightness by decreasing dye reabsorption losses, can be achieved with these cations via $S_N2$ reactions of the Cl on the polymethine backbone, as shown in FIG. 17. The use of organic salts typically results in modest Stokes shifts (20-30 nm). However, it is possible to enhance these shifts through simple chemical modifications. By substituting the central methane position (typically occupied by Cl) with electron donating/withdrawing groups, a Stokes shift of >100 nm is demonstrated. However, this modification results in the absorption peak to move away from the IR range. To address this, deeper-IR absorbing methines are used and chemically modified them at the central position to induce large Stokes shifts (FIG. 17). While this mechanism of inducing large Stokes shift is not well understood, it may stem from modulations in the bond length alteration or transition between bis-dipolar configurations that preferentially blue-shifts the absorption to lower wavelengths. This effect is nonetheless exploited, which can then be coupled to the complete range of anions for full electronic control in any part of the spectral range.

Modification Of Clinically Approved Compounds

Commercially available photoactive agents offer a range of band gaps for varying optical properties. By pairing these existing compounds with particular anions, their band gaps can be maintained while decreasing toxicity through modulation of energy levels. Example agents such as Cy3, Cy5, and Cy7 series, are already formulated salts that are "clickable" (for coupling to biomolecules) and generally sold with chloride anions. Anion exchange reactions are performed to replace the chloride with our range of anions through the strategies outlined above and show a similar trend where Cy7 ester acid is found to be highly cytotoxic but can become non-toxic with the TPFB anion, as shown in FIG. 18. For existing agents that are not salts, such as PHOTOFRIN® porfimer sodium and Protoporphyrin, monomer derivatives of these molecules can be converted to cations, as shown in FIGS. 19A-19D, through either quaternization of secondary imines or through straightforward metal complexation of the metal-free porphyrin core. Metals (M) such as gold, palladium, or manganese can be added, for example, via reflux in acetic acid with excess of $KMCl_4$. The metal complexation approach also provides intriguing opportunities to further introduce and modulate triplet excited states through intersystem crossing. This approach enables additional control over the number of anions introduced to the cation (monovalent, divalent, tetravalent, etc.) to amplify the anion effect (see FIGS. 19A-19D).

Mechanism of Phototoxicity in Various Cell Types

Photoactive agents accumulate in the mitochondria of cancer cells and generate reactive oxygen species (ROS) with light exposure, depolarizing the mitochondrial membrane potential to cause cell death. This effect is seen in colocalization data shown in FIGS. 20A-20D and Table 3. Small molecule protective agents that quench ROS have been used to decrease their phototoxicity. However, the exact type of ROS generated by each luminescent agent remains unclear. Photo-induced ROS include singlet oxygen, superoxide radical anion, hydrogen peroxide, hydroxyl radical and others (see FIG. 21). Superoxide is a highly reactive and biologically toxic species deployed in nature to kill invading organisms. It is often formed as a byproduct of mitochondrial respiration but is typically quenched by the highly efficient superoxide dismutase. Hydroxyl radicals are also highly reactive, damaging nearly all forms of biological molecules. Unlike superoxide radical, the hydroxyl radical cannot be easily quenched naturally via enzymes, and endogenous antioxidants are typically required. Singlet oxygen is the excited state of the common triplet oxygen ($O_2$ ground state) and is highly reactive towards organic compounds. Singlet oxygen can be eliminated in mammalian systems by antioxidants. A range of nitroxy radicals can subsequently stem from superoxide (peroxynitrite) or peroxide (nitrogen dioxide) species. The current data show that cation-anion pairs have energy levels resonant with different types of ROS (see FIG. 21). Each luminescent cation-anion pair generates specific ROS resonant with its own energy level, and cell types can be targeted by generating the key sensitizing ROS. For example, it is expected that CyFPhB is phototoxic (see FIGS. 11A and 11B and 12A and 12B) by generating reactive oxygen species, which can be resonant with its molecular orbital energy levels (FIG. 21). Such a resonant mechanism would be subsequently described by the Markus one-electron redox reaction rate (k) dictated by the reorganization energy ($\lambda$), the Gibbs free energy of the formation of the transition state($\Delta G^0$), the Boltzmann constant ($k_B$), the absolute temperature (T), and the probability of transfer from donor to acceptor (A) as $k=A \exp(-(\lambda-\Delta G^0)^2/4\lambda k_B T)$. It should be noted this equation should be highly appropriate because Markus originally formulated this equation accounting for reorganization of solvent and ligands during redox reactions in solution. One of the most surprising features of this equation is the emergences of the "inverted" region where there is a peak in reaction rate when $\lambda \neq 0$ and a drop in the reaction rate when $\Delta G^0$ deviates from $\Delta G^0=\lambda$ (at very positive or negative $\Delta G^0$). Interestingly, it appears that such an inverted region is indeed seen in FIGS. 12A and 12B. Additionally, different cell types may accumulate varying amounts of each cation-anion pair. IR heptamethine cyanine dyes have been shown to be retained in cancer cells but not normal cells. The distinct environments of cells (e.g., hypoxia, pH) can also impact parameters such as the reorganization energy or strength of dipole interactions. As shown in FIG. 22, it is further confirmed that luminescent organic salts generate mitochondrial-specific ROS. Using MitoSOX, a fluorescent mitochondrial-specific superoxide detector, it is observed that organic salts cause a clear increase in mitochondrial superoxide. $CyPF_6$ is cytotoxic, catalyzing superoxide with or without light; CyFPhB is phototoxic (but not cytotoxic), photo-generating superoxide only with illumination; and CyTPFB is non-toxic, generating minimal superoxide even with light a high concentrations. No cytoplasmic ROS is detected using general cytoplasmic ROS probe $H_2DCFDA$. The cytotoxicity of $CyPF_6$ can be explained by the lack of aggregation observed in cell media. Due to the lack of size limitations set by nanoparticle formation, $CyPF_6$ is able to physically interfere with the complexes of the mitochondrial electron transport chain, for example, and induce oxidative stress without photoexcitation. In contrast, CyFPhB forms small photoactive nanoparticles in cell media. With an average size of <10 nm they are still able to enter the cell but size limitations restrict their ability to directly interact and inhibit protein complexes in the mitochondrial membrane, instead inducing only a photoxic effect when excited with NIR light. The degree of photoxicity is then dictated by the energy level resonance with pathways in the mitochondria so that CyFPhB with a smaller absolute HOMO is highly phototoxic and CyTPFB with a higher absolute HOMO is non phototoxic to orders of magnitude higher concentrations.

TABLE 3

Intracellular localization of the fluorescent ion in A549 cells does not change with counterion. Variables of colocalization that measure the linear relationship between red (organic salt analog) and green (Rhodamine123) fluorescence (Pearson's coefficient), overlap of red to green area (Mander's coefficient 1), and overlap of green to red area (Mander's coefficient 2). All organic salts show a positive linear correlation with mitochondrial fluorescence, with similar degrees of colocalization with mitochondria.

|  | $CyPF_6$ | CyFPhB | CyTPFB |
| --- | --- | --- | --- |
| Pearson's Coefficient | 0.852 | 0.853 | 0.901 |
| Mander's Coefficient 1 | 0.991 | 0.997 | 0.967 |
| Mander's Coefficient 2 | 0.971 | 0.992 | 0.983 |

Each reactive species causes distinct consequences within cellular systems, and different cell types have varying anti-oxidant programs. To improve the selectivity of fluorescent organic salts in targeting particular cell types, it is important to determine the toxic ROS produced by each cation-anion pair.

This example ultimately demonstrates the use of multifunctional organic salts for imaging and PDT, and paves the way for many new applications.

FIG. 23A shows exemplary anionic photoactive anions and FIG. 23B shows exemplary cationic counterions. FIGS. 24A-24D show optical data for organic salts having anionic heptamethines paired with sodium cations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A method of exciting an organic salt nanoparticle in a cancer cell, the method comprising administering the organic salt nanoparticle to a subject having the cancer cell; and:
exposing the organic salt nanoparticle within the cancer cell to light having a first wavelength to induce a photodynamic effect at a concentration ranging from 5 nM to 1 mM, the organic salt nanoparticle comprising an organic salt exposed on an outermost surface, the organic salt nanoparticle comprising a photoactive ion and a counterion, the organic salt nanoparticle being free of a coating within the cancer cell and non-toxic to the cancer cell in the dark at the concentration ranging from 5 nM to 1 mM, wherein
the organic salt absorbs the light having the first wavelength and the photoactive ion becomes excited wherein the nanoparticle has a diameter of greater than or equal to 0.5 nm to less than or equal to 50 nm,
the organic salt has a $^{light}IC_{50}$ of less than 1200 µM, and the photoactive ion is a cationic or anionic form of a photoactive molecule selected from the group consisting of porphyrins, rhodamines, cyanines, polymethines, heptamethines, phthalocyanines, squaraines, perylenes, quinines, xanthenes, naphthalenes, coumarins, oxadiazoles, oxazines, acridines, arylmethines, tetrapyrroles, indocarbocyanines, oxacarbocyanines, thiacarbocyanines, merocyanines, porfimers, derivatives thereof, and combinations thereof.

2. The method according to claim 1, wherein the organic salt has a $^{light}IC_{50}$ of less than 10 μM.

3. The method according to claim 1, wherein the organic salt has a $^{dark}IC_{50}$:$^{light}IC_{50}$ ratio of greater than or equal to 5.

4. The method according to claim 1, wherein the light having the first wavelength is visible light or near-infrared (NIR) light.

5. The method according to claim 1, wherein the excited photoactive ion emits light having a second wavelength, the second wavelength being visible light or near-infrared (NIR) light.

6. The method according to claim 1, wherein the excited photoactive ion is activated to generate reactive oxygen species within the cancer cell.

7. The method according to claim 1, wherein the counterion has a volume averaged equivalent spherical radius ranging from 0.197 nm to 0.479 nm.

8. The method according to claim 1, wherein the counterion results in the organic salt having an absolute highest occupied molecular orbital (HOMO) energy of less than or equal to 5 eV.

9. The method according to claim 1, wherein the counterion results in the organic salt having an absolute highest occupied molecular orbital (HOMO) energy of greater than 5 eV.

10. The method according to claim 1, further comprising, prior to the contacting:
    tuning or having tuned the organic salt to have a desired toxicity after the exposing the cancer cell to light by pairing the photoactive ion with the counterion, wherein the counterion induces the desired toxicity of the excited photoactive ion.

11. The method according to claim 1, wherein the photoactive ion is a photoactive cation and the counterion is an anion is selected from the group consisting of tetrakis(4-fluorophenyl)borate (FPhB⁻), cobalticarborane (CoCB⁻), tetrakis(pentafluorophenyl)borate (TPFB⁻), tetrakis[3,5-bis(trifluoro methyl)phenyl]borate (TFM⁻), Δ-tris(tetrachloro-1,2-benzene diolato) phosphate(V) (TRIS⁻), tetraphenylborate, tetra(p-tolyl)borate, tetrakis(4-biphenylyl)borate, tetrakis(1-imidazolyl)borate, tetrakis(2-thienyl)borate, tetrakis(4-chlorophenyl)borate, tetrakis(4-fluorophenyl)borate, tetrakis(4-tert-butylphenyl)borate, tetrakis[3,5-bis(trifluoromethyl)]borate, [4-[bis(2,4,6-trimethylphenyl)phosphino]-2,3,5,6-tetrafluorophenyl]hydrobis(2,3,4,5,6-pentafluorophenyl)borate, [4-di-tert-butylphosphino-2,3,5,6-tetrafluorophenyl]hydrobis(2,3,4,5,6-pentafluorophenyl) borate anion; (Λ,R)-(1,1'-binaphthalene-2,2'diolato)(bis(tetrachlor-1,2-benzenediolato)phosphate(V)) anion (BINPHAT-), hexafluoroantimonate (SbF6-), tetrafluoroborate (BF4-), acetate, trifluoracetate, benzene sulfonate, bis(trifluoromethane)sulfonimide (TFSI), alkylsulfate, tosylate, methanesulfonate, tetrakis(4-methylphenyl)-borane, tetra-4-biphenylylborate, tetrakis(4-methoxyphenyl)borate, tetrakis[4-(2-methyl-2-propanyl)phenyl]borate, (2-methylphenyl)(triphenyl)borate, bis(2-methylphenyl)(diphenyl)borate, tetrakis(4'-methyl-4-biphenylyl)borate, tetrakis(4-isopropoxyphenyl)borate, derivatives thereof, and combinations thereof.

12. The method according to claim 1, wherein the photoactive ion is a photoactive anion and the counterion is a cation, wherein the cation is selected from the group consisting of (2-oxo-2-phenyl-ethyl)-triphenyl-phosphonium, 1-benzyl-4-(4-methoxy-phenyl)-4H-(1,2,4)triazol-1-ium, 1-benzyl-4-phenyl-3-styryl-4H-(1,2,4)triazol-1-ium, 1-benzyl-4-phenyl-3-styryl-4H-(1,2,4)triazol-1-ium, 2,4,6 tris-(4-chloro-phenyl)-pyranylium, 2,4,6-tris-(4-chloro-phenyl)-thiopyranylium, 2,4,6-tris-(4-hydroxy-phenyl)-pyranylium, 2,4,6-tris-(4-tert-butyl-phenyl)-(1,3)oxazin-1-ylium, 4,6-bis-(4-chloro-phenyl)-2,3-diphenyl-pyranylium, 1-hexyl-3-methylimidazolium, 1-hexyl-3-(3,3,4,4,5,5,6,6-tridecafluorooctyl)-methylimidazolium, 1-hexyl-3-(3,3,4,4,5,5,6,6,7,7,8,8-nonafluorohexyl)-methylimidazolium, methylpyridinium, trimethylmethanaminium, methyl ammonium, acetamidinium, 5-azaspiro[4.4]nonan-5-ium, benzylammonium, iso-butylammonium, n-butylammonium, t-butylammonium, cyclohexylammonium, 1,4-diazabicyclo[2,2,2]octane-1,4-diium, diethylammonium, ethane-1,2-diammonium, ethylammonium, formamidinium, guanidinium, n-hexylammonium, imidazolium, n-octylammonium, phenethylammonium, piperazine-1,4-diium, propane-1,3-diammonium, iso-propylammonium, pyrrolidinium, quinuclidin-1-ium, phosphonium, pyrrolidium, thiazolium, sulfinium, imidazolium, pyridinium, sulfonated cyanine3 (Cy3), sulfonated cyanine3.5 (Cy3.5), sulfonated cyanine5 (Cy5), sulfonated cyanine5.5 (Cy5.5), sulfonated cyanine7 (Cy7), sulfonated cyanine7.5 (Cy7.5), derivatives thereof, halogenated derivatives thereof, and combinations thereof.

13. The method according to claim 1, wherein the photoactive ion is a photoactive cation selected from the group consisting of 1-Butyl-2-(2-[3-[2-(1-butyl-1H-benzo[cd]indol-2-ylidene)-ethylidene]-2-phenyl-cyclopent-1-enyl]-vinyl)-benzo[cd]indolium, 1-Butyl-2-(2-[3-[2-(1-butyl-1H-benzo[cd]indol-2-ylidene)-ethylidene]-2-chloro-cyclohex-1-enyl]-vinyl)-benzo[cd]indolium, 1-Butyl-2-(2-[3-[2-(1-butyl-1H-benzo[cd]indol-2-ylidene)-ethylidene]-2-phenyl-cyclohex-1-enyl]-vinyl)-benzo[cd]indolium, 1-Butyl-2-(2-[3-[2-(1-butyl-1H-benzo[cd]indol-2-ylidene)-ethylidene]-2-diphenylamino-cyclopent-1-enyl]-vinyl)-benzo[cd] indolium, 1-Butyl-2-[7-(1-butyl-1H-benzo[cd]indol-2-ylidene)-hepta-1,3,5-trienyl]-benzo[cd]indolium, 2-[2-[2-chloro-3-[2-(1,3-dihydro-3,3-dimethyl-1-ethyl-2H-benz[e]indol-2-ylidene)ethylidene]-1-cylohexen-1-yl]-ethenyl]-3,3-dimethyl-1-ethyl-1H-benz[e]indolium ("Cy"), N,N,N',N'-Tetrakis-(p-di-n-butylaminophenyl)-p-benzochinon-bis-immonium, 4-[2-[2-Chloro-3-[(2,6-diphenyl-4H-thiopyran-4-ylidene)ethylidene]-1-cyclohexen-1-yl]ethenyl]-2,6-diphenylthiopyrylium, 1-Butyl-2-[2-[3-[(1-butyl-6-chlorobenz[cd]indol-2(1H)-ylidene)ethylidene]-2-chloro-5-methyl-1-cyclohexen-1-yl]ethenyl]-6-chlorobenz[cd] indolium, 1-Butyl-2-[2-[3-[(1-butyl-6-chlorobenz[cd]indol-2(1H)-ylidene)ethylidene]-2-chloro-1-cyclohexen-1-yl] ethenyl]-6-chlorobenz[cd]indolium, Dimethyl{4-[1,7,7-tris(4-dimethylaminophenyl)-2,4,6-heptatrienylidene]-2,5-cyclohexadien-1-ylidene}ammonium, 5,5'-Dichloro-11-diphenylamino-3,3'-diethyl-10,12-ethylenethiatricarbocyanine, 2-[2-[2-Chloro-3-[2-(1,3-dihydro-1,1,3-trimethyl-2H-benzo[e]-indol-2-ylidene)-ethylidene]-1-cyclohexen-1-yl]-ethenyl]-1,1,3-trimethyl-1H-benzo[e]indolium, 2-[2-[2-Chloro-3-[2-(1,3-dihydro-1,3,3-trimethyl-2H-indol-2-ylidene)-ethylidene]-1-cyclopenten-1-yl]-ethenyl]-1,3,3-trimethyl-3H-indolium, 2-[2-[3-[(1,3-Dihydro-3,3-dimethyl-1-propyl-2H-indol-2-ylidene)ethylidene]-2-(phenylthio)-1-cyclohexen-1-yl]ethenyl]-3,3-dimethyl-1-propylindolium, 1,1',3,3,3',3'-4,4',5,5'-di-benzo-2,2'-indotricarbocyanine perchlorate, 2-[2-[2-Chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium, 3,3'-Diethylthiatricarbocyanine, 2-[[2-[2-[4-(dimethylamino)phenyl]ethenyl]-6-methyl-4H-pyran-4-ylidene]methyl]-3-ethyl, 2-[7-(1,3-Dihydro-1,3,3-trimethyl-2H-indol-2-ylidene)-1,3,5-heptatrienyl]-1,3,3-trimethyl-3H-indolium, cyanine3 (Cy3), cyanine3.5 (Cy3.5), cyanine5 (Cy5), cyanine5.5 (Cy5.5), cyanine7 (Cy7), cyanine7.5 (Cy7.5) derivatives thereof, and combinations thereof.

14. The method according to claim 1, wherein the cancer cell is located in a tumor of the subject.

15. The method according to claim 1, wherein the organic salt nanoparticle is coupled to a biomolecule, an antibody, an antibody fragment, a targeting agent, a sugar molecule, a polysaccharide, a protein, a peptide, a nucleic acid, a nanoparticle surface, a lipid carrier, a micelle surface, or a liposome surface.

16. The method according to claim 1, wherein the organic salt has a Stokes shift ranging from 50 nm to 120 nm.

17. The method according to claim 1, wherein the organic salt has a bandgap greater than or equal to 0 eV to less than or equal to 1.8 eV.

18. The method according to claim 1, wherein prior to the contacting, the organic salt is contained with a dissolvable or bioabsorbable coating, wherein the dissolvable or bioabsorbable coating is removed prior to the contacting.

19. A method of exciting an organic salt nanoparticle in a tissue of a subject, the method comprising: administering a composition comprising the organic salt nanoparticle to the subject; and exposing the tissue in the subject to light having a wavelength that excites an organic salt nanoparticle, wherein the organic salt is exposed at an outermost surface of the organic salt nanoparticle, the organic salt nanoparticle comprises a photoactive ion and a counterion, cells of the tissue took up the organic salt nanoparticle and the organic salt nanoparticle is free of a coating within the cells, the counterion results in the nanoparticle having an absolute highest occupied molecular orbital (HOMO) energy of greater than or equal to 4 eV to less than or equal to 5 eV, the organic salt has a $^{dark}IC_{50}$:$^{light}IC_{50}$ ratio of greater than or equal to 5, the photoactive ion is a cationic or anionic form of a photoactive molecule selected from the group consisting of porphyrins, rhodamines, cyanines, polymethines, heptamethines, phthalocyanines, squaraines, perylenes, quinines, xanthenes, naphthalenes, coumarins, oxadiazoles, oxazines, acridines, arylmethines, tetrapyrroles, indocarbocyanines, oxacarbocyanines, thiacarbocyanines, merocyanines, porfimers, derivatives thereof, and combinations thereof, and the organic salt is non-toxic to the cancer cell in the dark at the concentration, ranging from 5 nM to 1 mM.

20. The method according to claim 19, wherein the tissue is a tumor, the excited organic salt emits light having a second wavelength, and the method further comprises:
visualizing the light having the second wavelength in real time; and
resecting the tumor from the subject.

21. A method of exciting an organic salt in a cancer cell, the method comprising administering the organic salt to a subject having the cancer cell; and:
exposing the organic salt within the cancer cell to light having a first wavelength to induce a photodynamic effect at a concentration ranging from 5 nM to 1 mM, the organic salt comprising a photoactive ion and a counterion, the organic salt being free of a coating within the cancer cell and non-toxic to the cancer cell within the dark at the concentration ranging from 5 nM to 1 mM, wherein
the organic salt absorbs the light having the first wavelength and the photoactive ion becomes excited,
the first wavelength is greater than 800 nm,
the organic salt includes an ion having a charge magnitude of 1, 2, or 3, and
the photoactive ion is a cationic or anionic form of a photoactive molecule selected from the group consisting of porphyrins, rhodamines, cyanines, polymethines, heptamethines, phthalocyanines, squaraines, perylenes, quinines, xanthenes, naphthalenes, coumarins, oxadiazoles, oxazines, acridines, arylmethines, tetrapyrroles, indocarbocyanines, oxacarbocyanines, thiacarbocyanines, merocyanines, porfimers, derivatives thereof, and combinations thereof.

22. The method according to claim 1, wherein the administering is performed intravenously, orally, or topically.

23. The method according to claim 21, wherein the first wavelength is greater than 850 nm.

24. The method of according to claim 1, wherein
the diameter of the organic salt nanoparticle is greater than or equal to 0.5 nm to less than or equal to 25 nm.

25. The method according to claim 1, wherein the $^{light}IC_{50}$ is less than 29 μM.

26. The method according to claim 1, wherein the organic salt is configured to be in the liver, kidneys, or both liver and kidneys of the subject.

27. The method according to claim 26, wherein
the organic salt is configured to be in the liver at a first concentration at a first time, and
the organic salt is configured to be in the liver at a second concentration at a second time, the second concentration less than the first concentration.

28. The method according to claim 21, wherein the organic salt has a $^{light}IC_{50}$ of less than 29 μM.

* * * * *